United States Patent
Kothe et al.

(10) Patent No.: US 10,878,439 B2
(45) Date of Patent: Dec. 29, 2020

(54) MOBILE-OFFER CREATION

(71) Applicant: RetailMeNot, Inc., Austin, TX (US)

(72) Inventors: Kyle William Kothe, Austin, TX (US); Edgar Mitchell Dapremont, III, Austin, TX (US); Jimmy Jaejoon Song, Austin, TX (US); Nicole Juneau Ball, Austin, TX (US); Eithan Zilkha, Austin, TX (US); Jeffrey Ryan Rego, Austin, TX (US)

(73) Assignee: RetailMeNot, Inc., Austin, TX (US)

( * ) Notice: Subject to any disclaimer, the term of this patent is extended or adjusted under 35 U.S.C. 154(b) by 1829 days.

(21) Appl. No.: 14/199,588

(22) Filed: Mar. 6, 2014

(65) Prior Publication Data
US 2015/0254704 A1    Sep. 10, 2015

(51) Int. Cl.
G06Q 30/02    (2012.01)
G06Q 30/06    (2012.01)

(52) U.S. Cl.
CPC ..... *G06Q 30/0225* (2013.01); *G06Q 30/0257* (2013.01); *G06Q 30/0261* (2013.01); *G06Q 30/0267* (2013.01); *G06Q 30/0276* (2013.01); *G06Q 30/06* (2013.01)

(58) Field of Classification Search
CPC .................................................. G06Q 30/02
See application file for complete search history.

(56) References Cited

U.S. PATENT DOCUMENTS

| 6,826,481 B2 | 11/2004 | Root et al. |
| 6,980,909 B2 | 12/2005 | Root et al. |
| 7,979,350 B1 | 7/2011 | Canon |

(Continued)

FOREIGN PATENT DOCUMENTS

| KR | 1020100132185 A | 12/2010 |
| KR | 1020110017027 A | 2/2011 |
| KR | 1020110023716 A | 3/2011 |

OTHER PUBLICATIONS

Partridge, Kurt and Bo Begole. "Pervasive Advertising; Chaper 4." Jul. 23, 2011, available at: https://link.springer.com/content/pdf/10.1007%2F978-0-85729-352-7_4.pdf. (Year: 2011).*

(Continued)

*Primary Examiner* — Katherine Kolosowski-Gager
(74) *Attorney, Agent, or Firm* — Pillsbury Winthrop Shaw Pittman, LLP

(57) ABSTRACT

Provided is a process for managing offers includes: presenting, on a mobile device, offer-creation interfaces by which a merchant specifies an offer, the offer parameters including data indicative of an amount of instances of the offer to be reserved by consumers; obtaining, with the mobile device, the offer parameters; obtaining, with the mobile device, based on wireless signals received by the mobile device indicative of location of the mobile device, a geographic location where consumers are to be alerted to the offer; and sending a request to an affiliate network to distribute the offer to a plurality of publishers within the affiliate network and limit use of the offer according to the specified amount of instances of the offer to be reserved by consumers, wherein the publishers each send a plurality of offers to consumers and wherein the affiliate network tracks redemptions of the offers with merchants.

18 Claims, 24 Drawing Sheets

(56) References Cited

U.S. PATENT DOCUMENTS

| | | | |
|---|---|---|---|
| 8,009,619 B1 | 8/2011 | Clavel et al. | |
| 8,060,594 B1 | 11/2011 | Clavel et al. | |
| 8,103,865 B2 | 1/2012 | Carion et al. | |
| 8,229,467 B2 | 7/2012 | Root et al. | |
| 8,271,579 B2 | 9/2012 | Clavel | |
| 8,478,245 B2 | 7/2013 | Carion et al. | |
| 8,560,601 B2 | 10/2013 | Clavel | |
| 8,611,927 B2 | 12/2013 | Root et al. | |
| 8,634,814 B2 | 1/2014 | Root et al. | |
| 8,732,619 B2 | 5/2014 | Knitowski et al. | |
| 8,788,358 B2 | 7/2014 | Knitowski et al. | |
| 8,812,024 B2 | 8/2014 | Obermeyer et al. | |
| 8,909,679 B2 | 12/2014 | Root et al. | |
| 9,015,692 B1 | 4/2015 | Clavel | |
| 2003/0004802 A1 | 1/2003 | Callegar | |
| 2003/0177347 A1* | 9/2003 | Schneier | A63F 13/12 713/151 |
| 2004/0243519 A1* | 12/2004 | Perttila | G06Q 20/20 705/75 |
| 2008/0215391 A1* | 9/2008 | Dowling | G06Q 30/0201 705/7.29 |
| 2008/0274752 A1 | 11/2008 | Houri | |
| 2008/0278309 A1 | 11/2008 | Troxler | |
| 2009/0030794 A1 | 1/2009 | Scheflan et al. | |
| 2009/0170528 A1 | 7/2009 | Bull et al. | |
| 2009/0204885 A1 | 8/2009 | Ellsworth et al. | |
| 2009/0248548 A1 | 10/2009 | Obermeyer | |
| 2009/0307067 A1 | 12/2009 | Obermeyer | |
| 2010/0121710 A1 | 5/2010 | Chipman et al. | |
| 2010/0250351 A1* | 9/2010 | Gillenson | G06Q 30/0222 705/14.13 |
| 2010/0279706 A1 | 11/2010 | Dicke | |
| 2011/0029363 A1 | 2/2011 | Gillenson et al. | |
| 2011/0153401 A1 | 6/2011 | Jellema et al. | |
| 2011/0197237 A1 | 8/2011 | Turner | |
| 2011/0238474 A1 | 9/2011 | Carr et al. | |
| 2011/0313840 A1* | 12/2011 | Mason | G06Q 30/02 705/14.35 |
| 2012/0010938 A1 | 1/2012 | Standley et al. | |
| 2012/0115512 A1* | 5/2012 | Grainger | G01S 5/0257 455/456.3 |
| 2012/0122487 A1 | 5/2012 | Holm et al. | |
| 2012/0143671 A1 | 6/2012 | Hansen et al. | |
| 2012/0259711 A1 | 10/2012 | Jabbawy | |
| 2013/0041756 A1 | 2/2013 | Carion et al. | |
| 2013/0159086 A1 | 6/2013 | Richard | |
| 2013/0256403 A1* | 10/2013 | MacKinnon Keith | G06K 5/00 235/375 |
| 2013/0262203 A1* | 10/2013 | Frederick | G06Q 30/0209 705/14.12 |

OTHER PUBLICATIONS

International Search Report and Written Opinion for Related PCT Application PCT/US2014/061151, dated Jan. 27, 2015, pp. 1-16.
'Coupon Codes | MailChimp', http://mailchimp.com/features/coupon-codes/, Feb. 13, 2014, pp. 1-3.
'Coupon codes and discounts for 90,000 online stores!', https://web.archive.org/web/20110609064014/http://www.retailmenot.com/, Jun. 9, 2011, pp. 1-3.
'Coupon Codes, Coupons, Promo Codes, Free Shipping and Discounts for Thousands of Stores', https://web.archive.org/web/20120606222824/http://www.retailmenot.com/, Jun. 6, 2012, pp. 1-4.
'Now You Can Finally Launch a Groupon Deal Without Ever Talking to a Human', http://recode.net/2014/02/10/now-you-can-launch-a-groupon-deal-without-ever-talking-to-a-human/, Feb. 10, 2014, pp. 1-6.
'QuikCoupon App—Coupon App for the iPhone', http://www.quikcoupon-app.com/, Feb. 13, 2014, pp. 1-3.
International Preliminary Report on Patentability for PCT/US2014/061151, dated Apr. 26, 2016, pp. 1-13.
Canadian Office Action dated Feb. 27, 2020 in Canadian Application No. 2,876,006 (6 pages).
Webarchive of CouponsHelper Tutorial https://web.archive.org/web/20120421032445/http://www.youtube.com/watch?v=SrYCmKdvzE4 Dec. 12, 2011 (4 pages).
Webarchive of CouponsHelper Firefox Addon https://web.archive.org/web/20120503055113/https://addons.mozilla.org/en-US/firefox/addon/couponshelper/, May 3, 2012 (6 pages).
CouponsHelper—Free Firefox Add on for Coupon Codes https://www.youtube.com/watch?v=TIL_44HRpk8, Jul. 11, 2011 (3 pages).
Office Action in related Canadian Application No. 2,876,007 dated Jun. 10, 2020 (4 pages).

* cited by examiner

MOBILE-OFFER CREATION

CROSS-REFERENCE TO RELATED APPLICATIONS

The present application is a continuation-in-part of U.S. patent application Ser. No. 14/060,550 filed Oct. 22, 2013, which is a continuation in part of PCT patent application PCT/US13/45186 filed Jun. 11, 2013, which claims priority to each of the following U.S. provisional patent applications: provisional application 61/658,387, filed Jun. 11, 2012. PCT patent application PCT/US13/45186 also is a continuation-in-part of, and claims priority to, each of the following U.S. non-provisional patent applications: application Ser. No. 13/836,110 filed on Mar. 15, 2013; application Ser. No. 13/836,808 filed on Mar. 15, 2013; and application Ser. No. 13/840,237 filed on Mar. 15, 2013. Each of the parent filings listed above, including the PCT application, the non-provisional US applications, and the US patent applications, is hereby incorporated by reference for all purposes.

BACKGROUND OF THE INVENTION

1. Field of the Invention

The present invention relates generally to merchant offers and, more specifically, to offer-discovery systems that facilitate offer creation with a mobile device.

2. Description of the Related Art

Offer-discovery systems provide a service by which merchants inform customers of offers, for example, deals (e.g., discounts, favorable shipping terms, or rebates) or coupons (e.g., printable coupons or mobile-device formatted coupons for in-store use or coupon codes for use online). Typically, these systems store information about offers from a relatively large number of merchants and provide an interface by which customers can identify offers in which the customer is likely to be interested. Merchants have found the offer-discovery systems to be a relatively effective form of marketing, as cost-sensitive consumers are drawn to such systems due to their relatively comprehensive listings of offers, and as a result, the number of offers listed on such systems has increased in recent years.

SUMMARY OF SOME ASPECTS OF THE INVENTIONS

The following is a non-exhaustive listing of some aspects of the present techniques. These and other aspects are described in the following disclosure.

In some embodiments, a process for managing offers includes: presenting, on a mobile device, one or more offer-creation interfaces by which a merchant enters offer parameters specifying an offer, the offer parameters including data indicative of an amount of instances of the offer to be reserved by consumers; obtaining, with the mobile device, the offer parameters after a merchant supplies the offer parameters with the one or more offer-creating interfaces; obtaining, with the mobile device, based on wireless signals received by the mobile device indicative of location of the mobile device, a geographic location where consumers are to be alerted to the offer; and sending a request to an affiliate network to distribute the offer to a plurality of publishers within the affiliate network and limit use of the offer according to the specified amount of instances of the offer to be reserved by consumers, wherein the publishers each send a plurality of offers to consumers and wherein the affiliate network tracks redemptions of the offers with merchants. In other cases, other types of offer-distribution systems are requested to distribute the offer, for instance an offer distribution system in which some or all of the functions of both an affiliate network and publisher are filled by a single-entity operating a single application.

Some aspects include a tangible, non-transitory, machine-readable medium storing instructions that when executed by a data processing apparatus effectuate the above processes.

Some aspects include a system including one or more processors and memory storing instructions that when executed by the processors effectuate the above processes.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
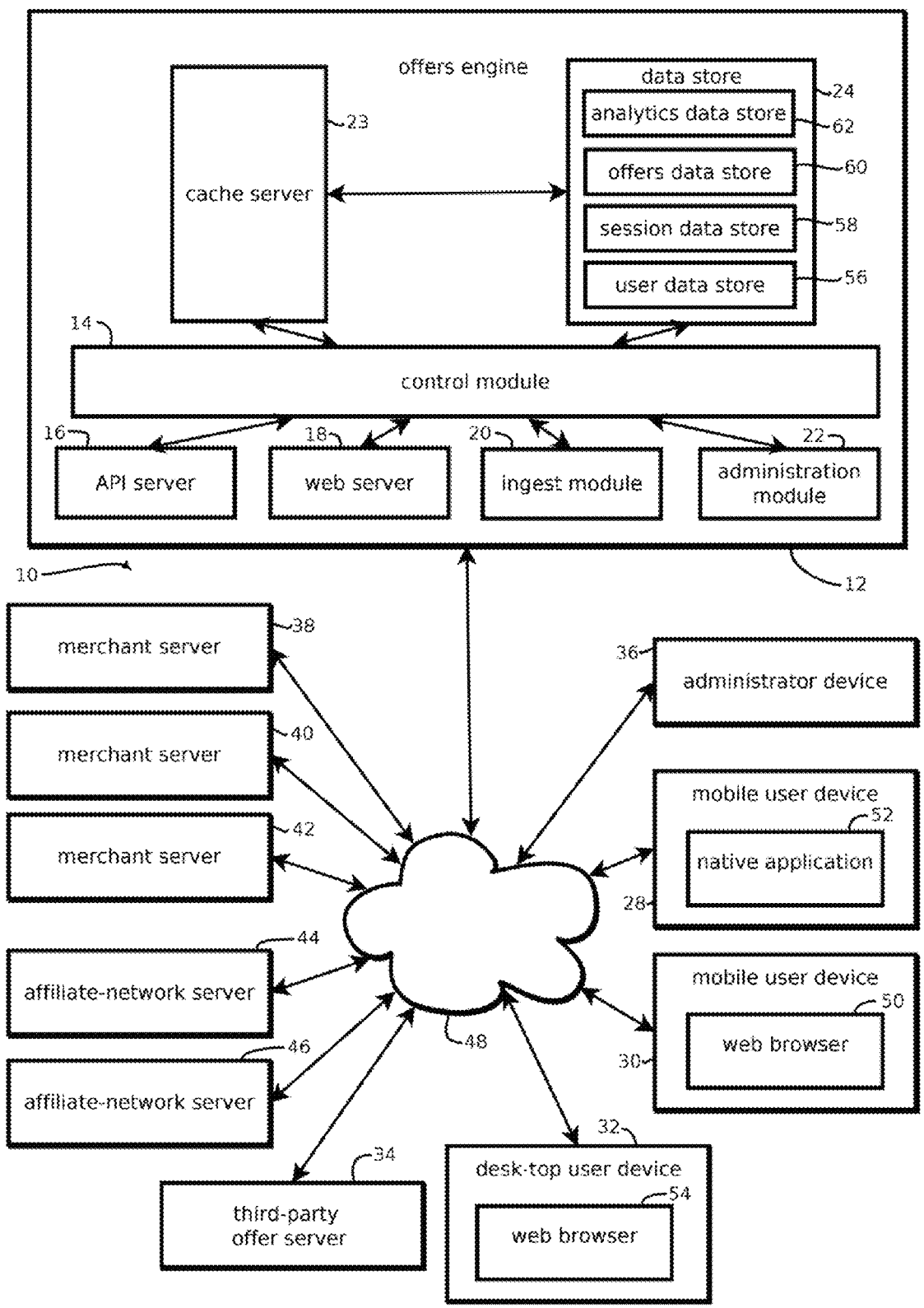
FIG. 1 illustrates an example of an offer-discovery system in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

FIG. 1-8 relate generally to alerting users to offers based on geographic location, and FIGS. 9-14 relate, in some applications, to management (e.g., creation, reserving, tracking, validation, or monitoring) of locally-targeted, single-use offers with a mobile device of a merchant. The features described with reference to both sets of figures may be combined in some embodiments, or those features, like others described below, may be implemented independently.

FIG. 1 shows an embodiment of an offer-discovery system 10. The exemplary system 10 includes an offers engine 12 that, in some embodiments, is capable of reducing the burden on users attempting to identify offers relevant to them from among a relatively large pool of offers (e.g., more than 100, more than 1,000, or more than 10,000). To this end and others, the offers engine 12 maintains device-independent user profiles (or portions of user profiles) by which offers interfaces may be relatively consistently configured across multiple user devices with which the user interacts with the offers engine 12. Further, the offers engine 12, in some embodiments, includes a number of features expected to facilitate relatively quick identification of relevant offers by a user, features that include cached storage of data related to likely relevant offers, faceted presentation of offers by which users can select among offers within various categories, and a number of other techniques described below for assisting with offer identification. The offers engine 12 is also expected to facilitate relatively low operating costs by, in some embodiments, automating parts of the process by which offer related data is acquired from sources, such as affiliate networks merchants, administrators, or users, and automating parts of the process by which transaction data indicative of acceptance, settlement, or clearing of offers is obtained and processed.

These and other benefits are described in greater detail below, after introducing the components of the system 10 and describing their operation. To mitigate the problems described herein, the applicants had to both invent solutions and, in some cases just as importantly, recognize problems overlooked (or not yet foreseen) by others in the field. Indeed, applicants wish to emphasize the difficulty of recognizing those problems that are nascent and will become much more apparent in the future should trends in the affiliate-networking industry continue as applicants expect. Further, because multiple problems are addressed, it should be understood that some embodiments are problem-specific, and not all embodiments address every problem with traditional systems described herein or provide every benefit described herein. That said, solutions to many of these problems are described with reference to FIGS. 1-14.

In the illustrated embodiment of FIG. 1, the offers engine 12 includes a control module 14, an application program interface (API) server 16, a web server 18, an ingest module 20, an administration module 22, a data store 24, and a cache server 23. These components, in some embodiments, communicate with one another in order to provide the functionality of the offers engine 12 described herein. As described in greater detail below, in some embodiments, the data store 24 may store data about offers and users' interactions with those offers; the cache server 23 may expedite access to this data by storing likely relevant data in relatively high-speed memory, for example, in random-access memory or a solid-state drive; the web server 20 may serve webpages having offers interfaces by which users discover relevant offers; the API server 16 may serve data to various applications that process data related to offers; the ingest module 20 may facilitate the intake of data related to offers from affiliate networks, users, administrators, and merchants; and the administration module 22 may facilitate curation of offers presented by the API server 16 and the web server 18. The operation of these components 16, 18, 20, 22, 24, and 23 may be coordinated by the control module 14, which may bidirectionally communicate with each of these components or direct the components to communicate with one another. Communication may occur by transmitting data between separate computing devices (e.g., via transmission control protocol/internet protocol (TCP/IP) communication over a network), by transmitting data between separate applications or processes on one computing device; or by passing values to and from functions, modules, or objects within an application or process, e.g., by reference or by value.

Among other operations, the offers engine 12 of this embodiment presents offers to users; receives data from users about their interaction with the offers (for example, the user's favorite offers or offer attributes; statistics about the offers the user has identified, accepted, or otherwise provided data about; or the identity of other users with whom the user communicates about offers and the content of those communications; provided that users opt to have such data obtained); customizes the presentation of offers based on this received data; and facilitates the processing of compensation from merchants (either directly or through affiliate networks) as a result of users accepting (or taking a specific action, like clicking or viewing, in some embodiments or use cases) offers. This interaction with users may occur via a website viewed on a desktop computer, tablet, or a laptop of the user. And in some cases, such interaction occurs via a mobile website viewed on a smart phone, tablet, or other mobile user device, or via a special-purpose native application executing on a smart phone, tablet, or other mobile user device. Presenting and facilitating interaction with offers across a variety of devices is expected to make it easier for users to identify and recall relevant offers at the time the user is interested in those offers, which is often different from the time at which the user first discovers the offers. In particular, some embodiments allow users to store data indicative of offers relevant to that user using one device, such as a desktop computer in the user's home, and then view those offers at a later time, such as on a native mobile application when in a retail store.

To illustrate an example of the environment in which the offers engine 12 operates, the illustrated embodiment of FIG. 1 includes a number of components with which the offers engine 12 communicates: mobile user devices 28 and 30; a desk-top user device 32; a third party server 34; an administrator device 36; merchant servers 38, 40, and 42; and affiliate-network servers 44 and 46. Each of these devices communicates with the offers engine 12 via a network 48, such as the Internet or the Internet in combination with various other networks, like local area networks, cellular networks, or personal area networks.

The mobile user devices 28 and 30 may be smart phones, tablets, gaming devices, or other hand-held networked computing devices having a display, a user input device (e.g., buttons, keys, voice recognition, or a single or multi-touch touchscreen), memory (such as a tangible, machine-readable, non-transitory memory), a network interface, a portable energy source (e.g., a battery), and a processor (a term which, as used herein, includes one or more processors) coupled to each of these components. The memory of the mobile user devices 28 and 30 may store instructions that when executed by the associated processor provide an operating system and various applications, including a web browser 50 or a native mobile application 52. The native application 52, in some embodiments, is operative to provide an offers interface that communicates with the offers engine 12 and facilitates user interaction with data from the offers engine 12. Similarly, the web browser 50 may be configured to receive a website from the offers engine 12 having data related to deals and instructions (for example, instructions expressed in JavaScript) that when executed by the browser (which is executed by the processor) cause the mobile user device to communicate with the offers engine 12 and facilitate user interaction with data from the offers engine 12. The native application 52 and the web browser 50, upon rendering a webpage from the offers engine 12, may generally be referred to as client applications of the offers engine 12, which in some embodiments may be referred to as a server. Embodiments, however, are not limited to client/server architectures, and the offers engine 12, as illustrated, may include a variety of components other than those functioning primarily as a server.

The desk-top user device 32 may also include a web browser 54 that serves the same or similar role as the web browser 50 in the mobile user device 30. In addition, the desk-top user device 32 may include a monitor; a keyboard; a mouse; memory; a processor; and a tangible, non-transitory, machine-readable memory storing instructions that when executed by the processor provide an operating system and the web browser.

Third-party offer server 34 may be configured to embed data from the offers engine 12 in websites or other services provided by the third-party offer server 34. For example, third-party offer server 34 may be a server of a social networking service upon which users post comments or statistics about offers with which the user has interacted, or the users may use the offer server 34 to recommend offers to others or identify offers to avoid. In another example, third-party offer server 34 may include various services for publishing content to the Web, such as blogs, tweets, likes, dislikes, ratings, and the like. In another example, third-party offer server 34 provides services by which third-parties curate offers hosted by the offers engine 12.

Merchant servers 38, 40, and 42 host websites or other user accessible content interfaces by which users can accept offers hosted by the offers engine 12. In some embodiments, and in some use cases, the merchant servers 38, 40, and 42 host retail websites that present a plurality of items for sale by the merchant, a subset of which may include items to which offers apply, thereby generally making the item for sale more desirable to cost-sensitive consumers than under the terms presented by the merchant in the absence of the offer. For example, the offers may include free or discounted shipping, a discounted price, a bulk discount, a rebate, a referral award, or a coupon, such as a coupon acceptable by presenting a coupon code during checkout on the merchant website, or a printable or displayable coupon (e.g., on the screen of a mobile device) for in-store use, the printable or otherwise displayable coupon having, in some cases, a machine readable code (e.g., a bar code or QR code for display and scanning, or a code passed via near-field communication or Bluetooth™). In some embodiments, the merchant website includes a checkout webpage having an interface for the user to enter payment information and a coupon code, and the merchant website (either with logic on the client side or the server-side) may validate the coupon code entered by the user and, upon determining that the coupon code is valid, adjust the terms presented to the user for acceptance in accordance with the offer.

Some merchants may limit the number of uses of a given coupon, limit the duration over which the coupon is valid, or apply other conditions to use of the coupon, each of which may add to the burden faced by users seeking to find valid coupons applicable to an item the user wishes to purchase. As noted above, some embodiments of the offers engine 12 are expected to mitigate this burden.

Further, in some embodiments, the merchant servers 38, 40, and 42 provide data about offers to the offers engine 12 or (i.e., and/or, as used herein, unless otherwise indicated) data about transactions involving offers. In use cases in which the operator of the offers engine 12 has a direct affiliate-marketing relationship with one of the merchants of the merchant servers 38, 40, or 42, the transaction data may provide the basis for payments by the merchant directly to the operator of the offers engine 12. For example, payments may be based on a percentage of transactions to which offers were applied, a number of sales to which offers were applied, or a number of users who viewed or selected or otherwise interacted with an offer by the merchant.

Affiliate-network servers 44 and 46, in some embodiments and some use cases, are engaged when the entity operating the offers engine 12 does not have a direct affiliate-marketing relationship with the merchant making a given offer. In many affiliate marketing programs, merchants compensate outside entities, such as third-party publishers, for certain activities related to sales by that merchant and spurred by the outside entity. For example, in some affiliate marketing programs, merchants compensate an affiliate, such as the entity operating the offers engine 12, in cases in which it can be shown that the affiliate provided a given coupon code to a given user who then used that coupon code in a transaction with the merchant. Demonstrating this connection to the merchant is one of the functions of the affiliate-networks.

Affiliate-networks are used, in some use cases, because many coupon codes are not affiliate specific and are shared across multiple affiliates, as the merchant often desires the widest distribution of a relatively easily remembered coupon code. Accordingly, in some use cases, the merchant, affiliate network, and affiliate cooperate to use client-side storage to indicate the identity of the affiliate that provided a given coupon code to a user. To this end, in some embodiments, when a webpage offers interface is presented by the offers engine 12 in the web browsers 50 or 54, that webpage is configured by the offers engine 12 to include instructions to engage the affiliate network server 44 or 46 when a user selects an offer, for example, by clicking on, touching, or otherwise registering a selection of an offer. The website provided by the offers engine 12 responds to such a selection by, in some embodiments, transmitting a request to the appropriate affiliate-network server 44 or 46 (as identified by, for example, an associated uniform resource locator (URL) in the webpage) for a webpage or portion of a webpage (e.g., browser-executable content). The request to the affiliate-network server may include (e.g., as parameters of the URL) an identifier of the affiliate, the offer, and the merchant, and the returned content from the affiliate-network server may include instructions for the web browser 50 or 54 to store in memory (e.g., in a cookie, or other form of browser-accessible memory, such as a SQLite database or in a localStorage object via a localStorage.setItem command) an identifier of the affiliate that provided the offer that was selected.

The webpage from the offers engine 12 (or the content returned by the affiliate network server 44 or 46) may further include browser instructions to navigate to the website served by the merchant server 38, 40, or 42 of the merchant associated with the offer selected by the user, and in some cases to the webpage of the item or service associated with the offer selected by the user. When a user applies the offer, for example by purchasing the item or service or purchasing the item or service with the coupon code, the merchant server 38, 40, or 42 may transmit to the user device upon which the item was purchased browser instructions to request content from the affiliate network server 44 or 46, and this requested content may retrieve from the client-side memory the identifier of the affiliate, such as the operator of the offers engine 12, who provided the information about the offer to the user. The affiliate network may then report to the merchant the identity of the affiliate who should be credited with the transaction, and the merchant may compensate the affiliate (or the affiliate network may bill the merchant, and the affiliate network may compensate the affiliate), such as the operator of the offers engine 12. Thus, the affiliate network in this example acts as an intermediary, potentially avoiding the need for cross-domain access to browser memory on the client device, a feature which is generally not supported by web browsers for security reasons. (Some embodiments may, however, store in client-side browser-accessible memory an identifier of the affiliate upon user selection of the offer, with this value designated as being accessible via the merchant's domain, and provide the value to the merchant upon a merchant request following acceptance of the offer, without passing the identifier through an affiliate network, using a browser plug-in for providing cross-domain access to browser memory or a browser otherwise configured to provide such access.)

A similar mechanism may be used by the native application 52 for obtaining compensation from merchants. In some embodiments, the native application 52 includes or is capable of instantiating a web browser, like the web browser 50, in response to a user selecting an offer presented by the native application 52. The web browser instantiated by the native application 52 may be initialized by submitting the above-mentioned request for content to the affiliate-network server 44 or 46, thereby storing an identifier of the affiliate (i.e., the entity operating the offers engine 12 in this example) in client-side storage (e.g., in a cookie, localStorage object, or a database) of the mobile user device 28, and thereby navigating that browser to the merchant website. In other use cases, the operator of the offers engine 12 has a direct relationship with the merchant issuing the offer, and the selection of an offer within the native application 52 or the desktop or mobile website of the offers engine 12 (generally referred to herein as examples of an offer interface) may cause the user device to request a website from the associated merchant with an identifier of the affiliate included in the request, for example as a parameter of a URL transmitted in a GET request to the merchant server 38, 40, or 42 for the merchant's website.

Administrator device 36 may be a special-purpose application or a web-based application operable to administer operation of the offers engine 12, e.g., during use by employees or agents of the entity operating the offers engine 12. In some embodiments, the administration module 22 may communicate with the administrator device 36 to present an administration interface at the administrator device 36 by which an administrator may configure offers interfaces presented to users by the offers engine 12. In some embodiments, the administrator may enter offers into the offers engine 12; delete offers from the offers engine 12; identify offers for prominent placement within the offers interface (e.g., for initial presentation prior to user interaction); moderate comments on offers; view statistics on offers, merchants, or users; add content to enhance the presentation of offers; or categorize offers.

Thus, the offers engine 12, in some embodiments, operates in the illustrated environment by communicating with a number of different devices and transmitting instructions to various devices to communicate with one another. The number of illustrated merchant servers, affiliate network servers, third-party servers, user devices, and administrator devices is selected for explanatory purposes only, and embodiments are not limited to the specific number of any such devices illustrated by FIG. 1.

The offers engine 12 of some embodiments includes a number of components introduced above that facilitate the discovery of offers by users. For example, the illustrated API server 16 may be configured to communicate data about offers via an offers protocol, such as a representational-state-transfer (REST)-based API protocol over hypertext transfer protocol (HTTP). Examples of services that may be exposed by the API server 18 include requests to modify, add, or retrieve portions or all of user profiles, offers, or comments about offers. API requests may identify which data is to be modified, added, or retrieved by specifying criteria for identifying records, such as queries for retrieving or processing information about particular categories of offers, offers from particular merchants, or data about particular users. In some embodiments, the API server 16 communicates with the native application 52 of the mobile user device 28 or the third-party offer server 34.

The illustrated web server 18 may be configured to receive requests for offers interfaces encoded in a webpage (e.g. a collection of resources to be rendered by the browser and associated plug-ins, including execution of scripts, such as JavaScript™, invoked by the webpage). In some embodiments, the offers interface may include inputs by which the user may request additional data, such as clickable or touchable display regions or display regions for text input. Such inputs may prompt the browser to request additional data from the web server 18 or transmit data to the web server 18, and the web server 18 may respond to such requests by obtaining the requested data and returning it to the user device or acting upon the transmitted data (e.g., storing posted data or executing posted commands). In some embodiments, the requests are for a new webpage or for data upon which client-side scripts will base changes in the webpage, such as XMLHttpRequest requests for data in a serialized format, e.g. JavaScript™ object notation (JSON) or extensible markup language (XML). The web server 18 may communicate with web browsers, such as the web browser 50 or 54 executed by user devices 30 or 32. In some embodiments, the webpage is modified by the web server 18 based on the type of user device, e.g., with a mobile webpage having fewer and smaller images and a narrower width being presented to the mobile user device 30, and a larger, more content rich webpage being presented to the desk-top user device 32. An identifier of the type of user device, either mobile or non-mobile, for example, may be encoded in the request for the webpage by the web browser (e.g., as a user agent type in an HTTP header associated with a GET request), and the web server 18 may select the appropriate offers interface based on this embedded identifier, thereby providing an offers interface appropriately configured for the specific user device in use.

The illustrated ingest module 20 may be configured to receive data about new offers (e.g., offers that are potentially not presently stored in the data store 24), such as data feeds from the affiliate network servers 44 and 46, identifications of offers from user devices 28, 30, or 32, offers identified by third-party offer server 34, offers identified by merchant servers 38, 40, or 42, or offers entered by an administrator via the administrator device 36. In some embodiments, the ingest module 20 may respond to receipt of a record identifying a potentially new offer by querying the data store 24 to determine whether the offer is presently stored. Upon determining that the offer is not presently stored by the data store 24, the ingest module 20 may transmit a request to the data store 24 to store the record. In some cases, the data about new offers may be an affiliate data-feed from an affiliate network containing a plurality of offer records (e.g., more than 100), each record identifying offer terms, a merchant, a URL of the merchant associated with the offer, a product description, and an offer identifier. The ingest module 22 may periodically query such data-feeds from the affiliate-network servers 44 or 46, parse the data-feeds, and iterate through (or map each entry to one of a plurality of processes operating in parallel) the records in the data-feeds. Bulk, automated processing of such data-feeds is expected to lower operating costs of the offers engine 12.

The administration module 22 may provide an interface by which an administrator operating the administrator device 36 curates and contextualizes offers. For example, the administration module 22 may receive instructions from administrator that identify offers to be presented in the offer interface prior to user interaction with the offer interface, or offers to be presented in this initialized offers interface for certain categories of users, such as users having certain attributes within their user profile. Further, in some embodiments, the administration module 22 may receive data descriptive of offers from the administrator, such as URLs of images relevant to the offer, categorizations of the offer, normalized data about the offer, and the like.

The illustrated data store 24, in some embodiments, stores data about offers and user interactions with those offers. The data store 24 may include various types of data stores, including relational or non-relational databases, document collections, hierarchical key-value pairs, or memory images, for example. In this embodiment, the data store 24 includes a user data store 56, a session data store 58, an offers data store 60, and an analytics data store 62. These data stores 56, 58, 60, and 62 may be stored in a single database, document, or the like, or may be stored in separate data structures.

In this embodiment, the illustrated user data store 56 includes a plurality of records, each record being a user profile and having a user identifier, a list of offers (e.g., identifiers of offers) identified by the user as favorites, a list of categories of offers identified by the user as favorites, a list of merchants identified by the user as favorites, account information for interfacing with other services to which the user subscribes (e.g., a plurality of access records, each record including an identifier of a service, a URL of the service, a user identifier for the service, an OAuth access token credential issued by the service at the user's request, and an expiration time of the credential), a user password for the offers engine 12, a location of the user device or the user (e.g., a zip code of the user), and a gender of the user. In some embodiments, each user profile includes a list of other users identified by the user of the user profile as being people in whose commentary on, or curation of, offers the user is interested, thereby forming an offers-interest graph. In some embodiments, users have control of their data, including what is stored and who can view the data, and can choose to opt-in to the collection and storage of such user data to improve their experience with the offers engine 12.

In this embodiment, the session data store 58 stores a plurality of session records, each record including information about a session a given user is having or has had with the offers engine 12. The session records may specify a session identifier, a user identifier, and state data about the session, including which requests have been received from the user and what data has been transmitted to the user. Session records may also indicate the IP address of the user device, timestamps of exchanges with the user device, and a location of the user device (e.g., retail store or aisle in a retail store in which the user device is located).

The illustrated offers data store 60, in some embodiments, includes a plurality of offer records, each offer record may identify a merchant, offers by that merchant, and attributes of the relationship with the merchant, e.g., whether there is a direct relationship with the merchant by which the merchant directly compensates the operator of the offers engine 12 or whether the merchant compensates the operator of the offers engine 12 via an affiliate network and which affiliate network. The offers by each merchant may be stored in a plurality of merchant-offer records, each merchant-offer record may specify applicable terms and conditions of the offer, e.g., whether the offer is a discount, includes free or discounted shipping, requires purchase of a certain number of items, is a rebate, or is a coupon (which is not to suggest that these designations are mutually exclusive). In records in which the offer is a coupon, the record may further indicate whether the coupon is for in-store use (e.g. whether the coupon is associated with a printable image for presentation at a point-of-sale terminal, a mobile device-displayable image, or other mediums) or whether the coupon is for online use and has a coupon code, in which case the coupon code is also part of the merchant-offer record. The merchant-offer records may also include an expiration date of the offer, comments on the offer, rankings of the offer by users, a time at which the offer was first issued or entered into the offers engine 12, and values (e.g., binary values) indicating whether users found the offer to be effective, with each value or ranking being associated with a timestamp, in some embodiments. The values and rankings may be used to calculate statistics indicative of the desirability of the offer and likely success of accepting the offer. The timestamps associated with the values, rankings, and time of issuance or entry into the offers engine 12 may also be used to weight rankings of the offer, with older values being assigned less weight than newer values and older offers being ranked lower than newer offers, all other things being equal, as many offers expire or have a limited number of uses.

The illustrated analytics data store 62 may store a plurality of records about historical interactions with the offers engine 12, such as aggregate statistics about the performance of various offers. In some embodiments, the analytics data store 62 stores a plurality of transaction records, each transaction record identifying an offer that was accepted by a user at a merchant, the merchant, the time of presentation of the offer to the user, and an indicator of whether the merchant has compensated the entity operating the offers engine 12 for presentation of the offer to the user. Storing and auditing these transaction records is expected to facilitate relatively accurate collection of payments owed by merchants and identification of future offers likely to lead to a relatively high rates of compensation for prominent presentation based on past performance of offers having similar attributes.

The cache server 23 stores a subset of the data in the data store 24 that is among the more likely data to be accessed in the near future. To facilitate relatively fast access, the cache server 23 may store cached data in relatively high speed memory, such as random access memory or a solid-state drive. The cached data may include offers entered into the offers engine 12 within a threshold period of time, such as offers that are newer than one day. In another example, the cache data may include offers that are accessed with greater than a threshold frequency, such as offers that are accessed more than once a day, or offers accessed within the threshold, such as offers accessed within the previous day. Caching such offer data is expected to facilitate faster access to offer data than systems that do not cache offer data.

The illustrated control module 14, in some embodiments, controls the operation of the other components of the offers engine 12, receiving requests for data or requests to add or modify data from the API server 16, the web server 18, the ingest module 20, and the administration module 22, and instructing the data store 24 to modify, retrieve, or add data in accordance with the request. The control module 14 may further instruct the cache server 23 to modify data mirrored in the cache server 23. In some embodiments, the cache server 23 may be updated hourly, and inconsistent data may potentially be maintained in the cache server 23 in order to conserve computing resources.

The illustrated components of the offers engine 12 are depicted as discrete functional blocks, but embodiments are not limited to systems in which the functionality described herein is organized as illustrated by FIG. 1. The functionality provided by each of the components of the offers engine 12 may be provided by software or hardware modules that are differently organized than is presently depicted, for example such software or hardware may be intermingled, broken up, distributed (e.g. within a data center or geographically), or otherwise differently organized. The functionality described herein may be provided by one or more processors of one or more computers executing code stored on a tangible, non-transitory, machine readable medium.

Figure 2:
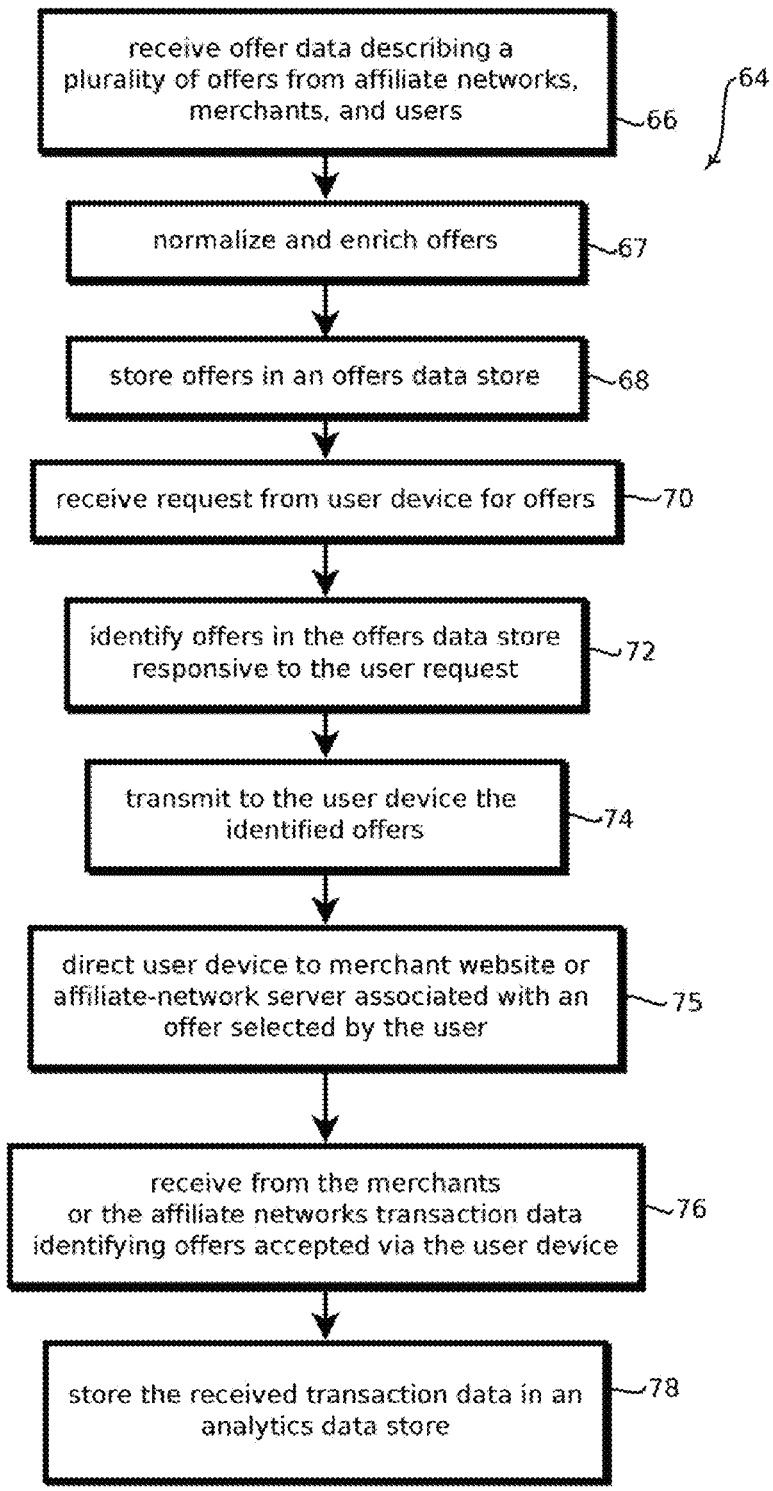
FIG. 2 illustrates an example of a process by which an offers engine in the offer-discovery system of FIG. 1, in some embodiments, obtains and processes data related to offers.

FIG. 2 is a flowchart of a process 64 for acquiring data related to offers within some embodiments of the offer engine 12 discussed above. In this embodiment, the process 64 begins with receiving offer data describing a plurality of offers from affiliate networks, merchants, and users, as illustrated by block 66. This step may be performed by the above-mentioned ingest module 20. As noted above, the received offer data may be received from one or all of these sources. The received offer data may be received via an offer interface by which users associated with these sources enter data about offers, or the received offer data may be received in a predefined format, such as a serialized data format, in an automatic data feed pushed or pulled periodically or in response to the availability of new data from affiliate networks or merchants. Receiving the offer data may include determining whether the offer data is redundant to offer data already received and normalizing the offer data.

The process 64, in some embodiments, includes normalizing and enriching the offer data. Normalizing may include normalizing field names of the data and normalizing the way in which dates are expressed, for example. Enriching may include associating images with the offers for presentation with the offers and adding metadata to the offers to assist users searching for offers.

Next, in the present embodiment, the received offer data is stored in an offer data store, as indicated by block 68. Storing the offer data in the offer data store may include identifying a merchant to which the offer pertains and storing the offer in a merchant-offer record associated with that merchant. Further, some embodiments may include inserting the offer in order in a sorted list of offers for relatively fast retrieval of offers using a binary search algorithm or other techniques to facilitate relatively quick access to data that has been preprocessed (e.g., using a prefix trie). In some embodiments, storing the received offer may further include updating hash tables by which the offer may be retrieved according to various parameters, each hash table being associated with one parameter and including a hash key value calculated based on the parameter and paired with an address of the offer. Such hash tables are expected to facilitate relatively fast access to a given offer as the need to iterate through potentially all offers meeting certain criteria may be potentially avoided.

In some embodiments, the process 64 further includes receiving a request from a user device for offers, as indicated by block 70. The request may specify criteria for identifying offers, such as categories of offers, search terms for offers, or requests for offers designated as favorites.

Next, the present embodiment includes identifying offers in the offer data store responsive to the user request, as indicated by block 72. Identifying offers in the offer data store may be performed by the above-mentioned controller 14 (FIG. 1) by constructing a query to the offer data store 60 based on a request received from the web server 18 or the API server 16. The query may be transmitted to the offer data store 60, or to the cache server 23, each of which may return responsive records.

Next, the identified offers are transmitted to the user device, as indicated by block 74. Transmitting the identified offers may include transmitting the identified offers in an offer interface, such as a webpage, or an API transmission to a native mobile application, for example by the web server 18, or the API server 16 of FIG. 1, respectively.

The device receiving the identified offers may, in response, perform a process described below with reference to FIG. 3 by which additional offers are requested or an offer is selected and a purchase is executed. This process of FIG. 3 and steps 70 through 74 of FIG. 2 may be repeated numerous times, in some use cases, before advancing to the next steps. Further, the steps 66 through 68 may be repeated numerous times independently of (e.g., concurrent with) the performance of steps 70 through 74 of FIG. 2 (which is not to suggest that other steps described herein may not also be executed independently). That is, the process 64 may undergo step 66 through 68, for example, 50 times within a given time, while performing steps 70 through 74 500 times within that given time, and performing the remaining steps of process 64 a single time.

Figure 3:
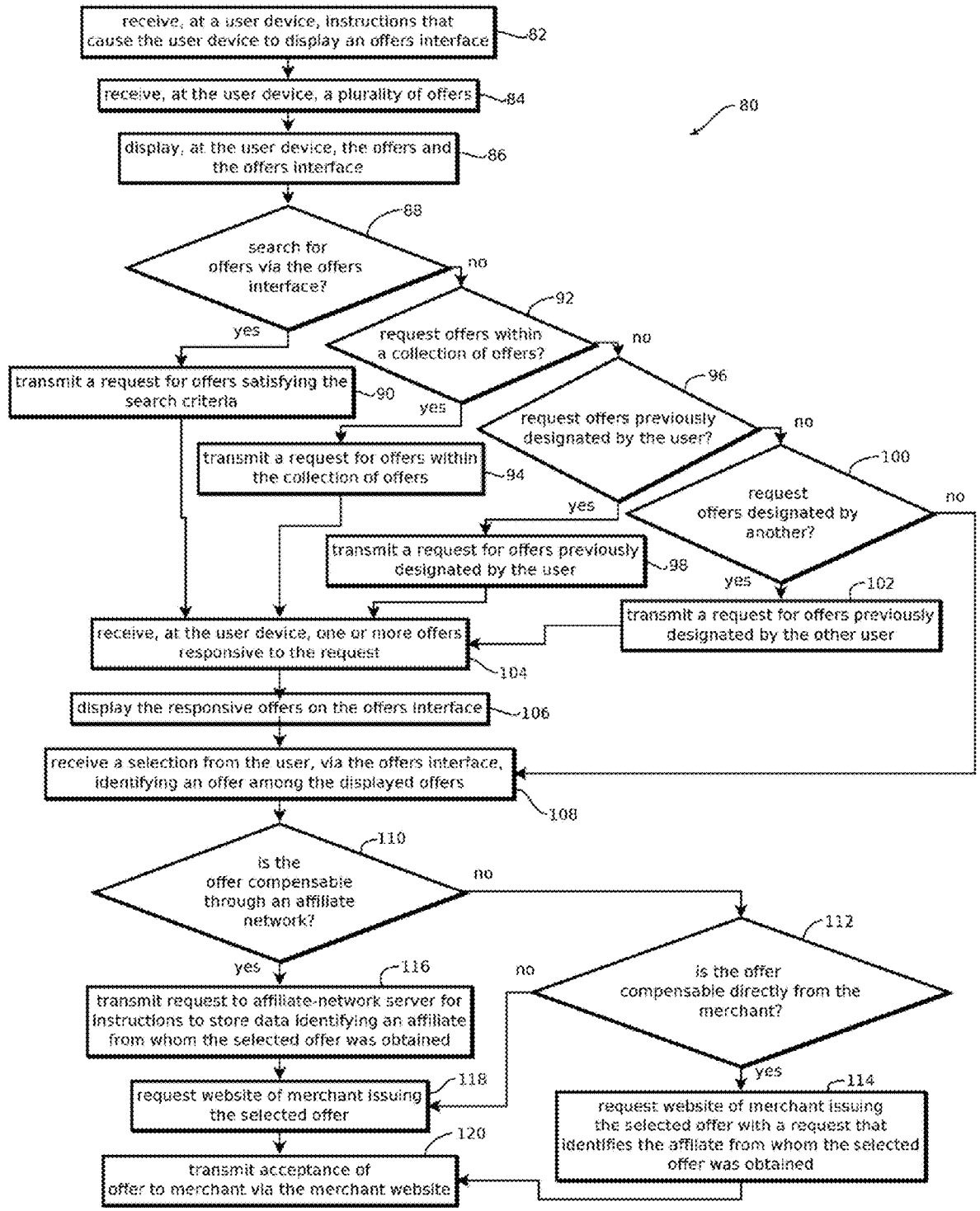
FIG. 3 illustrates an example of a process by which a user device in the offer-discovery system of FIG. 1, in some embodiments, obtains and presents to users data related to offers.

In some embodiments, a user device undergoing the process of FIG. 3 may indicate to an offers engine that the user has selected an offer (e.g., by clicking on or touching a selectable element in an offers interface associated with the offer). In response, the offers engine may direct the user device to an affiliate-network server or a merchant server associated with the offer, as illustrated by block 75.

Next, this embodiment of the process 64 includes receiving from merchants or affiliate networks transaction data identifying offers accepted via the user device, as illustrated by block 76. The transaction data may be pulled from these sources, for example, by the ingest module 20 of FIG. 1, periodically, or in response to some threshold number of transactions having occurred.

Next, in this embodiment, the receipt transaction data may be stored in an analytics data store, as indicated by block 78. In some embodiments, this data may be stored in the analytics data store 62 of FIG. 1. Storing the transaction data is expected to facilitate the identification of attributes of relatively profitable offers, as the transaction data indicates which offers historically yielded compensable transactions. Further, storing the transaction data is expected to facilitate relatively accurate auditing of payments from merchants or affiliate networks.

FIG. 3 is a flowchart of an embodiment of a process 80 that provides an example of an offer interface at a user device. The process 80 may be performed by the above-mentioned native application 52 or web browser 50 or 54 in cooperation with the offers engine 12.

Some embodiments of process 80 begin with receiving, at a user device, instructions that cause the user device to display an offers interface, as indicated by block 82. The received instructions may be in the form of a downloaded native application, such as one downloaded from an application store hosted by a provider of mobile devices, or the received instructions may be in the form of a website received from the offers engine 12 and rendered in a browser of the user device.

In some embodiments, the process 80 further includes receiving, at the user device, a plurality of offers, as indicated by block 84, and displaying, at the user device, the offers in the offer interface, as indicated by block 86. The offers may be received at approximately the same time the instructions of step 82 are received, for example along with a webpage, or the offers may be received at a later date, for example during a session subsequent to downloading the native application.

The offers interface may include inputs by which the user may search, filter, or otherwise browse offers having various attributes. Some of these interfaces are described below with reference to steps performed to determine whether the user has engaged these inputs. In some embodiments, determining whether the user has engaged these inputs may be performed by an event handler executed by the user device, the event handler causing the user device to perform the corresponding, below-described requests to the offers engine 12 based on the type of event, e.g., whether the user touched, clicked, or otherwise selected a particular button on the offers interface.

Illustrated process 80 includes determining whether the user is searching for offers, as indicated by block 88. With the offers interface, the user may express their intention to search for offers by entering search terms in a text entry box and selecting a button to request a search in accordance with the entered search term. Upon selecting this button, the user device may transmit a request for offers satisfying the entered search criteria, as indicated by block 90. The transmitted request may be in the form of a GET request or an API call to the web server 18 or the API server 16 of the offers engine 12 of FIG. 1.

In some embodiments, the process 80 further includes determining whether the user requests offers within a collection of offers, as indicated by block 92. The offers interface may include selectable inputs that identify the collections, such as clickable collection names, collection selection buttons, or collection selection tabs. Examples of collections include categories of goods or services, such as sporting goods, house-wares, groceries, and the like; collections of modes of coupon redemption, such as in-store coupon redemption and online coupon redemption; collections based on offer statistics, such as newest offers, most popular offers, highest ranked offers; collections of offers designated by a user or other users; or collections based the value conferred by the offer, such as discounts, free shipping, rebates, and referral fees. Upon determining that the user has requested offers within a collection, the user device may transmit a request for offers within the collection to the offers engine 12, as indicated by block 94, which may return data responsive to the request.

In some embodiments, the process 80 includes determining whether the user requests offers previously designated by the user, as indicated by block 96. In some embodiments, the offers interface may include an input by which a user can designate an offer, such as designating offers as being a user favorite, designating offers as being ranked in a particular fashion, or designating offers as likely being of interest to some other user, such as users adjacent one another in a social graph. The offers interface may include an input for a user to make designations, such as a user selectable input labeled "add to my favorites," or "add to my wallet," and an input for a user to request offers having a designation, such as a user selectable input labeled "view my favorites," or "view my wallet." Upon determining that the user made such a request, the process 80 includes transmitting a request for the offers previously designated by the user, as indicated by block 88. The transmission may be made to the offers engine 12, to the API server 16 or the web server 18, as described above with reference to FIG. 1, and may include an identification of the designation and the user.

The process 80, in some embodiments, further includes determining whether the user requests offers previously designated by another user, as indicated by block 100. The offers interface, in some embodiments, may include an input by which a user makes such a request, such as a user selectable input labeled "offers recommended by my friends." Upon determining that the user has made such a request, the process 80 transmits a request for offers previously designated by the other user (or users), as indicated by block 102. Again, the transmission may be to the offers engine 12 of FIG. 1, which may store or otherwise have access to offers designated by other users and a social graph of the user by which responsive offers are identified. Further, the offers interface may include an input by which the user may view identifiers of other users and add the other users to an offer-interest graph of the user. This offer interest graph may be referenced by the offers engine 12 to identify offers in response to the request of step 102.

The process 80 further includes, in some embodiments, receiving, at the user device, one or more offers responsive to the request, as indicated by block 104, and displaying the responsive offers on the offers interface, as indicated by block 106.

In some embodiments and some use cases, a selection from the user is received via the offers interface, thereby identifying an offer among the displayed offers, as indicated by block 108. In some embodiments, each of the offers may be displayed with an associated input by which the user selects the offer, such as a touchable or clickable button, region, or text. The selection, in some embodiments, may cause the offers interface to request additional data from the offers engine, such as instructions from the offers engine to navigate to an affiliate-network server associated with the offer or to navigate to a merchant server associated with the offer. In other embodiments, such instructions may be present within the offers interface, e.g., in the form of URLs linking to these servers.

The process 80 further includes determining whether the selected offer is compensable through an affiliate network, as indicated by block 110. This determination may be made by the offers engine 12, in some embodiments, for each of the offers being displayed prior to transmission of the offers to the user device. For example, each offer may be associated with a designation indicating whether the offer is compensable in this fashion, and the designation may be transmitted along with the offer, for instance, by associating the offer with HTML or JavaScript™ that so designate the offer, or by including a field including the designation in a response to an API call for each offer. The user device, in some embodiments, may take different actions depending on the designation associated with the selected offer.

Upon determining that the selected offer is not compensable through an affiliate network, the process 80 of this embodiment includes determining whether the selected offer is compensable directly from the merchant associated with the offer, as indicated by block 112. Again, the determination of block 112 may be performed, in some embodiments, by the offers engine 12 for each of the offers being displayed prior to transmission of the displayed offers, and each displayed offer may be associated with a designation based on the results of the determination, such as different HTML or JavaScript™ or a different field value in an API response. The user device may take different actions depending on this designation.

Upon determining that the selected offer is not compensable directly from the merchant, the process 80 may proceed to block 118 described below. Upon determining that the selected offer is compensable, the process 80, in this embodiment, may proceed to request the website of the merchant issuing the selected offer with a request that identifies the affiliate from whom the selected offer was obtained, as indicated by block 114. The request may be in the form of a URL having as a parameter an identifier of the entity operating the offer engine 12, thereby indicating to the merchant that the affiliate should be compensated in accordance with an arrangement between the merchant and the affiliate. Upon performance of step 114, the process 80 of the present embodiment proceeds to step 120 described below.

As indicated by block 110, upon determining that the selected offer is compensable through an affiliate network, the process 80 proceeds to transmit a request to the affiliate-network server for instructions to store data identifying an affiliate from whom the selected offer was obtained, as indicated by block 116. This request may be a request for content from the affiliate-network server that is not displayed to the user, or is not displayed to the user for an appreciable amount of time (e.g., less than 500 ms), and the request may include an identifier of the affiliate, the merchant, and the offer. The requested content may cause the user device to store in persistent memory of the browser of the user device (e.g., memory that lasts between sessions, such as a cookie or a database of the browser) an identifier of the affiliate operating the offers engine 12. This value may be retrieved later by the affiliate-network at the instruction of the merchant upon the user accepting the offer, for example by the user using a coupon code associated with the offer at the merchant, thereby allowing the merchant (or the affiliate network) to identify the appropriate party to compensate for the sale.

Upon transmitting the request the affiliate network server, the process 80 further includes requesting the website of the merchant issuing the selected offer, as indicated by block 118, and transmitting acceptance of the offer to the merchant via the merchant's website, as indicated by block 120. Accepting the offer, as noted above, may cause the merchant to compensate the affiliate operating the offers engine 12.

The process 80 of FIG. 3 is expected to facilitate relatively fast access to offers that are likely to be relevant to a user, as each of the determinations of step 88, 92, 96, and 100 provide different paths by which the user can specify offers in which the user is likely to be interested. Further, the determinations of step 110 and 112 provide dual mechanisms by which the operator of the offers engine 12 can be compensated, thereby potentially increasing revenue.

As mentioned above, offers may include offers redeemable at a merchant facility (e.g., a retail store) and may be referred to as "in-store offers." In some embodiments, the offers engine 12 may provide such offers to a user in response to a user's traversal of a geofence. As used herein, the term "geofence" refers to a virtual perimeter for a real-world geographic area. As described further below, when a user crosses a geofence, offers relevant to merchant facilities within the geographic area of the geofenced perimeter are provided to the user via a user device. The geographic area may include, for example, an indoor shopping mall, an outdoor shopping mall, a shopping district, an airport, or any other suitable geographic area having merchant facilities.

Figure 4:
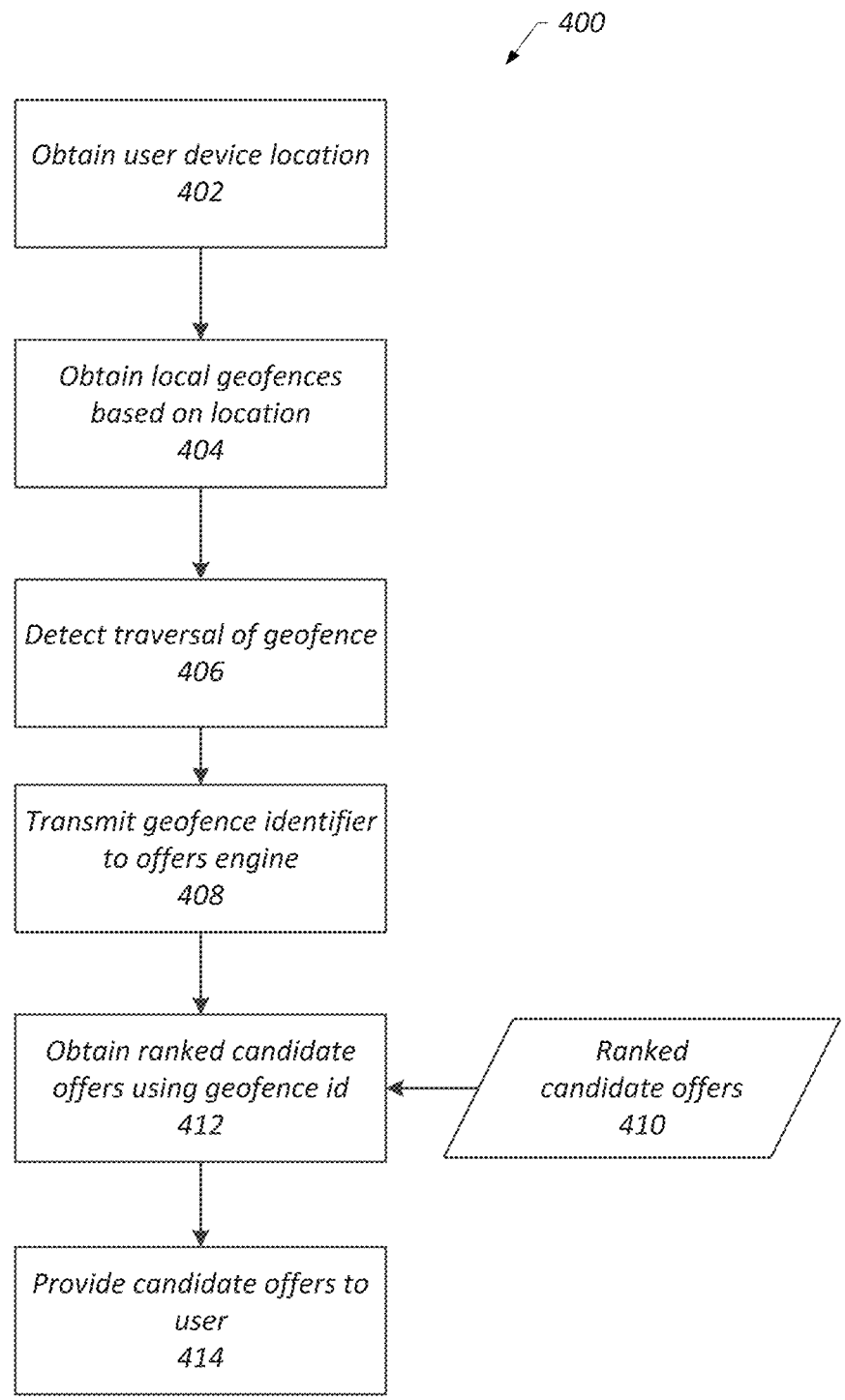
FIG. 4 is a block diagram of a process for obtaining offers in response to traversal of a geofence in accordance with some embodiments.

FIG. 4 depicts a process 400 for obtaining offers in response to traversal of a geofence in accordance with some embodiments. The process 400 may be executed by, for example, a user device such as the mobile user device 28. In such embodiments, some or all steps of the process 400 may be implemented via the native application 52 executed by the mobile user device 28. Initially, the current user device location is obtained (block 402). As will be appreciated, in some embodiments the current user device location is obtained via communication with a satellite-based positioning system (e.g., GPS). In some embodiments, other suitable locating techniques, such as Wi-Fi based locating, IP address geolocation, or other techniques may be used alone or in combination with other locating techniques.

Next, local geofences are obtained based on the user device location (block 404). The local geofences may be obtained from the offers engine 12 and may be stored (e.g., cached) in a memory of the user device. The local geofences may be selected from a database of geofences based on the proximity of the user location to each of the geofence locations. The proximity for selecting the local geofences may vary based on factors such as the user's location at a given point in time or the user's location over a set of points in time. In some embodiments, a geofence may defined by a polygon enclosing an area. The polygons may be defined via coordinates, such as latitude and longitude coordinates. In other embodiments, a geofence may be defined by a center point and a radius. Thus, in some embodiments, a geofence may be stored by storing the coordinates or center point and radius that define the geofence.

The offers engine 12 may store defined geofences (e.g., polygons, center points and radii, etc.) for providing to a user device. Each geofence may be assigned a unique geofence identifier. Additionally, the offers engine 12 may store additional data associated with a geofence. In some embodiments, the additional data may include a list of merchants associated with the geofence. For example, if the geofence corresponds to real-world shopping mall, the list of merchants associated with the geofence may correspond to the some or all of the stores in the shopping mall. In some embodiments, the obtained geofences and geofence identifiers may be stored (e.g., cached) on the user device. In some embodiments, only the geofence, geofence identifiers may be stored on the user device, such that the additional data associated with a geofence is not stored on the user device, thus minimizing memory usage of the cached geofences.

Next, the traversal of a geofence is detected (block 406). For example, after a user carrying a mobile user device crosses a geofence, the crossing is detected and used in the processing described further below. In some embodiments, the mobile user device may include a program (e.g., a native service or application) that monitors the location of the mobile user device and determines traversal of a geofence. In some embodiments, a program of the mobile user device may monitor the geofences stored (e.g., cached) on the mobile user device and detect traversal of a stored geofence. In some embodiments, an operating system of the mobile user device may provide a framework, advanced programming interface (API) or other components (e.g., the Core-Location Framework provided by Apple, Inc., of Cupertino, Calif.) for determining the location of a mobile user device. In some embodiments for example, the mobile user device may use a service provided by Localpoint® Platform provided by 30 Second Software, Inc. d/b/a Digby of Austin, Tex. or the Gimbal® Platform by Qualcomm Labs, Inc. It should be appreciated that such services may be event-based and may detect generation of an event when the location of the mobile user device changes, such as when the location changes by greater than a threshold amount, changes with respect to detected wireless networks, changes with respect to cellular network towers, and so on. Moreover, it should be appreciated that such services may be selected and implemented with the desire to limit power consumption and maximize battery life of a mobile user device.

After traversal of a geofence, the geofence identifier is transmitted to the offers engine 12 for a determination of relevant candidate offers (block 408). As illustrated in FIG. 4 and described further below, the offers engine 12 may determine candidate offers for the merchants associated with the transmitted geofence identifier. Next, ranked candidate offers 410 are obtained from the offers engine 12 (block 412). In some embodiments, the candidate offers data (e.g., images, text, and other data) is transmitted to and stored (e.g., cached) on the mobile user device. As mentioned above, the candidate offers 410 are determined to be relevant to the merchants associated with the geofence identifier, e.g., the retail stores in a shopping mall within a traversed geofence. Thus, after a user enters a shopping mall or other geofenced geographic area, the user's mobile user device may receive and have access to relevant offers.

Next, the candidate offers are provided to the user via the mobile user device (block 414). In some embodiments, as described below, a notification may be displayed in a user interface of the mobile user device that indicates that offers for the geographic area are available. A user may select the notification to view some or all of the candidate offers. In some embodiments, the candidate offers are provided using a candidate offer flow that is a sequence of candidate offers provided to the user based on flow criteria. As will be appreciated, the candidate offers may be displayed on a display of a mobile user device. In such embodiments, a candidate offer may be displayed in a notification bar or other area of a user interface of a mobile user device. The user may access the relevant offers and purchase goods or services from a merchant after receiving a relevant offer. The flow criteria may include a time period between offers, a score threshold for each candidate offer, a maximum number of candidate offers in a time period, or any combination thereof. For example, the flow criteria may specific a time period between candidate offers, so that the next candidate offer is only displayed after the first candidate offer has been displayed for the time period. In another example, a score threshold may be required for a candidate offer to be provided to a user in the candidate offer flow. In another example, a maximum number of candidate offers in a time period, such that if the maximum number of candidate offers is reached within the time period, no further candidate offers are display until the time period has elapsed.

Figure 5:
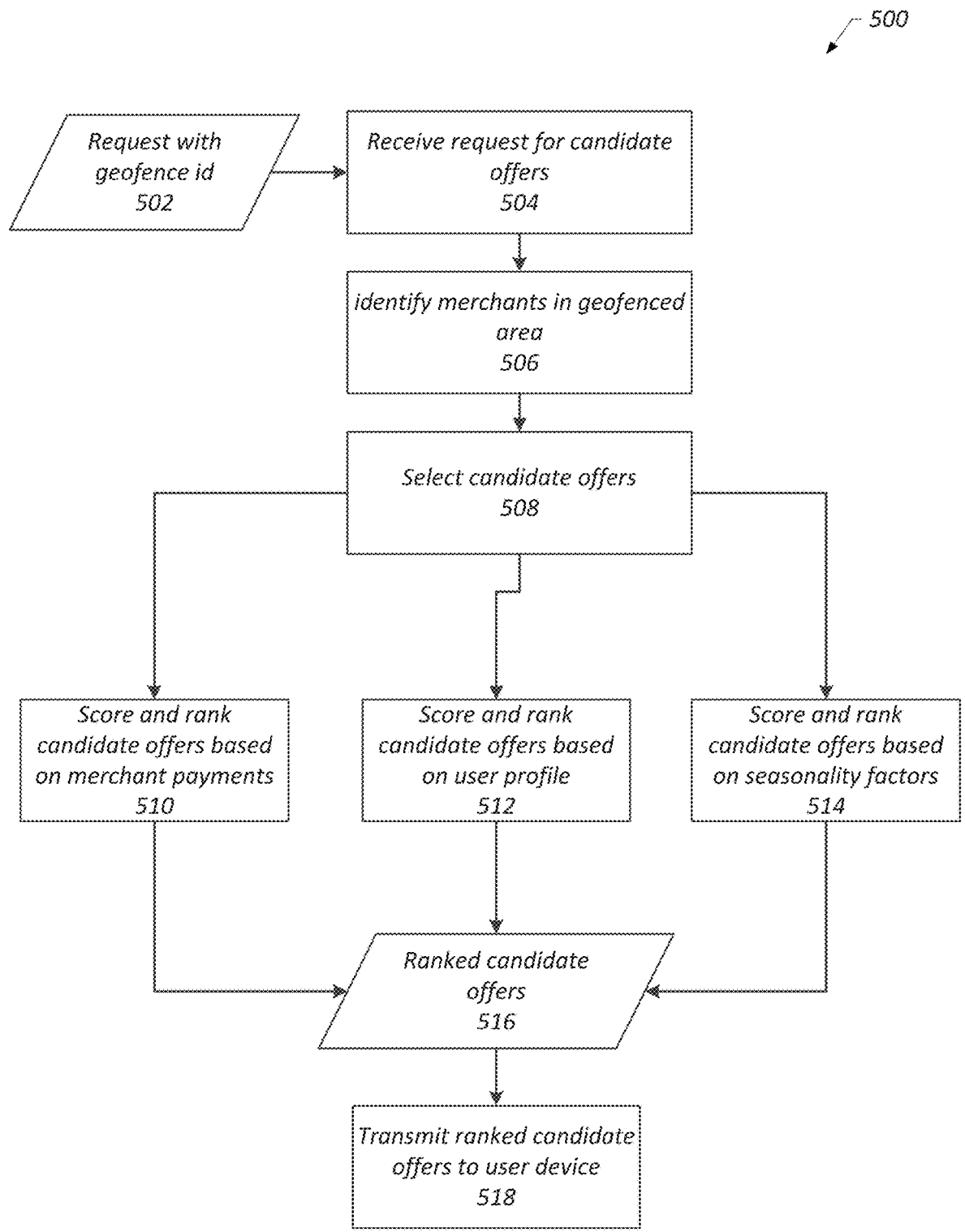
FIG. 5 is a block diagram of a process for determining candidate offers in accordance with some embodiments.

FIG. 5 depicts a process 500 for determining candidate offers in accordance with an embodiment of the present invention. The process 500 may be performed by the offers engine 12 in response to a request received from a mobile user device, e.g. mobile user device 28. Initially, a request 502 for candidate offers that has a geofence identifier is received from a mobile user device (block 504). Using the geofence identifier, merchants within the geofenced geographic area are identified (block 506). As described above, geofences stored by the offers engine 12 may be associated with additional data, such as a list of merchants. Thus, after receiving a geofence identifier, the offers engine may identify the list of merchants associated with the geofence identified by the geofence identifier. Next, candidate offers associated with the identified merchants are selected (block 508). As described above, merchant servers provided data to the offers engine 12 regarding offers, and each merchant-offer record may specify applicable terms and conditions of the offers. Thus, when selecting candidate offers, any of the applicable terms and conditions may be used as selection criteria. For example, when providing offers based on a geofenced real-world location, only in-store offers of identified merchants may be selected. Additionally, offers may include offers data about the offer, such as an image of a machine-readable code (e.g., a bar code) to enable redemption an offer.

Next, as described further below, the selected candidate offers may be scored and ranked to produce ranked candidate offers. In some embodiments, only one of the described scorings and associated rankings may be used. In other embodiments, composite scores and rankings using some or all of the described scorings and rankings may be used. Moreover, it should be appreciated that other types of scorings and rankings may be used in addition to as an alternative to the rankings described herein. Moreover, it should be appreciated that a merchant may have one or more candidate offers. In some embodiments, merchants may be sorted by alphabetical order and the candidate offers within each merchant may be ranked according to any one of or combination of the rankings described herein.

In some embodiments, the candidate offers are scored and ranked based on merchant payments for use of the offers (block 510). For example, a first merchant may pay a first payment amount for a first candidate offer, and a second merchant may pay a lower payment amount for a second candidate offer. The first candidate offer of the first merchant associated with the higher payment amount may be scored higher and ranked above the second candidate offer for the second merchant. In some embodiments, candidate offers are scored and ranked based on the likelihood of the user using the offer (block 512), as determined from a user profile associated with the user. For example, the user profile may include previously selected offers, merchants, categories, or any combination thereof, previously ranked offers, merchants, categories, or any combination thereof, and previously shared offers, merchants, categories, or any combination thereof. The user profile may also include the redemption rate of offers and statistics from other similar users. Additionally, in some embodiments the user profile may include the merchants, geofences, or combination thereof frequented by the user. For example, if a user frequents a golf store merchant, golf-related candidate offers may be ranked higher. In another example, if a user is within a geofence for a threshold time period, some candidate offers may be scored and ranked higher.

In some embodiments, the candidate offers are scored and ranked based on seasonality factors (block 514). In such embodiments, some candidate offers may be associated with specific seasons, and such candidate offers may be scored and ranked higher if the associated season matches the current season. For example, is a candidate offer is for sporting goods equipment, the candidate offer may be associated with a summer season and may be ranked higher if the current season is the summer season. Moreover, in some embodiments the candidate offers may be ranked based on time of day (e.g., at 12:00 pm for candidate offers related to lunches), day of the week (e.g., weekends for candidate offers related to weekend services or products) and so on. As mentioned above, any one of or combination of the scorings and rankings may be used to produce ranked candidate offers 516. In some embodiments, the candidate offers are scored and ranked based on their popularity, e.g., the number of users who select a candidate offer, the number of users who redeem a candidate offer, or other suitable popularity metrics. Additionally, in some embodiments curated offers (i.e., "hand-picked" offers) may be scored and ranked higher than other candidate offers. After determining the ranked candidate offers, the ranked candidate offers 516 are transmitted to the user device that send the initial request (block 518). For example, the ranked candidate offers may be transmitted from the offers engine 12 to the mobile user device 28 via the network 48.

Figure 6A:
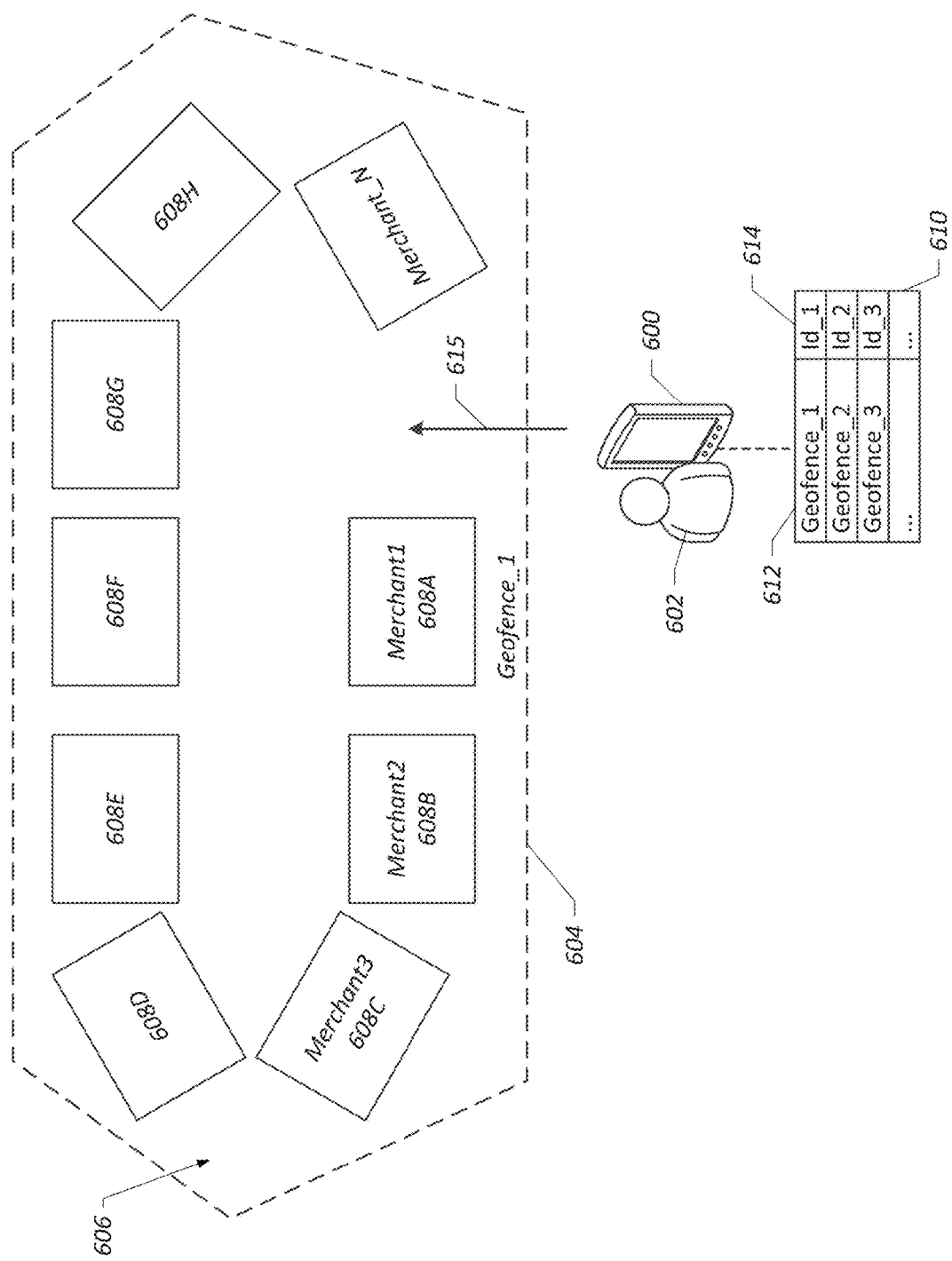
FIGS. 6A and 6B are schematic diagrams that depict a mobile user device of a user interacting with a geofence 604 that encloses a geographic area in accordance with some embodiments.
Figure 6B:
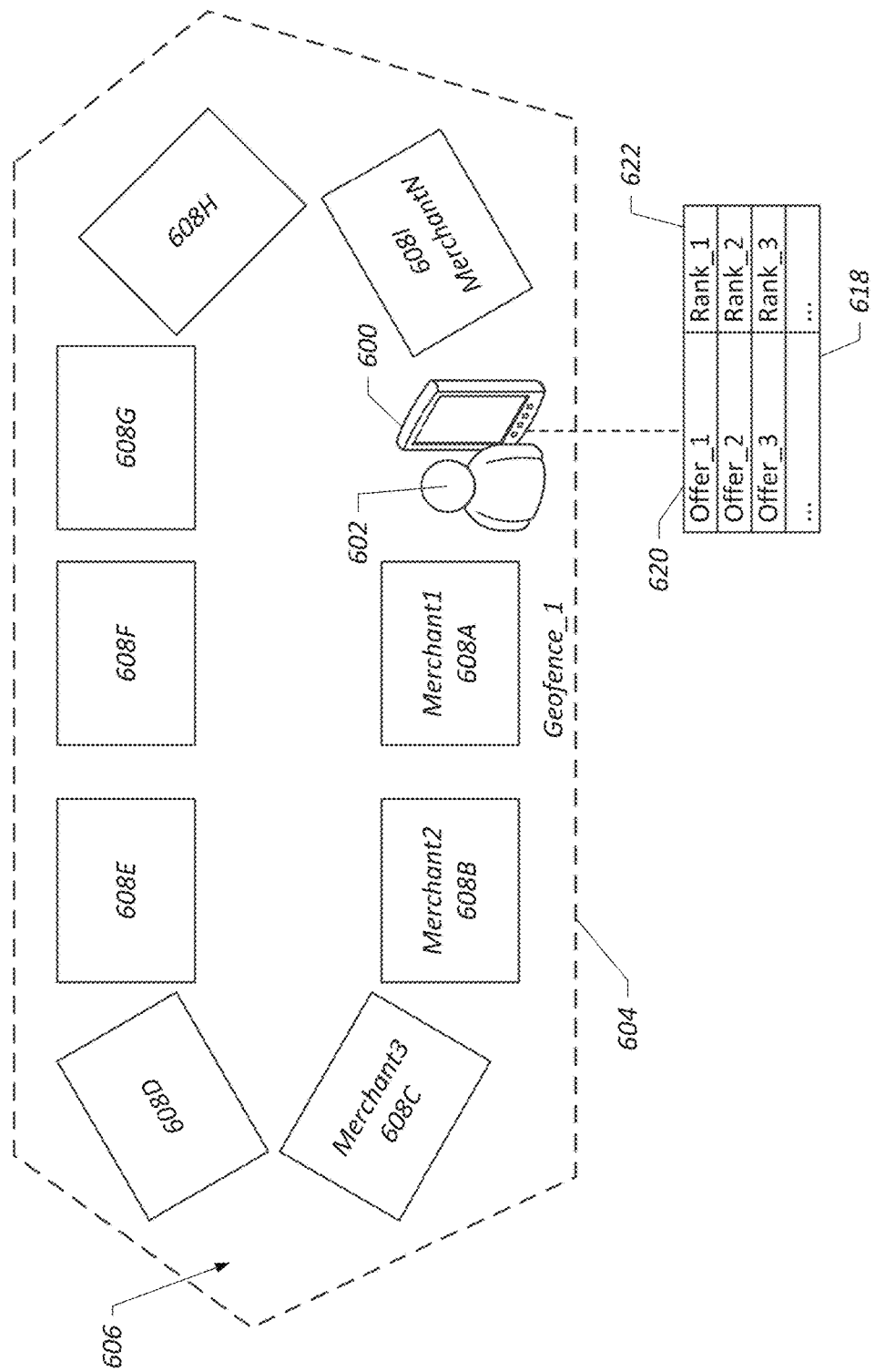

FIGS. 6A and 6B depict a mobile user device 600 of a user 602 interacting with a geofence 604 (Geofence 1) that encloses a geographic area 606 (e.g., a shopping mall) in accordance with an embodiment of the present invention. As shown in FIGS. 6A and 6B, the area 606 may include a number of retail stores 608 associated with various merchants. FIG. 6A also depicts a portion 610 of a memory of a mobile user device. As discussed above, when the mobile user device 600 is in a location, the mobile user device 600 may obtain geofences within a specific proximity of the location. The memory portion 610 may store (e.g., cache) obtained local geofence data. For example, as shown in FIG. 6A, the local geofence data may include a number of geofences 612 and associated geofence identifiers 614. The geofences 612 thus include, for example, geofence 606 (Geofence 1) and its associated identifier Id 1, Geofence 2 and its associated identifier Id 2, and Geofence 3 and its associated identifier Id 3.

Next, as shown in FIGS. 6A and 6B, the user 602 and mobile user device 600 may traverse the geofence 604 (as indicated by movement arrow 615). As mentioned above, the traversal of the geofence 604 may be detected by the mobile user device 600. After detection of the traversal of the geofence 604, candidate offers are obtained from the offers engine 12 in the manner described above. FIG. 6B depicts another memory portion 616 of the mobile user device 600 illustrating storage of the candidate offers. As shown in FIG. 6B, the memory portion 616 stores candidate offer data. The candidate offer data may include candidate offer identifiers 620 and associated offers data. As also mentioned above, the candidate offers may include rankings 622 used to rank the candidate offers. As will be appreciated, the stored geofences illustrated in FIG. 6A may remain stored on the mobile user device 602 for use after the user leaves the geofenced geographic area 606.

Figure 7A:
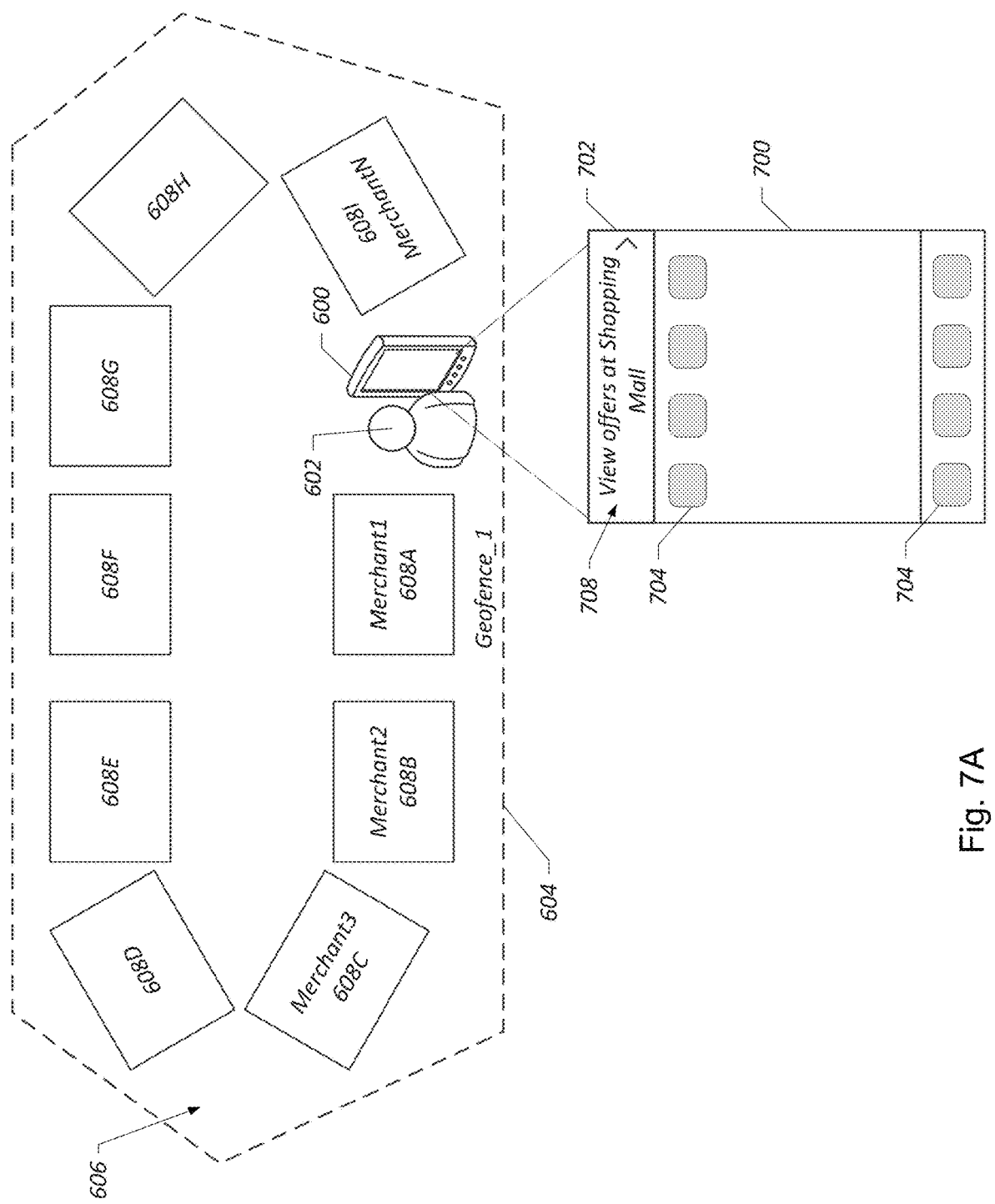
FIGS. 7A-7D are schematic diagrams that depict screens of a mobile user device illustrating display of the candidate offers in accordance with some embodiments.

FIGS. 7A-7D depict screens of the mobile user device 600 illustrating display of the candidate offers in accordance with an embodiment of the present invention. The screens of the mobile user device 600 are described with reference to the geofence 604 and geographic area 606 described above and having stores 608 of various merchants. FIG. 7A depicts a screen 700 of the mobile user device 600, such as, for example, a home screen of a user interface. As will be appreciated, the screen 700 and other screens described below may be presented in a user interface of the mobile user device that may receive inputs from a user and provide outputs on a display. In some embodiments, the user interface may include a touchscreen, software modules, or any combination thereof. In such embodiments, inputs may be received as touches on the touchscreen, such as from a digit of a user, a stylus, etc. The screen 700 may include various user interface elements to display information to a user, and in some instances, receive user input. The screen 700 depicts a notification area 702 that displays notifications such as received text messages, received emails, application notifications, and so on. As will be appreciated, however, that the notifications described herein may be displayed in other screens of the user interface, in other areas or components of the user interface (e.g., a pop-up notification) and may be displayed independent of any particular screen or application executed by the mobile user device 600. The notification area 702 may display other information, such as status icons (e.g., battery life, network signal strength), date, time, and so on. As will be appreciated, the screen 700 also depicts user-selectable icons 704 that cause execution of various programs (e.g., application) of the mobile user device 602.

As described above, after the user 602 has traversed the geofence 604 and entered the geographic area 606, the mobile user device 600 may obtain candidate offers associated with the merchants of the retail stores 608. In some embodiments an offers notification 708 may be generated and displayed in the notification area 702 of the screen 700. As shown in FIG. 7A, the offers notification 708 may include notification text ("View offers at Shopping Mall") that may describe the availability of the candidate offers and the specific geographic area ("Shopping Mall") that the user entered when crossing the geofence 604.

Figure 7B:
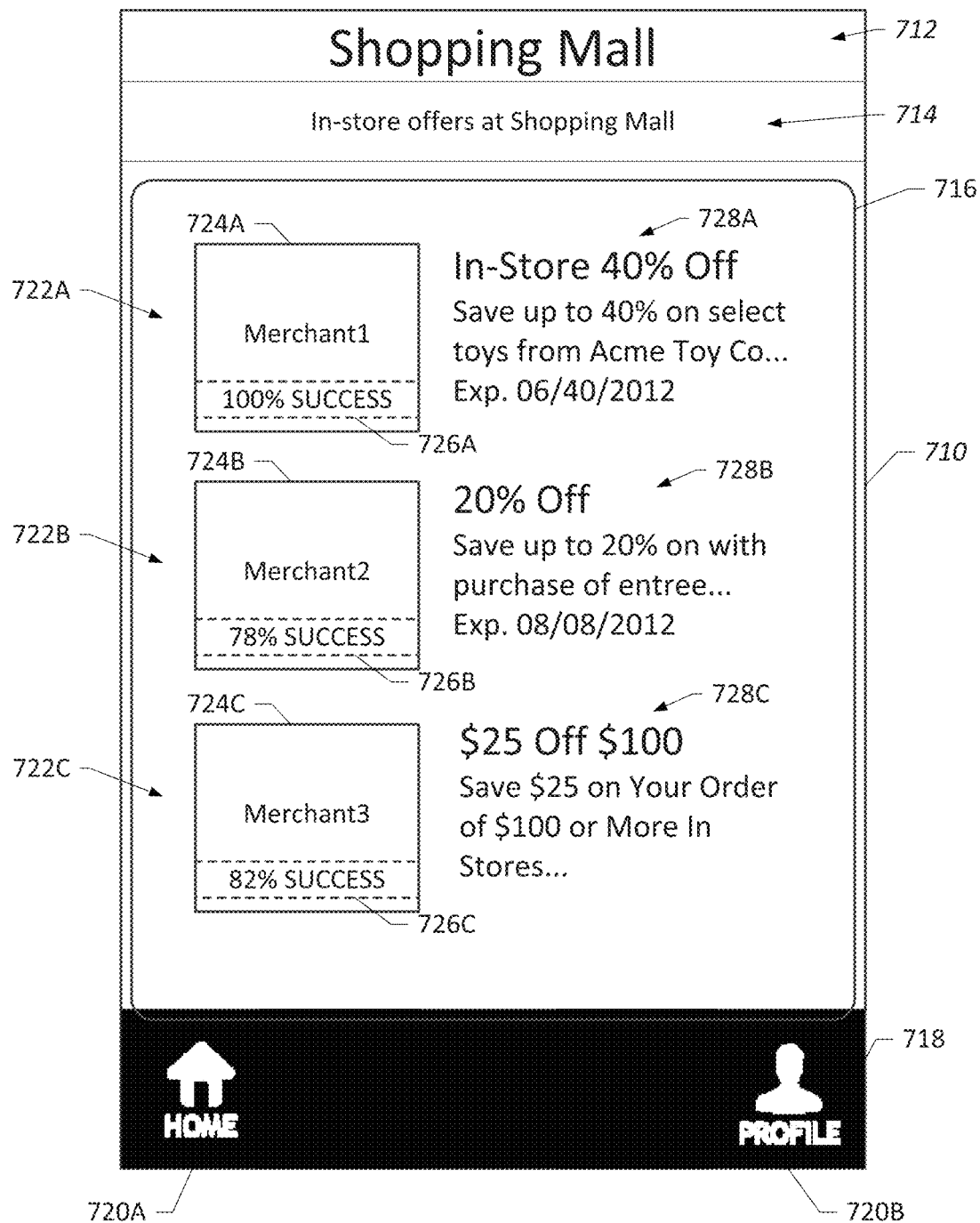

In some embodiments, the notification 708 is a user-selectable notification that enables further display of the candidate offers to the user. FIG. 7B depicts a screen 710 of the mobile user device 600 that may be displayed after a user selects the offers notification 708 described above. In some embodiments, the screen 710 may be a screen of a native application (e.g., native application 52) of the mobile user device 600.

Here again, the screen 710 may include various user interface elements to display information to a user, and in some instances, receive user input. For example, the screen 710 may include a header portion 712, a coupon type title 714, an offer display area 716, and a navigation bar 718. As shown in FIG. 7B, the header portion 712 may be located at the top portion of the screen 710 (e.g., above the coupon type title 714 and the offer display area 716). Similarly, in some embodiments the navigation bar 718 may be displayed below the offer display area 716. In other embodiments, the information in the header portion 712 may be displayed in other areas, such as a footer portion, and the navigation bar 718 may be located in other areas of the application, such as a header portion. In some embodiments, as described below, the notification 708 may consist of a specific candidate offer. In some embodiments, the notification 708 may consist of a specific candidate offer that is user selectable.

The header portion 712 may display a title indicating the contents of the screen 700 presented to the user, as selected by the coupon type title 714. For example, the header portion 712 includes the text "Shopping Mall" to indicate to a user that offers for the Shopping Mall are currently being presented. The coupon type title 714 may include text describing the type of offers displayed in the offer display area 716. For example, as the user is viewing offers for the real-world geographic area ("Shopping Mall"), the coupon type title 714 includes the text "In-store offers at Shopping Mall." The navigation bar 718 may include navigation controls, e.g., buttons 720, such as a "Home" button 720A and a "Profile" button 720B. For example, by selecting the "Home" button 720A, a user may return to a home screen of a native application. Similarly, the selection of the "Profile" button 720B enables a user to access a user profile, such as a user profile associated with the native application.

The offers display area 716 may present offers, e.g., in-store coupons 722, for viewing and selection by a user. For example, as indicated by the coupon type title 714 ("In-store offers at Shopping Mall"), the in-store coupons 714 may be coupons usable at the stores of the identified Shopping Mall. The in-store coupons 722 may include any number of coupons associated with merchants providing goods, services, or a combination thereof. As mentioned above, the in-store coupons may be ranked and presented to the user in the ranked order, as described above. In some embodiments, as mentioned above, a curated in-store coupon may be ranked higher than other in-store coupons and may thus be presented at the top of the offer display area.

Each electronic coupon 722 may be presented with information describing the coupon, such as a merchant graphic 724, a success rate banner 726, and a coupon summary 728. The merchant graphic 724 may include a text, image (e.g., a merchant logo), or combination thereof identifying the merchant associated with the coupon. The success rate banner 726 may indicate a success rate for a coupon that indicates the percentage of instances in which the coupon was successfully used. In some embodiments, for example, the success rate may be determined based on user feedback on coupon usage. The coupon summary 728 may include information about the coupon, such as the goods, services, or both associated with the coupon, the discount or other offer provided by the coupon, the expiration date, or any other suitable information or combination thereof.

For example, as shown in FIG. 7B, a first in-store coupon 722A may be presented with a merchant graphic 724A ("Merchant1") and may include a success rate banner 726A indicating the success rate of the coupon ("100% success"). The coupon 722A may be presented with a coupon summary 728A summarizing the discount provided by the coupon ("40% Off Save up to 40% on select toys from Acme Co . . . "). Additionally, the coupon summary 728A may include the expiration date of the coupon ("Exp. Jun. 40, 2012"). The other coupons 722B and 722C illustrated in FIG. 7B may include similar information, such as merchant graphic 724B, success rate banner 726B, coupon summary 728B, and so on. Additionally, the coupons 722 may include coupons for any type of offer, such as offers for discounts on goods, services or both, and free goods, services, or both. As shown in FIG. 7B, each coupon 722A corresponds to a merchant having a retail store 608 in the geographic area 606 (the identified "Shopping Mall"). For example, coupon 722A is associated with "Merchant1" of retail store 608A, coupon 722B, is associated with Merchant2 of retail store 608B, and so on. However, as will be appreciated, not all merchants in a geographic area may have candidate offers to provide to a user, and some merchants may have multiple candidate offers. In some embodiments, a user may search the in-store coupons 722, such as by keyword or merchant name, in order to identify particular subsets of the in-store coupons 72.

To use a coupon, a user may select (e.g., touch) one of the in-store coupons 722, For example, a user may select any portion of the coupon 722A, such as the merchant graphic 724A, the coupon summary 728A, etc. Upon selection of a coupon, details about the coupon may be presented to enable a user to use the coupon (i.e., redeem the coupon) with a transaction with a merchant. In some embodiments, after selecting a coupon for redemption, a bar code or machine-readable code may be displayed on a display of the mobile user device 600. The user may present the display of the mobile user device 600 to a clerk of the retail store, and the clerk may scan the bar code or other machine-readable code at the point of sale to complete redemption of the coupon.

Figure 7C:
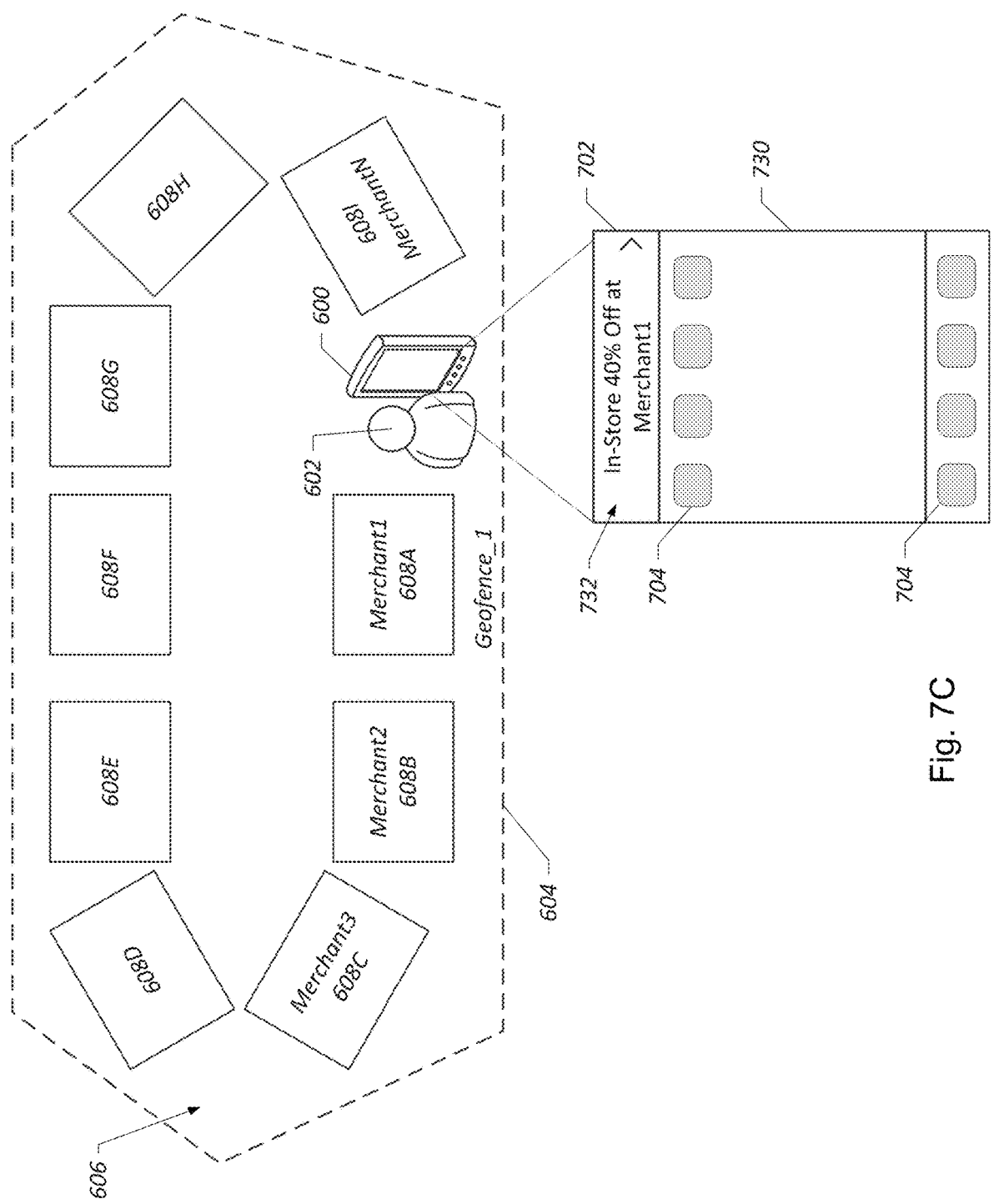
Figure 7D:
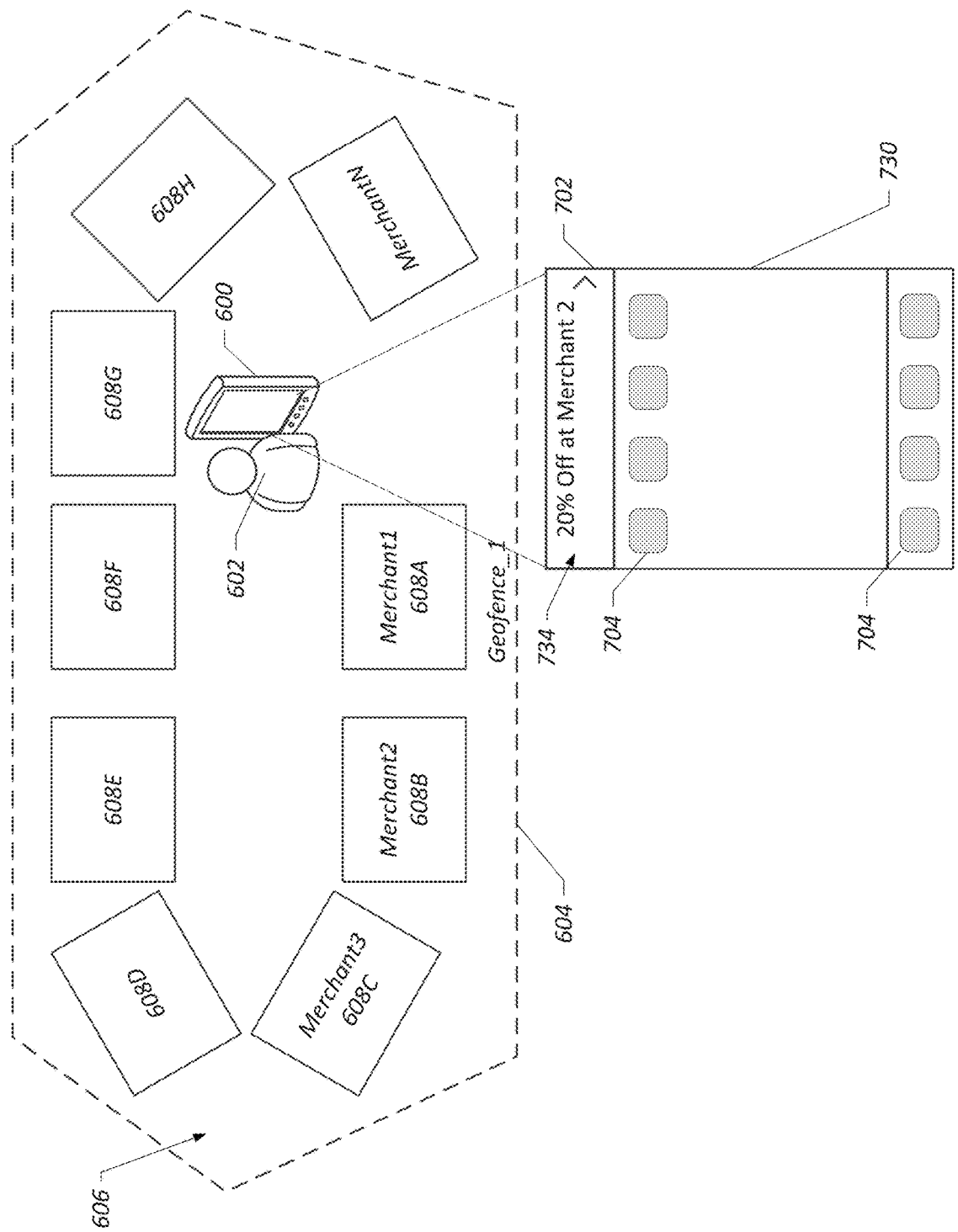

In other embodiments, an offer may be displayed directly in the notification area of a screen of a mobile user device. FIGS. 7C and 7D depict the display of offers in the notification area 702 of the mobile user device 600 in accordance with an embodiment of the present invention. FIG. 7C depicts a screen 730 of the mobile user device 600 as, for example, a home screen of a user interface. In some embodiments, after the user enters the geofenced geographic area 606, a first candidate offer 732 ("In-Store 40% at Merchant1") associated with the merchant of retail store 608A ("Merchant1") may be displayed in the notification area 702. As will be appreciated, the user interface of the mobile user device 600 may enable a user to select the candidate offer 732 from the notification area 702 to see more detail about the offer. After selecting the offer, the user may then choose to redeem the offer at the retail store 608A. As mentioned above, after selecting a coupon for redemption, a bar code or machine-readable representation may be displayed on a display of the mobile user device for presentation at the retail store 608A.

Next, as shown in FIG. 7D, as the user 602 remains in the geographic area 606, a second candidate offer 734 may be displayed in the notification area 702. The second candidate offer 734 may be displayed in response to an evaluation of the candidate offer flow criteria described above. For example, after the first candidate offer 732 has been displayed for a time period, the second candidate offer 734 may be displayed in the notification area 702. The second candidate offer 734 ("20% Off at Merchant 2") may be associated with a merchant of a second retail store 608B ("Merchant2"). Thus, as the user remains in the geographic area 606, the user may be presented with a sequence of candidate offers. As mentioned above, the candidate offers may be presented to the user 602 according to their rankings Thus, in some embodiments, the first candidate offer 732 displayed in the notification area 702 may have a higher ranking than the second candidate offer 734 subsequently displayed in the notification area 702.

After the user 602 is no longer located in the geographic area 606, the traversal of the geofence 604 may again be detected. After the second traversal of the geofence 604 is detected, the mobile user device 600 may stop providing notifications of candidate offers. For example, the cache of candidate offers may be deleted and the candidate offer flow process may be terminated.

Figure 8:
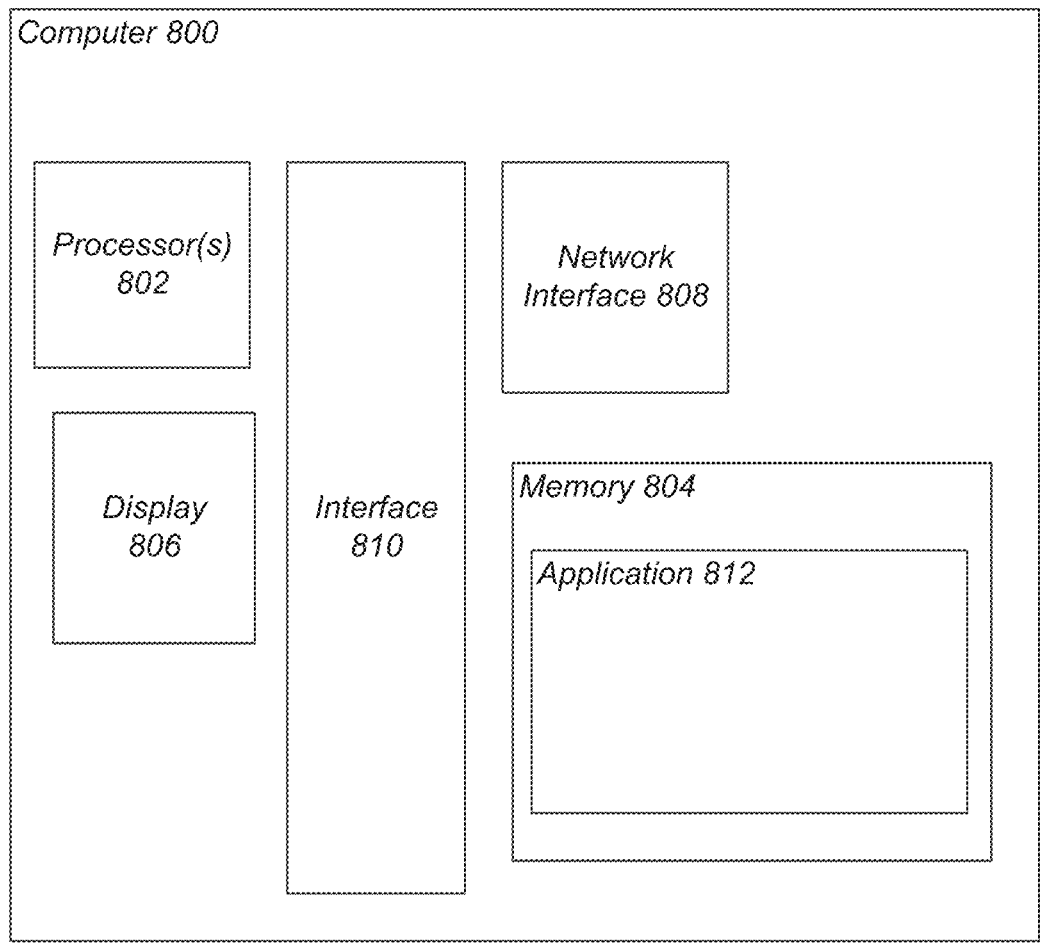
FIG. 8 is a block diagram of a computer in accordance with some embodiments.

FIG. 8 depicts of a computer 800 in accordance with an embodiment of the present invention. Various sections of systems and computer-implemented methods described herein, may include or be executed on one or more computers similar to computer 800. Further, processes and modules described herein may be executed by one or more processing systems similar to that of computer 800. The computer 800 may include various internal and external components that contribute to the function of the device and which may allow the computer 800 to function in accordance with the techniques discussed herein. It should further be noted that FIG. 8 depicts merely one example of a particular implementation and is intended to illustrate the types of components and functionalities that may be present in computer 800.

Computer 800 may include any combination of devices or software that may perform or otherwise provide for the performance of the techniques described herein. For example, computer 800 may include a tablet, a mobile phone, such as a smartphone, a video game device, and other hand-held networked computing devices, a desktop user device, a server, or other computing devices. Computer 800 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 800 may allow a user to connect to and communicate through a network (e.g., the Internet, a local area network, a wide area network, etc.) and may provide communication over a satellite-based positioning system (e.g., GPS). For example, the computer 800 may allow a user to communicate using e-mail, text messaging, instant messaging, or using other forms of electronic communication, and may allow a user to obtain the location of the device from the satellite-based positioning system, such as the location on an interactive map.

As shown in FIG. 8, the computer 800 may include a processor 802 (e.g., one or more processors) coupled to a memory 804, a display 806, and a network interface 808 via an interface 810. It should be appreciated the computer 800 may include other components not shown in FIG. 8, such as a power source (e.g., a battery), I/O ports, expansion card interfaces, hardware buttons, etc. In some embodiments, the display 806 may include a liquid crystal display (LCD) or an organic light emitting diode (OLED) display. The display 806 may display a user interface (e.g., a graphical user interface), and may also display various function and system indicators to provide feedback to a user, such as power status, call status, memory status, etc. These indicators may be in incorporated into the user interface displayed on the display 806. In accordance with some embodiments, the display 806 may include or be provided in conjunction with touch sensitive elements through which a user may interact with the user interface. Such a touch-sensitive display may be referred to as a "touchscreen" and may also be referred to as a touch-sensitive display. In such embodiments, the display 806 may include a capacitive touchscreen, a resistive touchscreen, or any other suitable touchscreen technology.

The processor 802 may provide the processing capability required to execute the operating system, programs, user interface, and any functions of the computer 800. The processor 802 may include one or more processors that may include "general-purpose" microprocessors and special purpose microprocessors, such as one or more reduced instruction set (RISC) processors, such as those implementing the Advanced RISC Machine (ARM) instruction set. Additionally, the processor 802 may include single-core processors and multicore processors and may include graphics processors, video processors, and related chip sets. A processor may receive instructions and data from a memory (e.g., system memory 804). Processes, such as those described herein may be performed by one or more programmable processors executing computer code to perform functions by operating on input data and generating corresponding output.

The memory 804 (which may include tangible non-transitory computer readable storage mediums) may include volatile memory and non-volatile memory accessible by the processor 802 and other components of the computer 800. The memory 804 may include volatile memory, such as random access memory (RAM), and non-volatile memory, such as ROM, flash memory, a hard drive, any other suitable optical, magnetic, or solid-state storage medium, or a combination thereof. The memory 804 may store a variety of information and may be used for a variety of purposes. For example, the memory 804 may store executable code, such as the firmware for the computer 800, an operating system for the computer 800, and any other programs. The executable computer code may include instructions executable by a processor, such as processor 802, and the computer may include instructions for implementing one or more techniques described herein with regard to various processes. For example, the memory 804 may store an application 812. For example, if the computer 800 represents a user device, the application 812 may include a web browser and may enable a user to view offers, such as online coupons, and select and redeem online coupons using the user actions described above. In other embodiments, for example, the computer 800 may represent a server and the application 812 may implement some or all of steps of the process 500 described above and illustrated in FIG. 5. The executable code may be written in a programming language, including compiled or interpreted languages, or declarative or procedural language, and may be composed into a unit suitable for use in a computing environment, including as a stand-alone program, a module, a component, a subroutine. Such code program may be stored in a section of a file that holds other programs or data (e.g., one or more scripts stored in a markup language document), in a single file dedicated to the program in question, or in multiple coordinated files (e.g., files that store one or more modules, sub programs, or sections of code). Additionally, the copies of the executable code may be stored in both non-volatile and volatile memories, such as in a non-volatile memory for long-term storage and a volatile memory during execution of the code.

The interface 810 may include multiple interfaces and may couple various components of the computer 800 to the processor 802 and memory 804. In some embodiments, the interface 810, the processor 802, memory 804, and one or more other components of the computer 800 may be implemented on a single chip, such as a system-on-a-chip (SOC). In other embodiments, these components, their functionalities, or both may be implemented on separate chips. The interface 810 may be configured to coordinate I/O traffic between processor 802, memory 804, network interface 806, and other internal and external components of the computer 800. The interface 810 may include functionality for interfacing via various types of peripheral buses, such as a variant of the Peripheral Component Interconnect (PCI) bus standard, the Universal Serial Bus (USB) standard, and the like.

The computer 800 depicted in FIG. 8 also includes a network interface 808, such as a wired network interface, wireless (e.g., radio frequency) receivers, etc. For example, the network interface 808 may receive and send electromagnetic signals and communicate with communications networks and other communications devices via the electromagnetic signals. The network interface 808 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 804 may communicate with networks, such as the Internet, an intranet, a cellular telephone network, a wireless local area network (LAN), a metropolitan area network (MAN), or other devices by wireless communication. The network interface 808 may suitable any suitable communications standard, protocol and technology, including Ethernet, Global System for Mobile Communications (GSM), Enhanced Data GSM Environment (EDGE), a 4G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocol.

Those skilled in the art will also appreciate that, while various items are illustrated as being stored in memory or on storage while being used, these items or sections of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-readable medium or a portable article to be read by an appropriate drive, various examples of which are described above. In some embodiments, instructions stored on a computer-readable medium separate from computer 800 may be transmitted to computer 800 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc.

Figure 9:
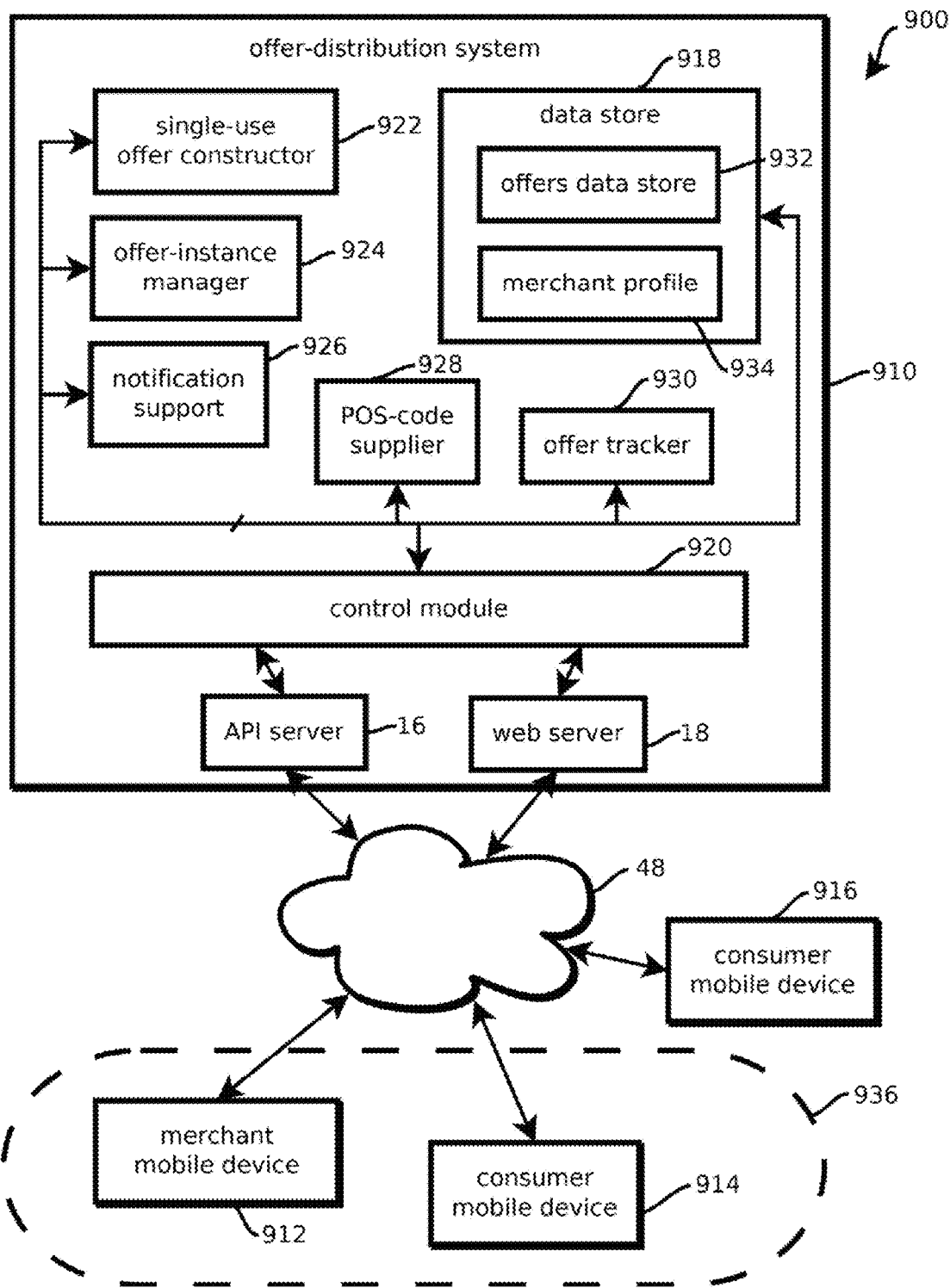
FIG. 9 depicts an example of an offer-distribution system configured to manage locally targeted, single-use offers with a mobile device of a merchant.

FIG. 9 shows an embodiment configured to manage locally-targeted, single-use offers with a mobile device of a merchant employee. The computing environment of FIG. 9 may leverage the functionality and features described above, but is also broadly applicable and may be deployed, for instance, in the context of an affiliate network, in the context of a publisher of an affiliate network, or in the context of a merchant's computer system.

Traditional offer-discovery systems suffer from a number of deficiencies that are addressed by the various invention described herein. The reader should appreciate that the present application describes several inventions, rather than separating those inventions into multiple isolated patent applications, because their related subject matter lends itself to economies in the application process. In view of this, the distinct advantages and aspects of such inventions should not be conflated. In some cases, embodiments address all of the deficiencies noted herein, but it should be understood that the inventions are independently useful and some embodiments address only a subset of such problems or offer other, unmentioned benefits that will be apparent to those of skill in the art reviewing the present disclosure.

Generally, it is expensive to create new offers. Many merchants create new offers with a relatively labor-intensive, bureaucratic process executed at a central office, involving multiple layers of management, computers, telephone calls, paper forms, and the like, to issue offers that expose the merchant to relatively large amounts of foregone revenue unless the offers are carefully crafted, as such offers are often broadly applicable, relatively long-lasting, can be copied and shared among consumers, and often span an entire country. This process, however, is often not well suited to merchants who wish to issue locally-targeted, often smaller-scale offers on the fly, with less administrative review, in order to take advantage of transient opportunities perceived by trusted merchant employees in the field.

For example, a retail store manager may notice that their store has an excess supply of some clothing item that is, or is about to go, on clearance. In response, that manager may wish to issue a relatively small number of coupons (e.g., on the order of tens, hundreds, or thousands) to a predetermined, limited number of consumers that are geographically proximate. These constraints on geographic location and number of coupons issued often allow for less administrative review and faster responses to short-term opportunities perceived by merchant employees in the field, but existing systems for creating such offers are not well suited to managing these offers, because of the relatively high cost imposed by the controls, user interfaces, and computing systems designed for expensive, large-scale coupon issuances. As a result, merchants and consumers miss out on short-term, mutually-beneficial opportunities to use smaller-run offers. Similarly, smaller merchants often do not have the capacity to administer as many offer campaigns as they would like, because the smaller-scale offers they would typically issue are not economical with the larger overhead of traditional techniques.

Moreover, with traditional systems, it can be challenging to manage an offer when a merchant wishes to only issue a relatively small number of instances of an offer, particularly with digital offers (the modifier "digital" here should not be read as indicating that other references to "offers" without this modifier are referring only to non-digital offers). Customers often simply create new digital copies of a coupon and share those copies, thereby defeating a merchant's efforts to limit the number of instances of a coupon that are issued or redeemed. Further, many merchants generally wish to avoid disappointing consumers who, having received a digital copy of an offer, believe they have a valid instance of an offer and incur the cost and inconvenience of traveling to a merchant's store, only to find the instance of the offer is invalid.

A further complication for those seeking to manage single-use digital offers is presented by legacy point-of-sale systems operated by many merchants. Such systems often are not configured to track individual instances of an offer such that the number of redemptions or reserved instances can be tightly controlled. To track individual instances of an offer, one might consider assigning each instance of the offer a unique code in the merchant's point-of-sale system, but in many cases, such systems support a relatively small number, for example, in the range of 10, 100, or 1000, different discount codes, and administering changes in such codes is often slow and relatively expensive, thereby impeding efforts by merchants to run small-scale, low-cost, locally-targeted offers associated with a limited number of coupons or other offers, as the merchants often find it too expensive to create a different point of sale code for each of the instances of an offer that are to be issued. As a result, merchants often miss opportunities to offer finer-grained discounts to valued consumers, and consumers are often deprived of desirable deals that would otherwise be available in their geographic area.

These and other issues with traditional offer-discovery systems are mitigated by some of the various embodiments described herein. Offer-discovery systems having features consistent with some embodiments are described above with reference to FIGS. 1 through 3; offer-discovery systems consistent with some embodiments for locally targeting offers are described above with reference to FIGS. 4 through 7; a computer system by which the various embodiments described herein may be implemented is described with reference to FIG. 8; and offer-discovery systems in which merchants may manage locally-targeted, single-use offers while in the field (e.g., while on a sales floor), using a mobile device (e.g., a cell phone), are described with reference to FIGS. 9 through 14. The features described with reference to these sets of figures may be combined in some embodiments, or those features, like others described below, may be implemented independently.

Accordingly, the above-noted problems, and others, may be mitigated by some embodiments of the offer-discovery system 900 shown in FIG. 9. Some embodiments facilitate a process by which a merchant employee creates an offer using their mobile device, such as a cell phone (e.g., while on the sales floor, at a mall kiosk, or at a remote location, like a promotional event), where the offer is geographically targeted and use of the offer is constrained to a predetermined amount of consumers or offer instances, the predetermined amount being under the control of the merchant employee. Further, because such offers often arise due to transient, local conditions on a retail sales floor or other merchant site, embodiments may also alert nearby consumers on the consumer's' mobile devices to the offer in response to the consumers' mobile devices determining that the consumers are within a geographic location associated with the offer.

It should be noted that, while traditional offer-discovery systems are not well-suited to managing these types of offers because such offers are often relatively small in scale, this does not imply that such offers are readily administered manually. Generally, targeted offers of the nature presently described are small in scale but large in number and diverse in terms, and training and staffing employees to manually administer such offers would be prohibitively expensive for many merchants. In some use cases, different shifts of employees within a given merchant's store may issue multiple offers based on the current condition of inventory and sales goals for that shift, for example. As a result, a given merchant may have on the order of hundreds, thousands, or tens of thousands of different offers issuing and expiring on a given day, particularly for merchants with a relatively large number of stores. Further, when managing offers, users are often relatively sensitive to latency, as a sales clerk and consumer may be holding up a line of consumers at a checkout counter while the clerk validates a coupon. Manual validation is expected to be too slow for many merchants. The computing processes and hardware described herein facilitate large-scale, long-tail (as well as mass-market) offer creation that would not be economically feasible with a manually-administered process, which is not to suggest that some of the steps described herein may not be performed manually.

In some embodiments, the offer-discovery system 900 includes an offer-distribution system 910, the network 48, a merchant mobile device 912, and consumer mobile devices 914 and 916. The offer-distribution system 910 may include the components of the offers engine 12 described above with reference to FIGS. 1-8, and the merchant mobile device 912 and consumer mobile devices 914 and 916 may include the features of the mobile user devices 28 and 30 described above with reference to FIGS. 1-8. In some cases, the offer-distribution system 910 may be part of an offers engine of a publisher of offers within an affiliate network, or the offer-distribution system 910 may be part of an affiliate-network server, such as servers 44 or 46 described above, in which case some of the communication with the offer-distribution system 910 may be mediated through a publisher, or such communication may be directly with client devices, such as merchant mobile device 912 and consumer mobile devices 914 and 916. The offer-distribution system 910 may include, in some cases, some or all of the functionality of both the publisher and the affiliate networks described above and be operated by a single entity as a single application receiving offers, distributing those offers to consumers, and tracking usage of offers. The number of client devices shown in FIG. 9 is selected merely to explain various embodiments, but it should be understood that the number of client devices is expected be substantially larger in deployed implementations, for example, on the order of tens of thousands, hundreds of thousands, millions, or tens of millions of client devices communicating with the offer-distribution system 910.

Generally, some embodiments of the offer-distribution system 910 may perform some or all of the following functions: supply merchant mobile device 912 with interfaces to create new offers, store data about such offers, verify roles and permissions of the employee operating the merchant mobile device 912, distribute instructions to consumer mobile devices 914 and 916 to alert consumers to the offers based on geographic location, track individual instances of a given offer that have been reserved by consumers upon being alerted, send redemption information to consumer mobile devices upon offer instance reservation such that the validation information may be conveyed to a merchant mobile device, validate instances of offers presented by consumers to the merchant based on validation requests from the merchant mobile device 912, supply point-of-sale validation codes to the merchant mobile device 912 that are readily administered on a legacy point-of-sale system of the merchant, calculate and provide offer performance metrics for display on the merchant mobile device 912, and provide interfaces by which the merchant mobile device 912 may be used to adjust parameters of an offer based on such feedback. Other embodiments may provide subsets of this functionality (e.g., non-legacy, contemporary point of sale terminals may be supported by a merchant), which is not to suggest that any other feature is required of every embodiment.

To these ends and others, some embodiments of the offer-distribution system 910 include the above-described API server 16, the above-described web server 18, a data store 918, a control module 920, a single-use offer constructor 922, an offer-instance manager 924, a notification support module 926, a point-of-sale (POS) code supplier 928, and an offer tracker 930. These components may communicate and cooperate with one another and the rest of the offer-discovery system 900 to perform a process described below with reference to FIGS. 10-11 and create interfaces shown in FIGS. 12-14.

While the components of the offer-distribution system 910 are illustrated as discrete functional blocks, it should be understood that software or hardware by which such functionality is implemented may be differently arranged. For example, such hardware or software may be replicated, conjoined, intermingled, distributed, or co-located, notwithstanding the depiction as discrete functional blocks. In some embodiments, the offer-distribution system 910 and each of the client devices 912, 914, and 916 are implemented in one or more of the computing systems described above with reference to FIG. 8 executing instructions to provide the presently described functionality stored on a tangible, non-transitory, machine readable medium. In some cases, content delivery networks may host some or all of the information conveyed from offer-distribution system 910, in which case, to the extent information is supplied or provided by the system 910, the system may provide such information by sending instructions to retrieve that information from the content delivery network.

In some embodiments, the API server 16 or the web server 18 may receive requests for the various interfaces described herein or requests for data or actions described herein and translate those requests into a format to which the control module 920 is responsive, such that the request may be processed. Further, in some embodiments, the API server 16 or the web server 18 may send the interfaces, data, and commands described herein to the various client devices via network 48 at the command of the control module 920. The control module 920 may include the features of the control module 14 described above and may mediate between the various components of the offer-distribution system 910 to provide the functionality described herein.

The illustrated data store 918 may include the components of the data store 24 described above and data therein may be replicated or managed using the processes described above with reference to the cache server 23 described above in FIG. 1. In this example, the data store 918 may include an offers data store 932, which may include the data described above with reference to the offers data store 60 along with the offer parameters described below for tracking individual instances of an offer created with the merchant mobile device 912.

Further, embodiments may include a merchant profile data store 934, which may contain a plurality of merchant records, each merchant record corresponding to an individual merchant and having a merchant name, a merchant identifier that is unique among the merchants, and a plurality of merchant employee records. Each employee record may include an employee identifier that is unique, an employee user name, an employee password, an employee role, and various permissions associated with the employee role. Examples of such permissions include a maximum (or predetermined) geographic area in which the employee is to be allowed to issue offers, such as a bounding box or other designation of the geographic area (like the geofence identifiers described above with reference to FIGS. 5 and 6), a maximum amount of offer instances the employee is authorized to issue, a maximum amount of a discount the employee is authorized to include in an offer, a maximum duration of an offer before the offer expires for offers created by the employee, and the like. In some cases, the employee records indicate whether offers by the employee are to be approved by another employee having a particular role, for example, lower-level employees offers may be designated as requiring that a higher-level employee must approve the offer before the offers issues (or is otherwise made available to consumers). In some cases, upon a lower-level employee creating an offer, an alert may be sent to a merchant mobile device of the supervisor employee, and the supervisor employee may be presented with an approval interface with inputs to approve or deny the offer before the offer issues.

In some cases, the merchant profiles 934 may include template offers that correspond to discounts for which the merchant's point-of-sale systems are preconfigured, such as a template for 10% off, a template for 20% off, and another template for 30% off. In some cases, merchant employees are only permitted to use certain templates based on their role. Each template may include a number of POS codes that when entered into the merchant's POS system (e.g., a networked cash register with a bar-code laser scanner or optical scanner connected to a data store with UPC codes, prices, and discounts to apply based on POS codes) cause the POS system to apply the appropriate discount to a transaction. These templates, in some cases, may be predetermined by the merchant during a merchant onboarding process, and a number of offers may be based on each template.

Some embodiments may include a single-use offer constructor 922, which may, upon a user creating an offer, store an offer record in the offer data store 932 corresponding to the newly created offer. (It should be noted that the term "constructor" is used here in its broader sense, rather than only in the very specific sense of a "constructor" in the context of object oriented programming languages.) The newly created offers may include the data in the above-described offer records with information about instances of each offer.

An instance of an offer may be analogous to an individual physical coupon, for instance, cut from a newspaper, in the sense that an instance is intended to be rivalrous, even though the instance may be conveyed digitally and exist in digital form. A given offer may include a number of instances defined by the offer creator, e.g., a merchant employee may specify that a given offer is to have 10 instances of the offer, for instance, corresponding to 10 items on clearance in stock at a given store, or a predetermined number of items in which the merchant is willing to accept a lower profit in order to generate interest. Offers with instances that are tracked and limited may be referred to as single-use offers in the sense that each instance is intended to be used once, thereby facilitating efforts by the merchant to control the number of users that redeem an offer and, in some cases, the number of users that are informed that they are entitled to redeem the offer in advance of redemption.

In some cases, each instance of an offer may be associated with an instance record within the corresponding offer record, and each instance record may include information about the instance, including an instance identifier that is unique among the instances of that offer, a value indicating whether the instance has been reserved by a consumer, a value indicating which consumer has reserved the instance in the case that the instance has been reserved (for example, an identifier of a record in the user data store 56 described above), a value indicating whether redemption information for the instance has been requested by or sent to one of the consumer mobile devices 914 or 916 corresponding to the reserving consumer, and a value indicating whether the instance has been redeemed as indicated by a request from the merchant mobile device 912 for confirmation that the instance is valid. In some cases, additional information about each instance may be maintained in the instance records, including timestamps corresponding to events that change the state of the previously described fields, a POS code sent to the merchant mobile device 912 upon validation of the instance, an employee identifier of the merchant employee who requested validation of the instance (e.g., as embedded in a request for validation by the merchant mobile device 912 through which validation is requested), and the like. In some cases, this additional information may be used by control module 920 to programmatically correlate a request to validate an instance with a transaction at the merchant, such that the operator of the offer-distribution system 912 is compensated for the entire basket of goods or services purchased from the merchant even if the offer only corresponds to one item in the basket. For example, embodiments may cycle through a relatively small number of POS codes, such as 10, for a merchant for a given offer, and the POS code used to validate, combined with the employee identifier and timestamps may uniquely identify a transaction. In some cases, reports may be obtained from the merchant servers 38, 40, and 42 described above with transaction times, items purchased, and merchant employee identifiers, such that the control module 920 may correlate offer instances with the instance records and calculate an amount owed by each merchant for the service of providing the offer. In other examples, merchants may be billed based on a number of instances or offers issued or number of offers issued.

In some embodiments, the offer-instance manager 924 may retrieve the instance records from the data store 918 and determine whether additional instances may be reserved and whether a given instance being redeemed is valid. For example, the offer instance manager 924 may maintain a count or other measure of amount (for instance, a cumulative amount potentially saved by consumers or frequency of reservations) of instances of an offer that have been reserved by consumers and determine before a new instance is reserved whether the measured amount is greater than an amount specified by the merchant employee when creating the offer. Some embodiments, for example, may increment a counter each time an instance is reserved and, prior to allowing a new instance to be reserved, determine whether the count is less than a maximum number of instances to be reserved specified by the offer creator. Some embodiments may further determine whether a consumer requesting to reserve an instance has previously reserved an instance of the offer and deny the request in the event that an existing instance record includes an identifier of the consumer.

In some embodiments, the offer-instance manager 924 is configured to receive requests for redemption information from a consumer device 914 or 916 that has reserved an offer and send the corresponding consumer device information by which the consumer device conveys the redemption information to the merchant mobile device 912, such as a two-dimensional barcode, like a QR code, image to be displayed on a screen of the consumer mobile device for capture by a camera of the merchant mobile device 912, the QR code encoding a URL that directs the merchant mobile device 912 to request validation of the offer instance from the offer-distribution system 912. Other examples of redemption information are described below with reference to FIGS. 10 and 11. Further, some embodiments of the offer-instance manager 924 may receive requests to validate offers using the process described below with reference to FIGS. 10 and 11 from a merchant mobile device 912 and determine whether the request refers to a valid instance, e.g. an instance that has been reserved and has not yet been redeemed.

In some embodiments, the notification support module 926 receives a request from the merchant mobile device 912 to start an offer that has been created, and in response, sends instructions to consumer mobile devices 914 and 916 to alert the corresponding consumer in response to the consumer mobile devices 914 and 916 detecting entry into, or presence within, a geofence or other geographic location 936 corresponding to the offer that was started, e.g., by sending a corresponding geofence ID using the techniques described above with reference to FIGS. 5 and 6.

Some embodiments may include a POS-code supplier 928 configured to provide POS codes that are sent upon offer validation to the merchant mobile device 912 for entry by the merchant employee into a legacy point-of-sale system. As noted above, many older POS systems accommodate relatively few coupon codes, and replacement of these systems or frequent changes to the supported coupon codes is expensive. The POS-code supplier 928 may retrieve from the merchant profile data store 934 one or more coupon codes to which the merchant's POS system is responsive, such as a list of 10 or 20 three or four digit POS codes, which when entered into the merchant's legacy point-of-sale system, will cause the POS system to apply the appropriate discount to the transaction. In some cases, the POS-code supplier 928 may cycle through the list of codes and update instance records to reflect which code was applied to a given instance for transaction tracing. Or some embodiments may supply the same code for each instance redemption of a given offer or for each offer for which the same discount applies.

The offer tracker 930 may monitor offer performance and convey statistics on offer performance to the merchant mobile device 912 upon inquiry by a merchant employee. In some cases, the offer tracker 930 may calculate and provide statistics, such as the number of instances that have been reserved for a given offer, the number of instances that have been redeemed for a given offer, and statistics on consumers who have reserved or redeemed an offer, such as statistics reflecting information in the user data store 56 described above, like the percentage of the consumers having various geographic, income, interest, or other attributes. Based on the statistics, a merchant mobile device 912 may be used to request changes to an offer, for example, deleting unreserved instances, creating new instances, or sending additional offers to consumers who have reserved instances or who have already redeemed instances of the offer. The offer tracker 930 may engage the other components of the offer-distribution system 910 to implement such changes, provide interfaces to the merchant mobile device 912 by which the merchant employees view statistics and request such changes, and update the data store 918 appropriately.

The merchant mobile device 912 may include a native application, like the native application 52 described above, or a web browser, like the web browser 50 described above, to present various interfaces by which merchant employees perform the activities described herein. In some cases, a native application executing on the merchant mobile device 912 is operative to interface with the API server 16 to perform some or all of these activities, or a web browser may interface with the Web server 18 to perform some or all of these activities. It should be noted, that different employees of a given merchant may use different merchant employee devices to perform the various activities described herein. For example, a first merchant employee using their cell phone may create an offer; the supervisor of the merchant employee may approve the offer using another cell phone; an employee on a later shift may view statistics about the offer using a tablet computer; and an employee on a still later shift may change an attribute of the offer to create additional instances of the offer using a fourth mobile device. Similarly, consumers may perform various activities related to a given instance of an offer with different consumer mobile devices. For example, a consumer may be notified of an offer on their tablet computer, and the consumer may request that redemption information be sent to their cell phone.

Figure 10:
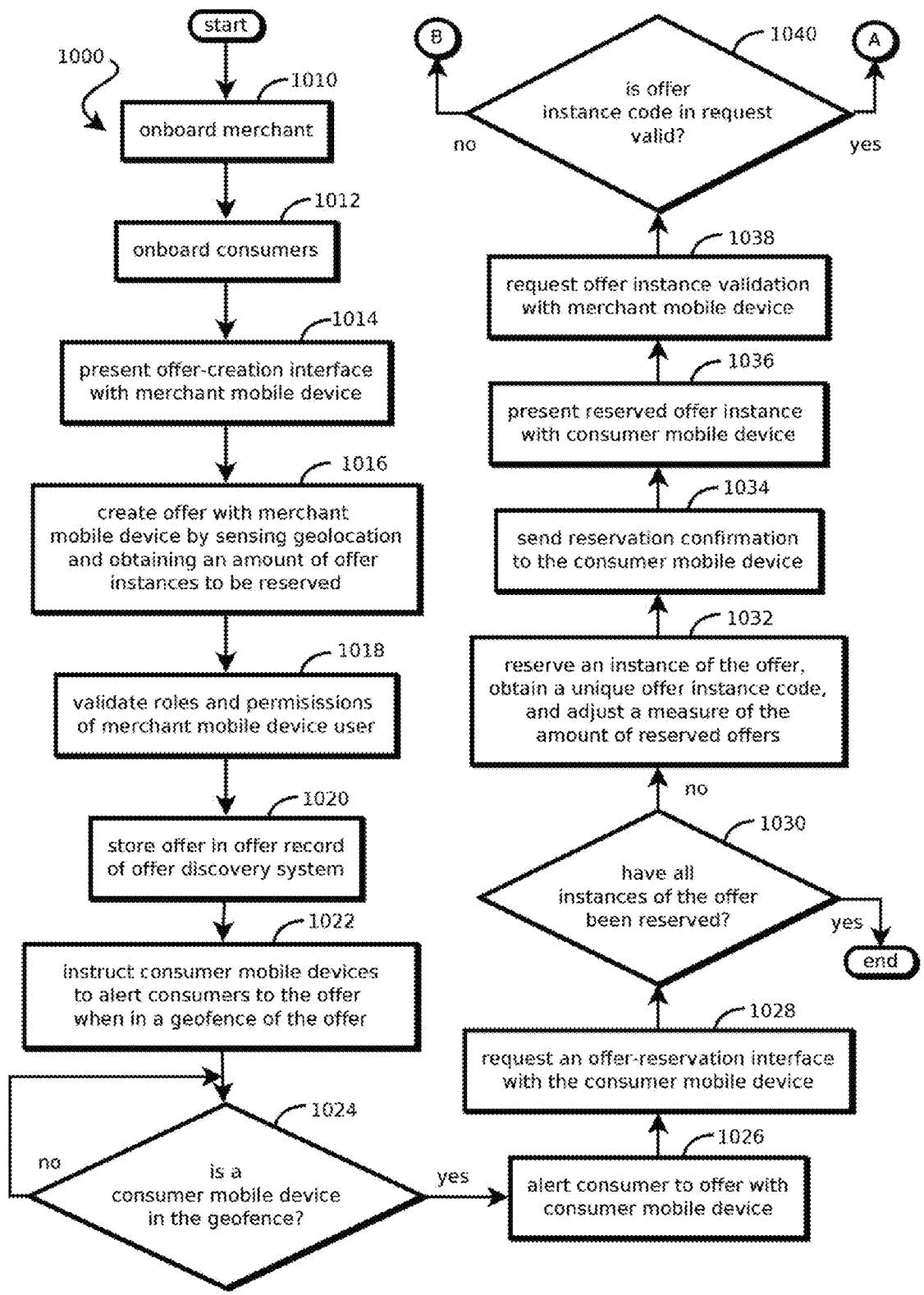
FIGS. 10-11 depict an example of a process for managing locally-targeted, single-use offers with a mobile device of a merchant.
Figure 11:
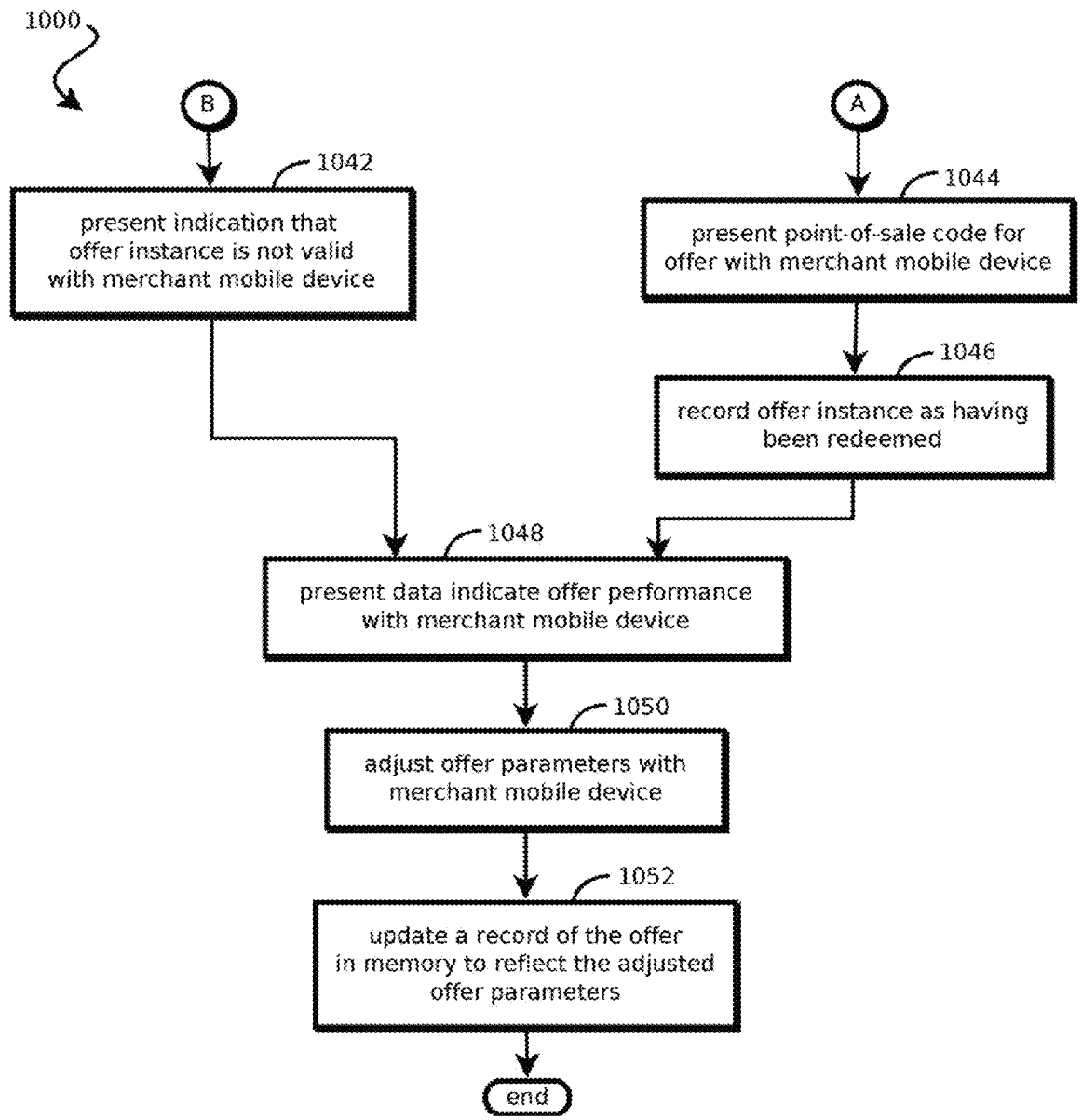

Aspects of the offer-discovery system 900 may be better understood with reference to FIGS. 10 and 11, which describe a process that, while not limited to the offer-discovery system 900, may be performed by some embodiments of the offer-discovery system 900. FIGS. 10 and 11 show a process 1000 for managing local, single-use offers created with a merchant mobile device. It should be appreciated that the process 1000, like the other processes shown herein, includes steps that may be performed in a different sequence from that described and illustrated.

In some embodiments, the process 1000 includes onboarding the merchant, as shown by block 1010. Onboarding a merchant may include creating a record in the merchant profile 934 corresponding to a new merchant. In some embodiments, the merchant may be onboarded by an administrator of the offer-distribution system 910 obtaining various information about the merchant, including billing information, locations of stores, employee identification information to populate employee records, characteristics of roles and permissions, and attributes of the merchant's POS systems. In some embodiments, the merchant may associate different types of POS systems with different merchant locations, such that different POS codes may be retrieved corresponding to the different geographic locations at which offers may be redeemed. In some embodiments, the POS-code supplier 928 may retrieve the appropriate POS-code in part based on geographic location or the identity of a store or employee and corresponding POS capabilities, as some merchants may maintain POS systems with different capabilities in different stores as newer systems are deployed over time.

Process 1000 further includes onboarding consumers, as indicated by block 1012. Onboarding consumers may include installing the above-described native application on consumer mobile devices or creating consumer accounts via the above-described web interface. The process of on boarding consumers and merchants may occur many times over time, as use of the offer-distribution system 900 described above becomes increasingly common, but for purposes of explanation, a single step for each is shown in FIG. 10.

In some embodiments, the process 1000 further includes presenting an offer-creation interface with a merchant mobile device, as illustrated by block 1014. In some embodiments, this step may include requesting from a merchant mobile device 912 an offer-creation interface from the offer-distribution system 900 via web server 18 or API server 16 and serving a responsive interface by which a merchant employee may create an offer. In some embodiments, information specifying offer may be obtained through a plurality of interfaces, such as web forms or native application inputs presented on display screen of the merchant mobile device in the course of an offer-creation workflow.

Some embodiments further include creating an offer with the merchant-mobile device by sensing geolocation and obtaining an amount of offer instances to be reserved, as indicated by block 1016. Creating an offer may include of obtaining offer parameters for creating an offer record in the offers data store 932 through entry of such parameters in the offer creation interface by the merchant employee. Examples of offer parameters include an expiration time for the offer (e.g., a date and time or duration); a title of the offer; a description of the offer including terms and conditions; a redemption location at which the offer may be redeemed, such as a store location; a reservation amount for the offer, such as a number of instances of the offer that may be reserved by consumers; and in some cases a redemption limit for the offer, such as a number of instances of the offer that may be redeemed by consumers (enforcement of which may be performed via the validation process described herein for offer validation). In some cases, different numbers of instances of an offer may be allocated by the merchant employee to consumers having different profile attributes. For example, the merchant employee may specify that 20% of the offer instances are to go to consumers having a profile in the data store 918 indicating that the consumer has previously redeemed an offer with the merchant and 80% of the offer instances are to go to consumers having a profile without such an indication. Such conditions may be applied by retrieving consumer profiles at the time embodiments determine whether to allow a consumer to reserve an instance of the offer, or alerts to the offer may be issued to only those consumers satisfying certain profile constraints entered during the offer creation process. In other examples, instances of an offer may be allocated based on other aspects of consumer profiles, such as aspects indicative of price sensitivity, aspects indicative of loyalty to the merchant, or aspects indicative of a propensity to buy a large amount of goods and services when present at a merchant site.

The merchant mobile device 912 may include hardware components that may be accessed by a native application to assist with the offer creation process. For example, the geographic location of the merchant mobile device 912 may be sensed based on satellite navigation (e.g., GPS or GLONASS) signals, cellular signal triangulation, or other geolocation techniques via a location API of an operating system of the merchant mobile device. In some embodiments the sensed geographic location may be presented in the offer creation interface as an initial value for the geographic location of the offer, for instance, with a default centerpoint corresponding to the sensed geographic location and a default radius, bounding box, or polygon defining a geofence around the centerpoint. Or some embodiments may retrieve a geofence corresponding to one of the geofence IDs discussed above with reference to FIGS. 5 and 6, e.g., a geofence containing the sensed location, and the retrieved, pre-determined geofence may be presented as a default or selected geographic location for the offer. In some embodiments, the geographic location of the offer may be adjustable by the merchant employee, for example, by interacting with elements displaying the default geographic location on the offer-creation interface.

In some embodiments, the geographic location of an offer may be defined by the broadcast range of a transmitter of wireless signals. For example, in some embodiments, the merchant mobile device may sense wireless beacons of transmitters in range, such as a Wi-Fi Beacons or a Bluetooth beacons (like Low-Energy Bluetooth beacons), and the merchant employee may be presented with a list of identifiers of such transmitters to select the geographic location. Consumer mobile devices later receiving the identified beacons or other identifiers may determine in response that they are within the geographic location corresponding to an offer. Using beaconing transmitters to indicate offer location is expected to facilitate offer discovery in indoor spaces, like in malls, where GPS signals are often attenuated and less reliable. These beacons may be sensed by the appropriate radio on consumer mobile devices, such as a Bluetooth radio, Wi-Fi radio, or the like. A variety of other types of wireless signals may also be selected with similar techniques and used, for example, identifiers may be encoded in audio signals in a store's background music, which may be sensed by a microphone of a consumer mobile device; or in fluctuations of intensity of florescent lights or other lights, for instance, which may be sensed by a camera of a consumer mobile device or light sensor of a consumer mobile device.

In some embodiments, the merchant mobile device may itself transmit a beacon or otherwise transmit wireless signals that encode an identifier of the geographic location of the offer. For example, in some embodiments, a native application of merchant mobile devices may be configured to cause the merchant mobile devices to act as Low-Energy Bluetooth transmitter (as defined by the Bluetooth 4.0 specification), transmitting an identifier of a particular store or department, such that merchant employee devices executing the native application, for instance, as a background process during their work hours, cause the beacon to be transmitted to consumer mobile devices in range, for instance, within approximately 50 meters. In other examples, the merchant mobile devices may transmit a Wi-Fi Beacon, such as an SSID value or media access control address, indicative of the geographic location of an offer.

In some embodiments, multiple geographic locations may be associated with an offer, and default values or initial values for those geographic locations may be acquired based on a location sensed by the merchant mobile device based on wireless signals (e.g. wireless radio signals, satellite positioning signals, audio signals, light signals, and the like). For example, in some embodiments, the offer creation interface may include an option to select a larger geographic area centered on the merchant mobile device's current location in which consumers are alerted to the offer and presented with instructions to travel closer to the merchant, along with an inner geographic location also centered on the merchant mobile device, in which consumer mobile devices are alerted with a notification that the offer is available to be reserved. Such staged presentation of offers is expected to broaden the reach of an offer while economizing the available instances of an offer to be reserved for those consumers more likely to redeem the offer or purchase goods or services. That said, not all embodiments necessarily provide this benefit, as various engineering, complexity, and cost tradeoffs are envisioned.

In some embodiments, nested geographic locations may be selected. For instance, the merchant employee may specify with the merchant mobile device offer creation interface that consumers are to be alerted to the offer with the option of reserving the offer in an outer, larger geographic location and be reminded of reserved offers within an inner geographic location. For example, consumers may be presented with the option of reserving offers within a geofence defined by latitude and longitude coordinates of vertices of a bounding polygon that encompasses a neighborhood, and consumers may be reminded of reserved offers when in a geographic location defined by a wireless Beacon transmitted by a Bluetooth transmitter in the store within the neighborhood. Relevant geographic locations may be cached on consumer mobile devices and notifications may be presented using the techniques described above with reference to FIGS. 6-7. This form of staged offer reservation and reminder is expected to increase redemptions over systems that merely provide for offer reservation, as some consumers may forget that they reserved an offer while driving through the neighborhood before going to the corresponding merchant physical location. That said, not all embodiments necessarily provide this benefit, as various engineering, complexity, and cost tradeoffs are envisioned.

In some embodiments, merchant employees may specify that different offers are to be presented in the inner and outer geographic locations. For example, a merchant employee may determine that a greater discount is needed to entice consumers that are likely in their cars driving near a mall relative to the discount needed to entice consumers walking in a mall near a store, in which case, the merchant employee may associate a more generous discount with an offer corresponding to a larger geographic location encompassing an entire neighborhood and a less generous offer corresponding to a geographic location defined by a wireless beacon transmitted around a store of the merchant. In some cases, latitude and longitude defined geofences may be used for geographic areas larger than 0.5 square kilometers and beaconing may be used for smaller geographic locations.

In some cases, an offer may be associated with negative geographic locations defining areas in which consumers are not to be alerted to an offer. For example, for a given offer, a geofence may define a geographic location encompassing various streets around a mall to target consumers driving by the mall, while a beacon or smaller geofence may be used to exclude a smaller area within the larger area to avoid alerting consumers already close to a store to an offer. Consumer mobile devices may be sent both the outer positive geographic location and the inner negative geographic location with instructions to only alert the consumer to the offer if the consumer is both in the outer positive geographic location and outside the inner negative geographic location. Such negative geographic locations are expected to increase the effectiveness of offers for merchants who avoid spending their offer budget on consumers close to a store likely to visit a store even without the offer while still enticing other consumers who might not otherwise visit. That said, not all embodiments necessarily offer these benefits, which is not to suggest than other features may not also be omitted in some embodiments.

Other hardware components commonly available on merchant mobile devices may further expedite the process of creating offers. For example, a camera on a merchant mobile device may be engaged by a native application of the merchant mobile device during the offer-creation process to capture an image to be displayed with the offer on the consumer mobile device when viewing various interfaces relating to the offer. In some embodiments, multiple images or video captured with the merchant mobile device may be associated with an offer. In some cases, the offer-creation interface may present the merchant employee with the option of retrieving an image from memory of the merchant mobile device or capturing a new image with the camera, such as an image of the merchandise to be discounted or an image of the exterior of the store. Leveraging the hardware for sensing geolocation and the hardware for image capture that is frequently present in merchant mobile devices carried by employees in stores is expected to facilitate low-cost offer creation by merchant employees in the field relative to other systems in which a merchant might engage a professional photographer to bring a special-purpose camera to a studio and have the merchandise professionally photographed for a nationwide campaign while having other employees use a desktop computer to define geographic areas in which the offer is redeemable. That said, not all embodiments necessarily provide this benefit, as various engineering, complexity, and cost tradeoffs are envisioned.

In some cases, additional information relating to the offer may be captured with hardware present on the merchant mobile device 912. For example a camera of the merchant mobile device may be engaged with a native application during the offer creation process to scan a barcode of merchandise to be discounted, thereby relatively reliably associating the offer with a product code of merchandise to which the offer pertains within the merchant's POS system. In another example, audio captured with the microphone of the merchant mobile device may be associated with the offer, and such audio may be conveyed to consumer devices to be played as an alert when the consumer mobile devices are within a geographic location corresponding to the offer. Such merchant-employee specified information may be conveyed by the merchant mobile device 912 to the offer-distribution system 900 via network 48 to create an offer.

In some embodiments, the offer-distribution system 910 may validate roles and permissions of the merchant mobile device user, as indicated by block 1018. In some embodiments, the merchant mobile device 912 stores in memory (e.g., in native application state or a browser-accessible cookie) an identifier of the merchant employee, or the merchant employee enters such an identifier in the offer-creation interface, such that the offer-distribution system 910 receives an employee identifier for correlation with roles and permissions of the employee stored in the merchant profile 934. In some embodiments, such roles and permissions indicate that the employee's offers must be approved by a supervisor identified in the employee record, and embodiments of the offer-distribution system 910 may send a request to another merchant mobile device of the supervisor with an approval interface by which the supervisor may view the proposed offer and approve or deny the offer by sending a response to the offer-distribution system 910 via the interface.

Some embodiments may store the created offer in an offer record of an offer-discovery system, as indicated by block 1020. In some cases, this step may be performed by the above-described single-use offer constructor 922, which may create the appropriate records in the offers data store 932.

Some embodiments may instruct consumer mobile devices to alert consumers to the offer when in a geofence (or other defined geographic location, like within range of a beacon transmitter) of the offer, as indicated by block 1022. For example, using techniques described above with reference to FIGS. 4 through 7, some consumer mobile devices may execute a background process as part of a native mobile application that queries the offer-distribution system 910 for offers corresponding to geographic locations near a current location of the consumer mobile device, and the background process may store those responsive geographic locations, such as geofences, in memory. The background process may monitor a current geographic location of the consumer mobile device (which may include sensing wireless beacons indicative of a location) and, in response to the consumer mobile device being determined to be within one of the cached geographic locations, take steps described below. In some cases, the geographic location is defined by a wirelessly transmitted signal from a wireless transmitter in the geographic location, such as a value encoded in a Bluetooth (e.g. Low-Energy Bluetooth) Beacon or in an SSID value from a wireless access point. In some cases, the wireless beacon may have a range larger than 10 meters, to draw in consumers not currently within a store. Accordingly, some consumer mobile devices may both determine whether the consumer mobile device has entered a geofence stored in memory or has received a wireless signal encoding a value corresponding to an offer.

In some embodiments, a consumer mobile device may determine whether the consumer mobile device is in the geofence, or other geographic location, as indicated by block 1024. This determination may be performed by a background process executing on each of the consumer mobile devices that retrieves wireless signal identifiers (e.g. SSID values, values included in Bluetooth beacons, and the like) and geofences definitions from the offer-distribution system 910 corresponding to offers valid within some distance of the current geographic location of the consumer mobile device, for example, within a 20-mile radius or a 50-mile radius. These responsive geographic locations may be stored in memory of the consumer mobile devices, and the consumer mobile devices may continue to monitor the current geographic location of the consumer mobile devices and determine whether each consumer mobile device is within a geographic location corresponding to an offer. Caching the geographic locations is expected to accommodate lapses in coverage by wireless carriers and reduce the number of interactions between the consumer mobile devices and the offer-distribution system 910, though not all embodiments necessarily provide this benefit. In some cases, the consumer mobile devices 914 and 916 may periodically query the offer-distribution system 910 for updates on offers within the corresponding geographic area to obtain newly created offers, for example, every 10 minutes, every hour, or every day.

Upon determining that the consumer mobile device is not in a geofence or otherwise at a geographic location of an offer, embodiments may continue to monitor the consumer mobile device's current location with the background process. Alternatively, upon determining that the consumer mobile device is at such a geographic location (e.g. has traversed the geofence, is within an area defined by a geofence, or is receiving a wireless signal from a transmitter at the geographic location), embodiments may proceed to the next step.

Some embodiments may alert consumers to an offer with the consumer mobile device, as indicated by block 1026. Alerting the consumer may include taking the steps described above with reference to FIGS. 5-7 to notify a consumer. Some implementations include engaging a haptic interface of the consumer mobile device, adding a notification to a notification bar displayed by a operating system of the consumer mobile device, causing the consumer mobile device to send an alert (or other notification) to another consumer mobile device (such as a wearable consumer device, like a smart watch or heads-up display, e.g., by determining that such a device is present based on a personal wireless network and also has a corresponding native application installed before sending the alert), or otherwise take action directed to alerting the consumer to the offer. Some embodiments may rate limit alerts for consumers, for example, grouping alerts for offers and presenting a group of offer alerts collectively, for instance, every 10-minutes or every hour, or some embodiments may determine that more than a threshold number of alerts have been presented by the consumer mobile device within a preceding duration and decline to present the additional alert. Rate limiting alerts is expected to reduce the likelihood that the consumer will be annoyed by excessive alerts and encourage use of the native mobile application, though not all embodiments necessarily provide this benefit.

In some embodiments, upon the consumer selecting a notification presented on a display screen of the consumer mobile device, the consumer mobile device may request an offer-reservation interface, as indicated by block 1028. In some embodiments, this request may include an identifier of the offer and an identifier of the user corresponding to a record of a user profile in the data store 918, such that interactions with the offer can be tracked and the appropriate interface can be constructed by the offer-distribution system 910. The identifier of the user may be obtained with a variety of techniques. For instance, a unique user identifier stored in memory of the consumer mobile device accessible to a web browser or native application may be sent with the request; an identifier of the consumer mobile device may be sent as an identifier of the user (like an advertiser identifier, a vendor identifier, or a medium-access control address); or embodiments may send a value based on biometric data, for instance a hash value calculated based on an image of the consumer captured with a camera of the consumer mobile device or based on data acquired with a finger-print scanner of the consumer mobile device.

Upon receiving the request, the offer-distribution system 910 may determine whether all instances of the offer have been reserved, as indicated by block 1030. Upon determining that all instances of the offer been reserved, the process may terminate, which is not suggest that various other subsets of the process 1000 being executed concurrently are not continuing to be executed, for example, the consumer mobile device may continue to alert the consumer to additional offers, and additional offers may be created. In some cases, an alert may be sent by the offer-distribution system 910 to an employee mobile device 912 upon a determination that all instances of an offer have been reserved, so that an employee may elect to create additional instances and expand the offer. In some cases, to make the present determination, a number of reserved instances of an offer, such as a count incremented with each reservation, is compared to a maximum number of reservations defined during the offer creation process, or other embodiments may perform other comparisons, such as determining whether a maximum number of instances of an offer allocated to users having particular profile attributes have been reserved. Alternatively, upon determining that all instances of the offer have not been reserved, the process may proceed to the next step.

In some cases, a maximum number of offer instances per consumer is designated in the above-described offer records, and embodiments of the offer-distribution system may additionally determine whether a request for an offer-reservation interface comes from a consumer who has already reserved the designated maximum amount (e.g., number) of offer instances of the offer for which the interface is requested. For instance, the offer-instance records for a given offer may be queried upon receiving a request for an offer-reservation interface to identify and quantify the amount of offer instances currently reserved by the consumer in question, e.g., by matching a unique user identifier sent with the request and stored in previously reserved offer instances. Upon determining that the per-consumer limit for the offer would be exceeded with an additional reservation, embodiments may end. Otherwise, embodiments may proceed to the next step.

Limiting offer instance reservations on a per-consumer basis is expected to enhance the benefit merchants derive from issuing offers, as a given merchant budget for discounts may be spent on a larger number of consumers, driving more consumers to engage with the merchant than might engage if relatively few consumers reserved a substantial number of the offer instances. Further, identifying consumers with biometric techniques is expected to make such techniques relatively resilient to efforts by consumers to reserve a large number of offer instances with scripting attacks, e.g., by programmatically generating a large number of user accounts for a given consumer. That said, not all embodiments necessarily offer these benefits, which is not to suggest that other features are not also optional.

In some cases, an additional copy of the offer instance records may be stored in a data structure selected to facilitate relatively fast retrieval based on user identifier, e.g., in a hash table of reserved instances for each offer in which a key value is based on user identifiers or in a list for each offer sorted by user identifier of reserved offer instances. Such pre-processed data structures are expected to reduce latency in responding to consumer requests for offer-reservation interfaces, which is expected to increase the effectiveness of such offers for merchants. That said, not all embodiments necessarily offer these benefits, which is not to suggest that other features are not also optional.

Next, some embodiments may reserve an instance of the offer, obtain a unique offer instance code, and adjust a measure of the amount of reserved offers, as indicated by block 1032. This step may be performed by the above-described offer-distribution system 910 in some cases. Reserving an instance of the offer may include creating an instance record in the corresponding offer record of data store 918 with the single-use offer constructor 922 shown in FIG. 9. In some cases, the offer instance code is obtained by incrementing counter for each instance reserved, with the count corresponding to a unique code when combined with an identifier of the offer. In some cases, unique offer instance codes may be generated such that a user in possession of a given unique offer instance code would not be readily able to infer another offer instance code, for example, by inferring that if their offer instance code corresponds to a count, other valid offer instance codes are lower values of the count. Preventing a consumer from inferring offer instance codes of other consumers may impede efforts by a given consumer to use offer instance reserved by others. In some cases, the unique offer instance code is based on information unavailable to other consumers, for example, based on a hash value calculated with a user identifier, a timestamp, or other distinguishing value as an input. In some cases, a calculated offer instance code may be compared to existing offer instance codes to confirm that a hash collision has not occurred and that the resulting value is unique among the instances of an offer or unique among all outstanding instances of offers. In other cases, the hash function may be selected such that collisions are sufficiently unlikely and rare that the risk of collisions can be neglected. In some cases, embodiments adjust the measure of the amount of reserved offers, for example, by incrementing or decrementing a count of offer instances that have been reserved. In other examples, other types of amounts may be adjusted. For example, an offer may specify a particular frequency of offer reservations, such as five reservations per day, and a current frequency may be adjusted.

Some embodiments may next send a reservation confirmation to the consumer mobile device, as indicated by block 1034. Sending a reservation confirmation may include sending a confirmation interface to the consumer mobile device by which the consumer may select a mobile device to receive offer redemption information, for example, by sending instructions to display a text box input by which a consumer enters a phone number to which a URL will be texted that links to information to redeem the offer instance. The URL may encode the unique offer instance code, such that the offer instance is recognizable by the offer-distribution system 910 for tracking and generating the appropriate redemption information. Sending a link (or other value by which information may be requested) to the consumer mobile device as intermediate step in redeeming the offer instance is expected to facilitate tracking of the offer instance, as the offer-distribution system 910 receives an additional signal at the time the consumer retrieves the redemption information for the offer instance, thereby providing an additional signal of and context to purchase intent.

In other examples, the consumer may be invited by the confirmation interface to input other addresses, accounts, or devices at which the redemption information is to be made available, and this information may be sent to the offer-distribution system 910, which may perform the requested action. For example, the consumer may be invited to input an email address, a social networking account, an electronic wallet identifier, or a card-linked offer account through which the redemption information for the offer instance will be made available, and the offer-distribution system 910 may convey the information to the appropriate device or account via network 48. In some cases, the confirmation interface may be pre-populated with account or device identifiers drawn from a user profile stored in the user data store 56. In other cases, the offer redemption information may be sent to the consumer mobile device as the confirmation, and the consumer may print the information for presentation to a merchant employee or store the information in memory of the consumer mobile device for presentation without further exchanges with the offer-distribution system 910.

Next, in some embodiments, the reserved offer instance is presented with the consumer mobile device, as indicated by block 1036. In some cases, the reserved offer instance is presented with another mobile device of the consumer. For example the consumer may reserve the offer with their tablet computer and present the offer instance with their cell phone or smart watch. Thus, in some cases, the consumer may interact with an offer-reserving consumer mobile device that is distinct from an offer-redeeming consumer mobile device. The offer instance may be presented on the consumer mobile device by requesting redemption information using a URL texted, emailed, or otherwise conveyed to the consumer mobile device, or in some cases, the redemption information may be pre-stored in memory of the consumer mobile device, for example, by being pushed to or pulled by a native application executing on the consumer mobile device communicating with the offer-distribution system 910 and capable of requesting such information associated with a user identifier of the consumer who reserved the offer instance.

Presenting the reserved offer instance may include emitting a signal by which the unique offer instance identifier is conveyed to the merchant mobile device. For instance, some embodiments may compose a two-dimensional barcode, such as a QR code, on the offer-distribution system 910, and send a resulting barcode image to the consumer mobile device with instructions to display the barcode image after the redemption information is requested. The barcode image may encode a URL that refers to the offer-distribution system 910 requests validation of the offer instance with the unique offer instance identifier. An application executing on the merchant mobile device may scan the barcode image displayed on the screen of the consumer mobile device with a camera of the merchant mobile device, thereby obtaining the unique offer instance identifier for subsequent validation steps. In some embodiments, such an application on the merchant mobile device may automatically attempt to retrieve information from a URL encoded in the barcode image, thereby requesting validation without further interaction by the merchant employee, simplifying the validation process during checkout and lowering the cognitive burden placed on merchant employees.

In other cases, the reserved offer instance may be presented with other techniques, for example, with an image of a one-dimensional barcode that is sensed by a camera of the merchant mobile device; by modulating the brightness or color of a region of the display screen of the consumer mobile device over time to signal the offer instance identifier, emitting a signal that is sensed by a video camera of the merchant mobile device; by emitting with a speaker of the consumer mobile device audio that encodes the unique offer instance identifier and is sensed by a microphone of the merchant mobile device (e.g., with audio signals at a frequency above that which humans can typically hear, like over 20,000 Hz); or by transmitting a radiofrequency signal (such as a near field communication signal, a Bluetooth signal, or a Wi-Fi signal) that is received via an antenna of the merchant mobile device.

Conveying the offer instance redemption information to the merchant mobile device, rather than directly to a point-of-sale terminal of the merchant, is expected to facilitate use of the present techniques by merchants having legacy point-of-sale systems that are incapable of integrating, or too expensive to integrate, with single use offers and the offer-distribution system 910. The merchant mobile device, in some embodiments, provides a side-channel line of communication with the offer-distribution system 910 by which instances of offers are tracked and verified, without the need to update the POS terminal. That said, some techniques described herein are also consistent with a POS terminal that directly receives the redemption information from the consumer mobile device. (Indeed, in some cases, the same merchant mobile device creates the offer, transmits a beacon identifying the geographic location, requests offer validation, and serves as the point of sale terminal by being coupled with a credit-card scanner, in which case the offer instance validation information may automatically instruct the merchant mobile device to apply the appropriate discount.)

As a further advantage, the merchant mobile device, in many cases, has various sensors and antennas and radios by which identifiers of reserved offer instances may be obtained (as described above) from an offer instance presented by a consumer without the time-consuming and expensive process of manually entering relatively long unique offer instance codes by a merchant employee into the merchant mobile device or other device. Though again, some embodiments are consistent with use cases in which the consumer mobile device displays a unique offer instance code as a string of characters, and the merchant employee manually types in those characters into another device.

Next, in some embodiments, the merchant mobile device requests offer instance validation, as indicated by block 1038, for example, from the offer-distribution system 910 over network 48. In some cases, the request includes the unique identifier of the reserved offer instance presented by the consumer mobile device, for instance, encoded in a QR code on the display. The request may also include additional context for tracking the transaction. For instance, the request may include an identifier of the merchant employee, such as a value associated with the device being used, like a UDID, a MAC address, or an IP address; or a value associated with the employee, like an employee username or identifier by which the employee obtains access to the offer-distribution system 910. The request may also encode additional information entered by the employee to provide additional context, for example, by the employee manually typing and additional information, the employee optically scanning various barcodes available at the employee's workstation with the camera of the merchant mobile device, or the employee inputting various values using a near field communication interface of the merchant mobile device and various near field communication tags available at the employee's workstation, for example, in a retail store checkout area. This additional context may be used by the control module 920 to uniquely identify the transaction within a report of transactions from a merchant server, such that the entity operating the offer-distribution system 910 may be compensated for the entire basket of goods purchased with the offer.

Requesting offer instance validation with the merchant mobile device 1038 is expected to facilitate use of single-use offers, as individual instances of offers may be tracked centrally by the offer-distribution system 910, thereby impeding efforts to reuse instances that have already been redeemed. Upon receiving the request, the offer-distribution system 910 may indicate in memory that the offer instance has been redeemed, thereby preventing subsequent attempts to reuse the offer instance and facilitating tracking and calculation of aggregate statistics about the offer for monitoring by merchant employees. Further, requesting offer instance validation is expected to reduce instances of breakage from the perspective of the entity operating the offer-distribution system 910, as often occurs when a consumer presents a coupon with a unique code, and the sales clerk scans an different code at their workstation offering an equivalent discount, an action which satisfies the consumer and is often more ergonomic for the clerk, but fails to allocate credit to the entity operating the offer-distribution system 910.

In some cases, biometric data is acquired with the merchant mobile device or consumer mobile device to establish that the consumer is present and that the consumer has not acquired the offer instance from another consumer, thereby thwarting efforts to limit the per-consumer number of offer instances reserved or redeemed. For instance, upon being requested by a merchant employee to validate an offer instance, an application executing on the merchant mobile device may display instructions to direct a camera at the consumer's face and capture an image, or the merchant employee may be instructed with the display by the application to acquire a fingerprint scan of the consumer with a fingerprint scanner of the merchant mobile device. The application executing on the merchant mobile device may then acquire an image with the camera or scan a fingerprint of the consumer, and biometric data (e.g., a hash value based on facial or fingerprint features) indicative of the identity of the consumer may be sent to the offer-distribution system, which may compare such biometric data with data in a user profile or data in the offer-instance record to confirm that the consumer present is the consumer who reserved the offer. In other cases, such biometric data may be acquired with the consumer mobile device. For instance, the consume mobile device may obtain this biometric data upon prompting from the offer-distribution system in response to the system receiving a request to validate the offer, and the consumer mobile device may send the biometric data to the offer-distribution system to confirm that the offer is being presented by the consumer who reserved the offer. In some cases, the offer-distribution system may indicate an offer instance is invalid or unredeemable unless the biometric data is presented as part of an offer-instance validation session.

In some embodiments, the offer-distribution system 910 may receive the request, which may be an API call or a GET request (which is not to suggest that these requests categories cannot overlap) for a URL encoding the relevant parameters, and determine whether the offer instance code in the request is valid, as indicated the block 1040. Determining whether the offer instance code is valid may include retrieving an instance record from the data store 918 corresponding to the offer instance in question, and querying this record to determine whether the offer instance has already been redeemed. Upon determining that no offer instance record exists, the offer instance code in the request may be deemed invalid. Similarly, upon determining that the offer instance record indicates the offer instance has already been redeemed, the offer instance code may be deemed invalid. Alternatively, if (e.g., if and only if) both of these conditions are false, the offer instance may be deemed valid.

In some cases, offer instance records may be preprocessed to form, and stored in, a data structure selected to facilitate relatively fast retrieval of offer instance records, as the number of such offer instance records is expected to be relatively large in some cases and user sensitivity to latency is expected to be high for validation at checkout. Accordingly, some embodiments may presort offer instance records by unique offer instance identifier, such that a given offer instance record may be retrieved relatively quickly with a binary search, or offer instance records may be stored in other data structures to facilitate relatively fast retrieval, such as a hash table with key values calculated based on the offer instance identifiers, in a prefix tree based on offer instance identifiers, or the like.

In some embodiments, network access by merchant mobile devices may be relatively unreliable, causing validation request to be unreliable. To mitigate these problems, some embodiments may push valid offer instance codes in advance to a native application executing on the merchant mobile devices, and these valid offer instance codes may be stored in memory in advance on the merchant mobile devices. The native application on the merchant mobile devices, upon receiving a request to validate a unique offer instance code, may verify the offer instance codes in the cache memory upon determining that network access is not available to the offer-distribution system. The native application on merchant mobile devices may update the record in memory of the merchant mobile device to reflect redemption of the offer instance and convey this information to the offer-distribution system 10 at a later time when the network access is restored. To reduce the likelihood of double spending of an offer instance on different merchant mobile devices in this use case, some merchant mobile devices may execute a native application configured to synchronize offer instance records with other merchant mobile devices operating on the same local area network, for example, having access to the same wireless access point. In other cases, offer instance validation may depend on network access, or an instance of the offer-distribution system 910 may be installed on a local area network of a merchant site.

Process 1000 continues on FIG. 11. As illustrated, upon determining that the offer instance code in the request is invalid, embodiments may present an indication that the offer instance is not valid with the merchant mobile device, as indicated by block 1042. Presenting such an indication may be preceded by receiving a request for validation at the offer-distribution system 910, determining that the offer is invalid, and sending to the merchant mobile device instructions to display such an indication, for example, by presenting the indication on a display screen of the merchant mobile device for visual inspection by the merchant employee. In some cases, the time of a previous redemption may also be conveyed and displayed so that the merchant employee can explain why the offer instance is invalid.

In another branch shown in FIG. 11, upon determining that the offer instance code in the request is valid, embodiments may proceed to step 1044, and present a point-of-sale code for the offer with the merchant mobile device, as indicated by block 1044. In some cases, this step may be preceded by the POS-code supplier 928 determining a POS code based on information in the merchant profile 934, and this POS code may be sent to the merchant mobile device over network 48 with instructions to display the POS code on a display screen of the merchant mobile device. The instructions to display the POS code may include instructions to indicate that the offer instance is valid and that the POS code should be entered into the POS system by the merchant employee. In some cases, the POS code is a relatively short, for example four to six digits, code that the merchant employee manually keys into the POS system. Or in other examples, the POS code may be presented as a barcode image on a display screen of the merchant mobile device that the merchant employee scans with an optical or laser scanner of the POS system. In other cases, the POS code may be conveyed with other techniques, like those described above for exchanging information between the consumer mobile device and the merchant mobile device. Upon receiving the POS code, the merchant's POS system may apply the appropriate discount for the offer to the transaction (e.g., by retrieving the discount from a merchant database in which pricing information is stored based on the POS code), and the transaction may be recorded in the merchant's computer system, creating a record that in some embodiments, may be used to compensate the entity operating the offer-distribution system 910.

Embodiments may further record the offer instance as having been redeemed, as indicated by block 1046. This step may be performed by the above-described offer-instance manager 924 to prevent the offer instance from being subsequently redeemed again. Some embodiments may perform additional steps to change a redemption interface on the consumer mobile device to indicate that the offer instance has been redeemed.

Figure 14A:
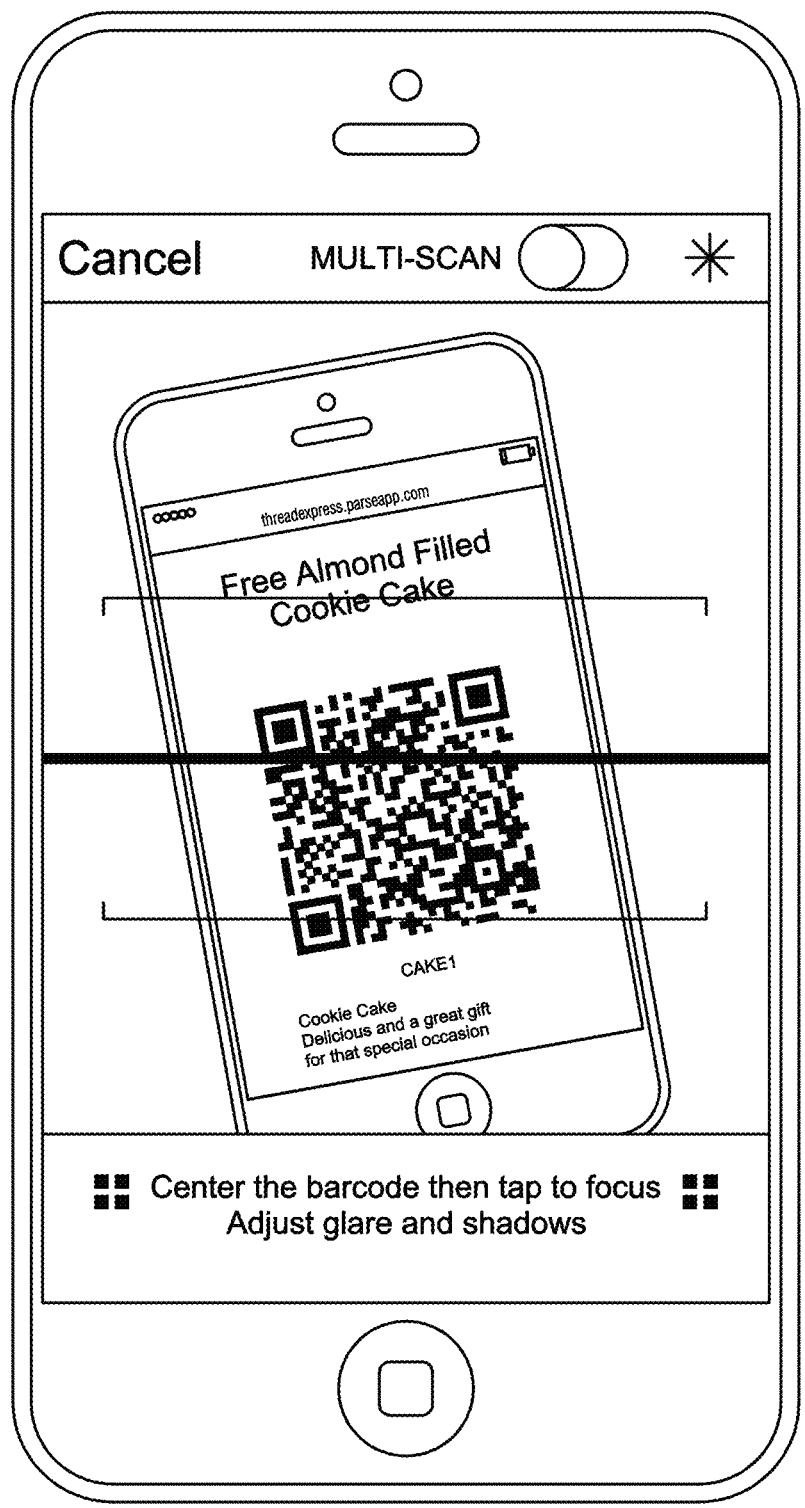
FIG. 14A shows an example of a validation interface by which a QR code is captured from a display screen of a consumer mobile device using a camera of a merchant mobile device.
Figure 14B:
FIG. 14B shows an example of an updated display screen presented on a consumer mobile device after the offer has been redeemed, indicating that the redemption information no longer corresponds to a valid offer instance.

For instance, a web page on which the redemption information (or other display of an offer instance) is displayed may include instructions to poll the offer-discovery system 910 for changes in an offers redemption state (e.g., by repeatedly querying the state of the offer instance, for instance periodically), and in response to such a change, the web page may be replaced with a new web page displaying the new redemption state. For example, the offer-distribution system may send instruction (e.g., JavaScript™ code or data that when processed by a client effectuates a change) to update a display. An example of such an updated display is illustrated in FIG. 14B. In other examples, a webpage on which the redemption information is displayed may include instructions to receive updates pushed from the offer-distribution system, for instance, with duplex communication established with a websocket connection to the system. An event handler in such instructions may detect and updated state has been received and the consumer mobile device and cause a different view to be rendered to depict the updated state. Similarly, the offer-distribution system may respond to a signal that an offer instance has been redeemed by pushing such an indication to the consumer mobile device. Similarly, requests for web pages displaying redemption information may be processed by the offer-discovery system 910 by first determining whether the offer instance has been redeemed and sending different responsive web pages indicative of redemption or lack of redemption. In other embodiments, a native application executing on the consumer mobile device may pull, or the offer discover system 910 may push, such information, and a display on the consumer mobile device may be similarly updated to reflect a change in the redemption state of an offer instance. Such updates are expected to reduce frustrating events for the consumer in which a consumer retrieves redemption information, redeems the offer instance, forgets that the offer instance has been redeemed, and mistakenly attempts to re-redeem the offer instance.

In some cases, additional communications may be sent to the consumer mobile device upon redemption, for instance, follow-on offers selected based on the redemption, offer sharing or commentary instructions, surveys, or other kind of "follow up" interaction with a consumer in or after the redemption success screen.

Some embodiments may further facilitate tracking of offers and adjustments to offers based on real-time (e.g., with less than a 15 minute lag) feedback received from merchant mobile devices validating instances of offers being redeemed and consumer mobile devices reserving instances of offers. The offer tracker 930 may calculate statistics on such offers, such as a number of offers reserved, a number of offers redeemed, a reservation rate, a redemption rate, statistics on consumers reserving offers based on user profiles or geolocation data (which is not to imply that user profiles cannot also contain geolocation data), or statistics on consumers redeeming offers based on user profiles or geolocation data.

In some cases, the process 1000 further includes presenting data indicating offer performance with the merchant mobile device, as indicated by block 1048. As noted above, different roles may be performed by different merchant mobile devices, and the present functionality that may be accessed in some cases with an offer-monitoring merchant mobile device, which may be the same mobile device or a different mobile device from those discussed above. In some cases, the merchant mobile device may send a request for an offer monitoring interface to the offer-distribution system, which may send in response a list of responsive offers that have been previously selected and certain statistics summarizing those offers. In some cases, the merchant mobile device may select an individual offer and view further, more detailed statistics on that offer by sending a subsequent request focused on that individual offer. The offer-distribution system 910 may retrieve or calculate the responsive information and send that information to the merchant mobile device.

In some cases, a native application executing on the merchant mobile devices may be configured to run as a background process to receive and display notifications related offers that have obtained conditions corresponding to alerts requested by the merchant. For example, the merchant mobile device may present a notification or otherwise alert the merchant when an offer reservation amount exceed some threshold specified during the process of creating offer and stored in an offer record, or the merchant mobile device may present a notification in response to a redemption rate exceeding some threshold frequency or other specified conditions. The offer tracker 930 may periodically query offer instance records to determine whether any alert conditions have obtained, and send instructions to merchant mobile devices to present appropriate notifications.

In some embodiments, upon displaying data indicating offer performance, the merchant mobile device may present an interface by which the merchant employee may adjust offer parameters, as indicated by block 1050. Adjusting offer parameters may include sending instructions of the offer instance manager 924 to eliminate unreserved instances of an offer, to eliminate reserved instances of an offer, and to send a message to consumers (if, for example, their request to reserve an instance of an offer was not timely enough), to increase the amount of offer instances available for reservation, or to create a new offer based on a given offer but with different terms, for example, a more favorable discount. In some embodiments, terms of offers that have already been reserved may be adjusted, for example, by increasing a discount available to consumers who have reserved but not yet redeemed an offer, and a message may be sent by the offer-distribution system 910 to consumer mobile devices having reserved but not yet redeemed the offer indicating the more favorable terms. Finally, in response, some embodiments may update a record of the offer in memory to reflect the adjusted offer parameters, as indicated by block 1052.

Figure 12A:
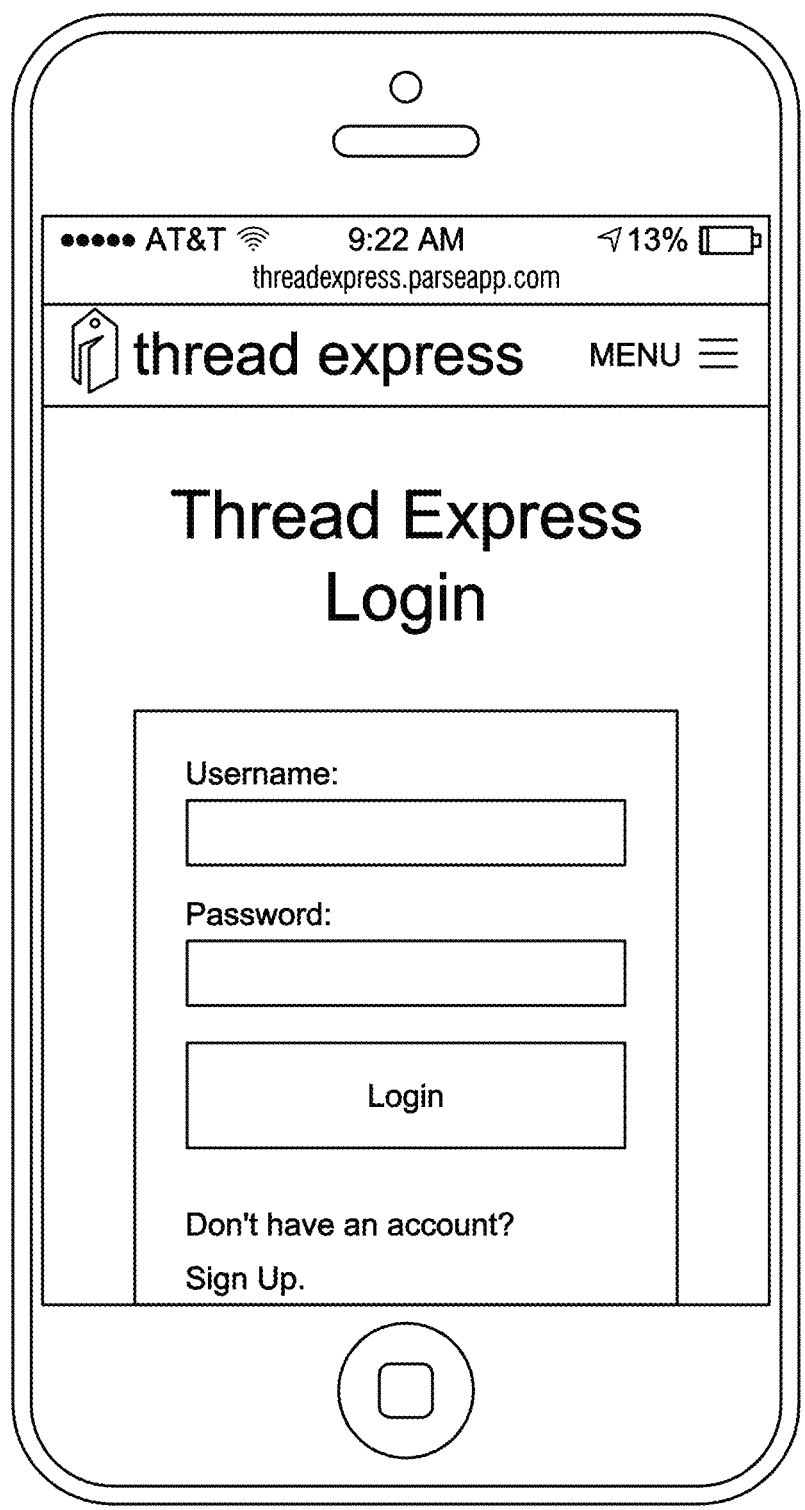
FIGS. 12A-C show examples of an offer creation interface by which a merchant employee logs in to create offers (FIG. 12A) and creates the offer (FIGS. 12B and C)
Figure 12B:
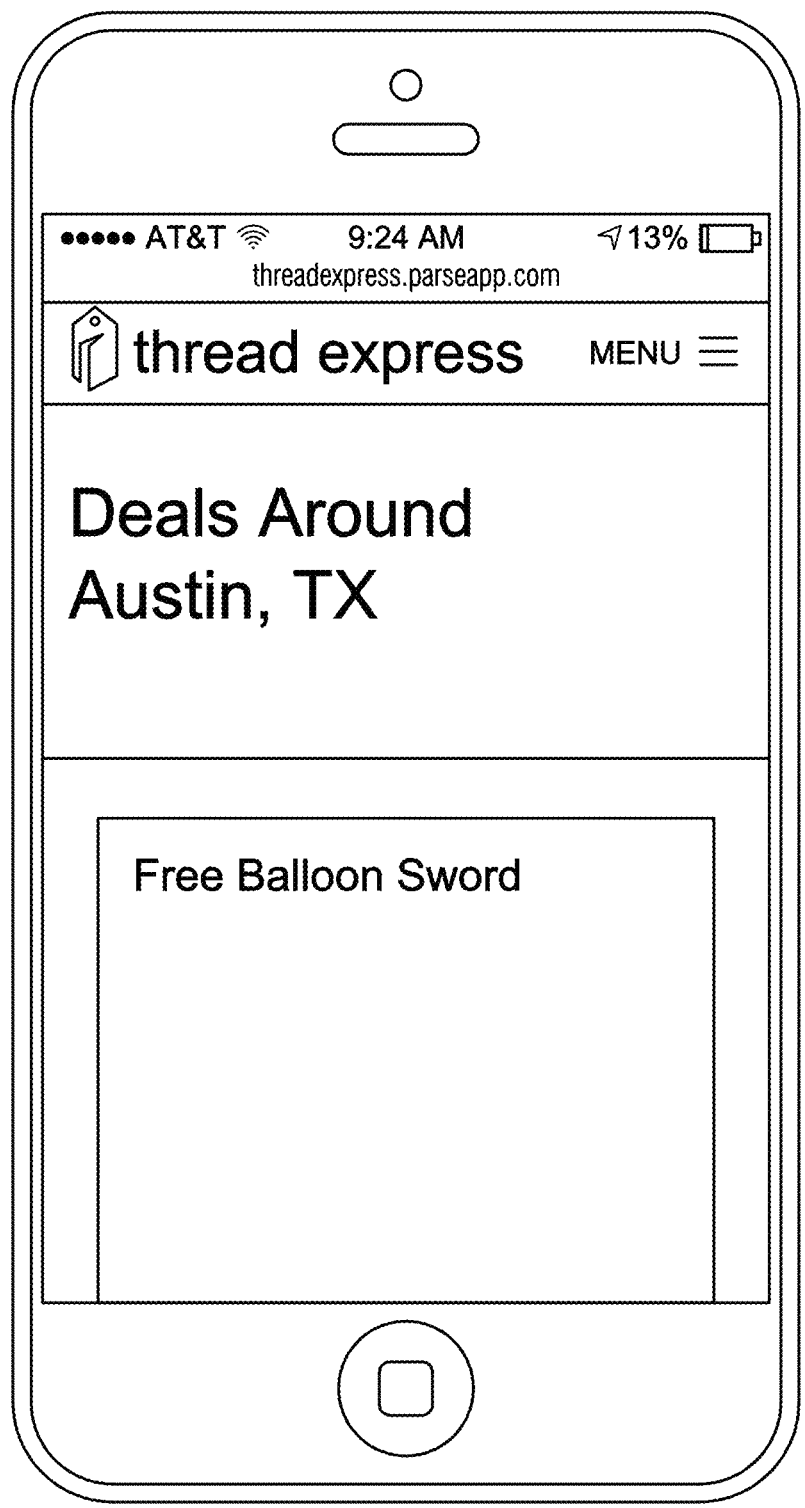
Figure 12C:
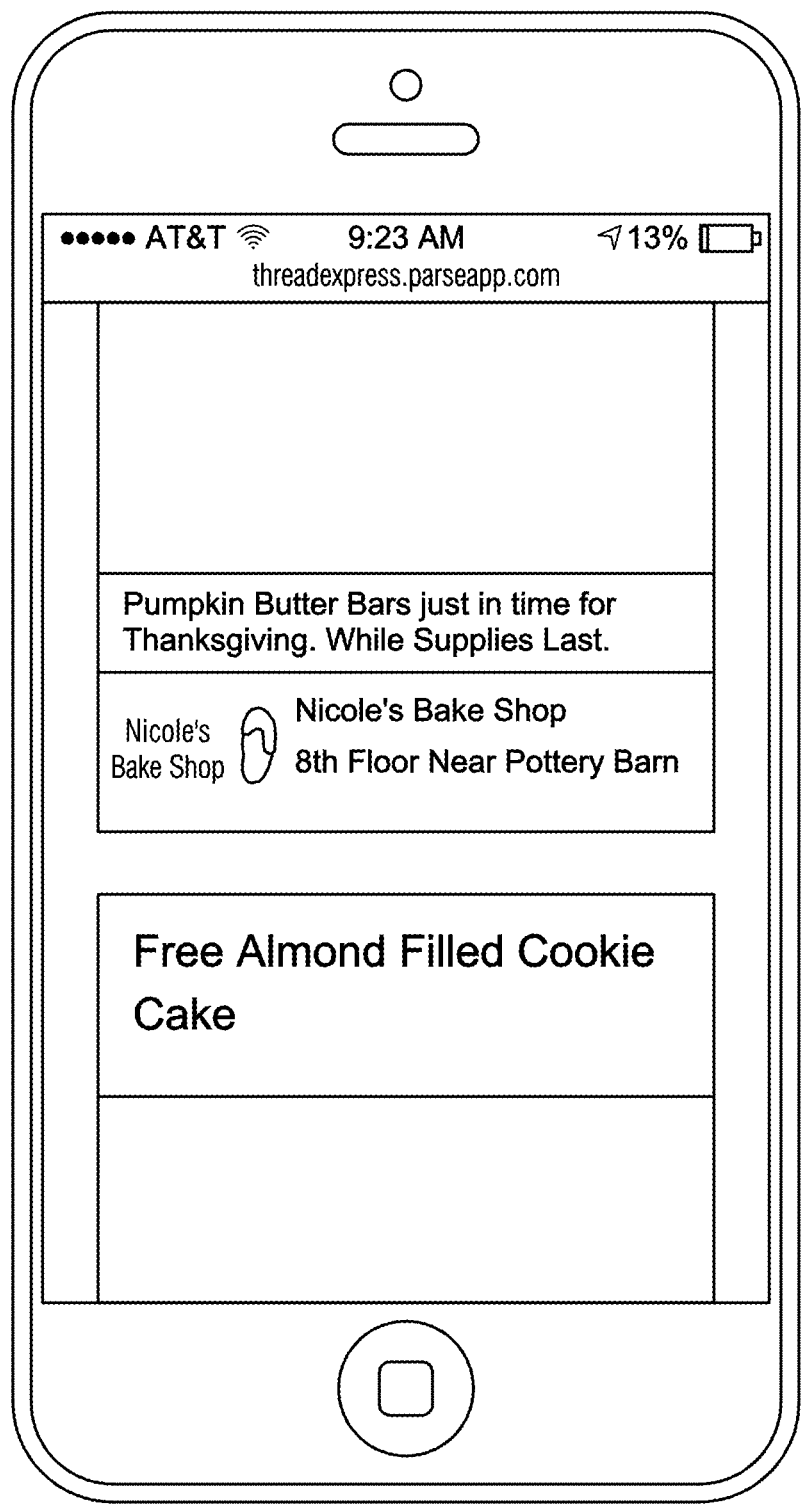
Figure 13A:
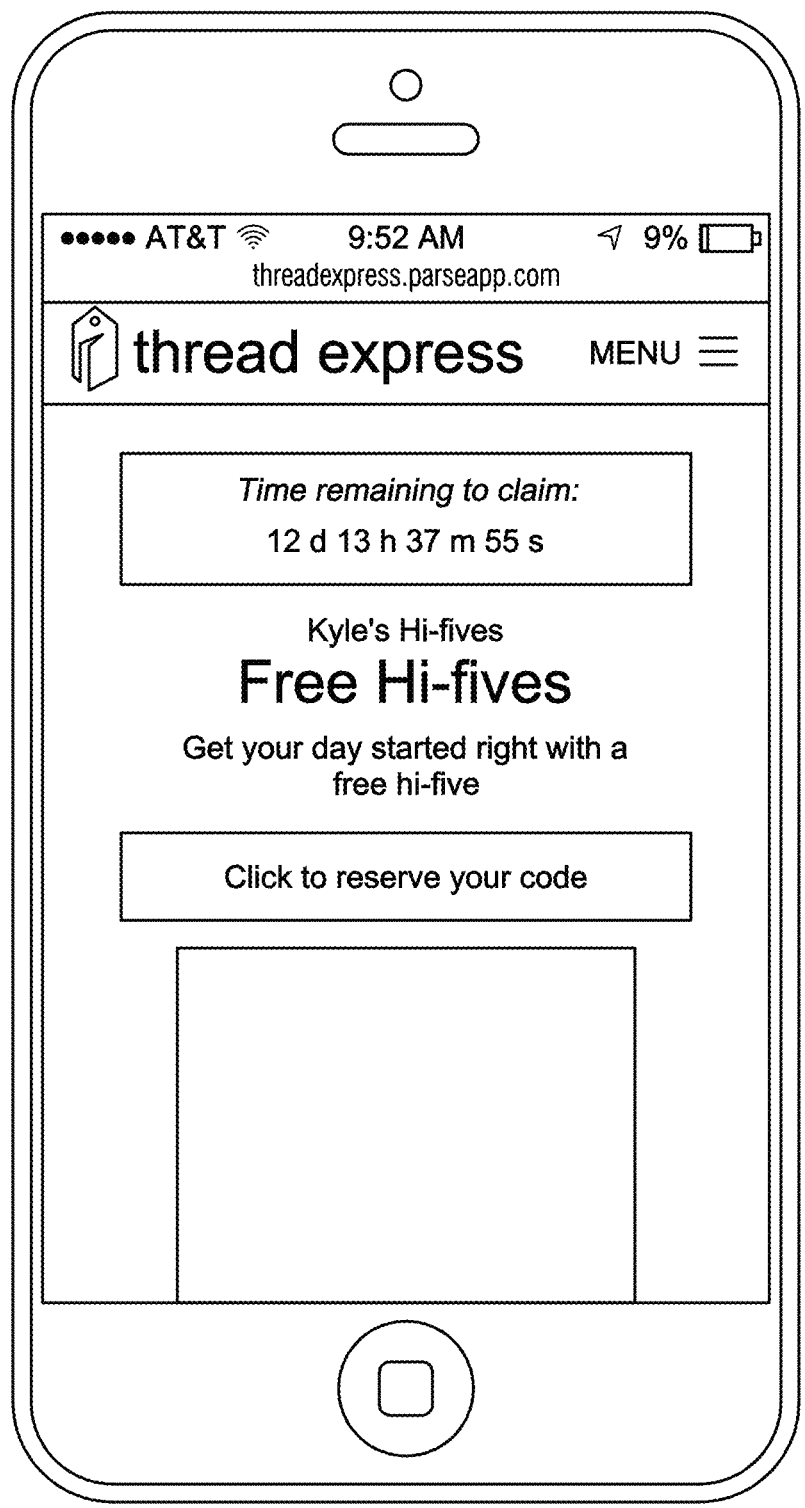
FIGS. 13A-B show an example of an offer reservation interface.
Figure 13B:
Figure 13C:
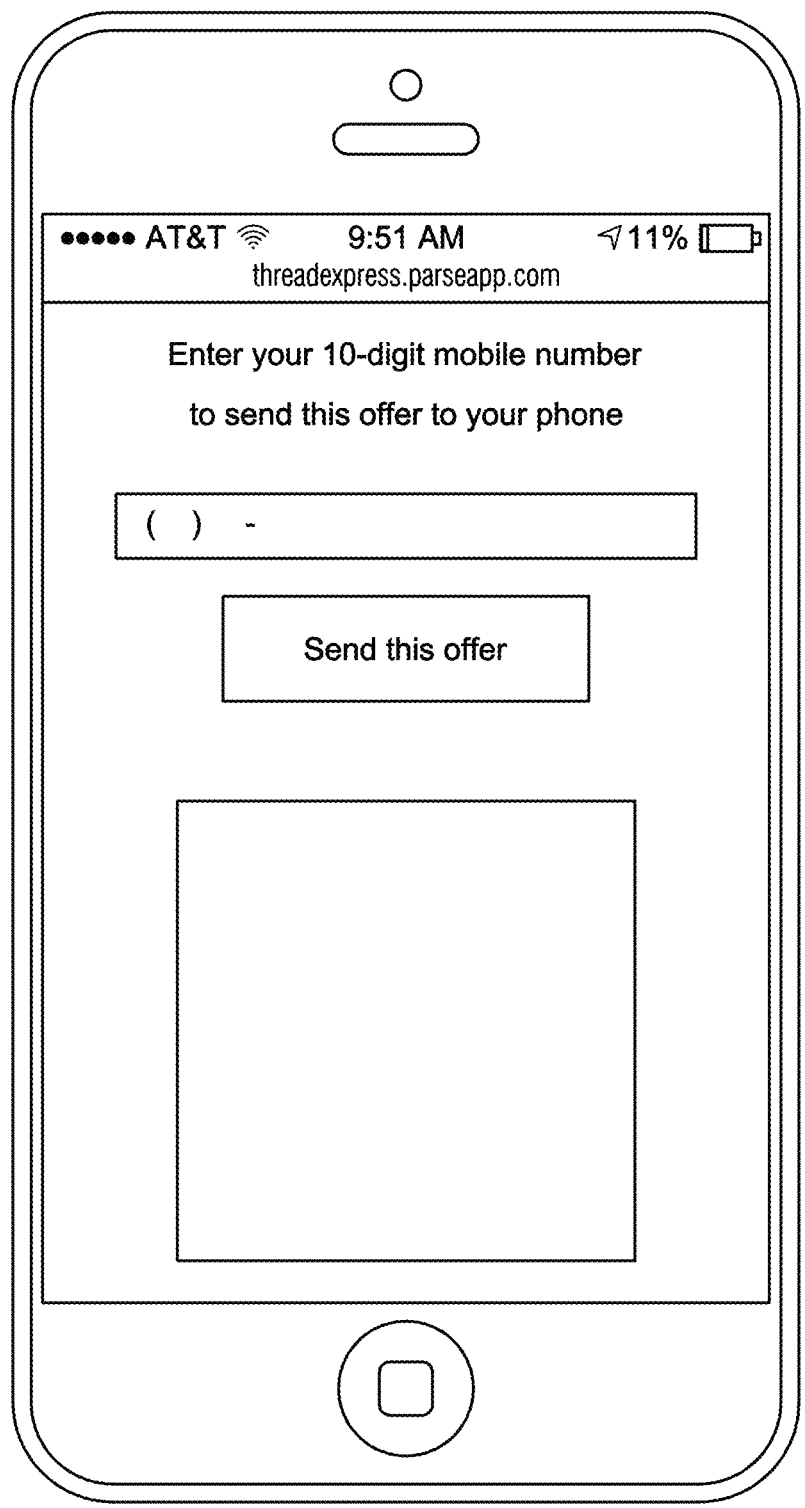
FIG. 13C shows an example of a confirmation interface by which a consumer may send redemption information to another device.
Figure 14C:
FIG. 14C shows an example of a validation interface on a merchant mobile device indicating the scanned offer instance is valid.

Accordingly, some embodiments may provide for locally targeted (e.g., within a 50 mile radius or smaller), single-use offers managed from a mobile device of a merchant while the merchant employee is in the field (e.g., on a sales floor). These embodiments may implement interfaces described below with reference to FIGS. 12A-C, 13A-C, and 14A-C, though embodiments are not limited to the interfaces depicted. For instance, FIGS. 12A-C show examples of an offer creation interface by which a merchant employee logs in to create offers (FIG. 12A) and creates the offer (FIGS. 12B and C). FIGS. 13A-B show an example of an offer reservation interface, and FIG. 13C shows an example of a confirmation interface by which a consumer may send redemption information to another device. FIG. 14A shows an example of a validation interface by which a QR code is captured from a display screen of a consumer mobile device using a camera of a merchant mobile device. FIG. 14B shows an example of an updated display screen presented on a consumer mobile device after the offer has been redeemed, indicating that the redemption information no longer corresponds to a valid offer instance, and FIG. 14C shows an example of a validation interface on a merchant mobile device indicating the scanned offer instance is valid.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more." The term "or" is, unless indicated otherwise, non-exclusive, i.e., encompassing both "and" and "or." Terms relating to causal relationships, e.g., "in response to," "upon," "when," and the like, encompass causal relationships having both causes that are a necessary causal condition and causes that are a sufficient causal condition, e.g., "state X occurs upon condition Y obtaining" is generic to "X occurs solely upon Y" and "X occurs upon Y and Z." Similarly, unless otherwise indicated, statements that one value or action is "based on" another condition or value encompass both instances in which the condition or value is the sole factor and instances in which the condition or value is one factor among a plurality of factors. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

The present application will be better understood with reference to the following enumerated examples of embodiments:

1) A method of issuing single-use digital coupons in the field by creating a coupon tied to a merchant employee's current geographic location using a cell phone of the merchant employee such that a limited number of the coupons are available for consumers to reserve and consumers who reserve the coupons are alerted to the coupon on cell phones of those consumers in response to those consumers' cell phones detecting arrival at the geographic location, the method comprising: presenting, with an offer-creating merchant mobile device, one or more coupon-creation interfaces configured to obtain coupon parameters specifying a coupon, the coupon parameters including an identifier of a merchant issuing the coupon, a title of the coupon, a description of a discount available to those who redeem the coupon with the merchant, an expiration time of the coupon, and an amount of instances of the coupon to be issued; receiving the coupon parameters from a merchant user via the one or more coupon-creating interfaces with the offer-creating merchant mobile device; obtaining a geographic location of the merchant with the offer-creating merchant mobile device; sending, to a remote offers engine, with one or more wireless transmissions of the offer-creating merchant mobile device, the coupon parameters and the geographic location, wherein the offers engine is configured to distribute coupons from a plurality of merchants to a plurality of consumers over the Internet; associating the coupon parameters and the geographic location with a coupon identifier in a coupon record stored in memory accessible to the offers engine; receiving, at the offers engine, from a consumer's computing device, via the Internet, a request for a reserving interface to reserve an instance of the coupon; determining, with the offers engine, that the specified amount of instances of the coupon to be issued is greater than an amount of instances of the coupon that have been reserved; sending, from the offers engine, to the consumer's computing device, one or more reserving interfaces, wherein the one or more reserving interfaces display at least some of the coupon parameters and present a reserving input by which a consumer reserves an instance of the coupon; receiving, from the consumer's computing device, a request to reserve an instance of the coupon after the consumer engages with the reserving input; after receiving the request to reserve the instance of the coupon and determining that the specified amount of instances of the coupon to be issued is greater than an amount of instances of the coupon that have been reserved, adjusting, with the offers engine, a reserved-amount value indicative of an amount of instances of the coupon that have been reserved; sending the consumer's mobile device a geofence containing the geographic location and instructions to alert the consumer after the mobile device is within the geofence; sending the consumer's mobile device redemption information that, when conveyed to the merchant and by the merchant to the offers engine, causes the offers engine to validate that the consumer reserved an instance of the coupon.

2) The method of embodiment 1, wherein the coupon parameters comprise an image related to the coupon and captured with a camera of the offer-creating merchant mobile device, and wherein obtaining the geographic location of the merchant with the offer-creating merchant mobile device comprises determining a location based on wireless signals received by the merchant mobile device 3) The method of any of embodiments 1-2, wherein sending the consumer's mobile device redemption information comprises sending instructions, that when input to an offer-redeeming merchant mobile device by optically scanning an image on a display screen of the consumer's mobile device with a camera of the offer-redeeming merchant mobile device, cause the offer-redeeming merchant mobile device to send an identifier of the reserved coupon instance to the offers engine, wherein the identifier is unique to the reserved coupon instance among other reserved instances of the coupon.

4) The method of embodiment 4, comprising: receiving, at the offers engine, from the offer-redeeming merchant mobile device, the identifier unique to the reserved coupon instance; and after receiving the identifier, sending confirmation that the reserved coupon instance is valid to the offer-redeeming merchant mobile device, wherein the confirmation includes a confirmation code to which point-of-sale system of the merchant is responsive.

5) The method of any of embodiments 1-4, wherein sending the consumer's mobile device a geofence containing the geographic location and instructions to alert the consumer after the mobile device is within the geofence comprises: sending geographic coordinates of a bounding polygon defining a perimeter of the geofence; and sending instructions that cause the consumer's mobile device to execute a background process that determines whether the consumer's mobile device has entered the bounding polygon.

6) The method of any of embodiments 1-5, wherein: the one or more coupon-creation interfaces include an interface to select a wireless beacon transmitting in range of the offer-creating merchant mobile device such that a selected wireless beacon indicates the geographic location; and the instructions to alert the consumer after the mobile device is within the geofence comprise instructions to alert the consumer in response to the mobile device of the consumer wirelessly receiving a transmission from the selected wireless beacon.

7) The method of any of embodiments 1-6, wherein the offer-redeeming merchant mobile device indicates the geographic location by broadcasting a wireless beacon.

8) The method of embodiment 7, wherein: the coupon parameters comprise an identifier of the offer-redeeming merchant mobile device; the offer-redeeming merchant mobile device is configured to repeatedly wirelessly transmit the identifier as a beacon transmission after sending the coupon parameters to the remote offers engine; and wherein the instructions to alert the consumer after the consumer mobile device is within the geofence comprise instructions to alert the consumer in response to the consumer mobile device wirelessly receiving the identifier of the offer-redeeming merchant mobile device transmitted by the offer-redeeming merchant mobile device as a beacon while the consumer mobile device is in wireless range of the beacon transmission.

9) A tangible, machine-readable, non-transitory medium storing instructions that when executed by a data processing apparatus cause the data processing apparatus to perform operations, comprising: presenting, on a mobile device, one or more offer-creation interfaces by which a merchant enters offer parameters specifying an offer, the offer parameters including data indicative of an amount of instances of the offer to be reserved by consumers; obtaining, with the mobile device, the offer parameters after a merchant supplies the offer parameters with the one or more offer-creation interfaces; obtaining, with the mobile device, a geographic location where consumers are to be alerted to the offer; and sending a request to an affiliate network to distribute the offer to a plurality of publishers within the affiliate network and limit use of the offer according to the specified amount of instances of the offer to be reserved by consumers, wherein the publishers each send a plurality of offers to consumers and wherein the affiliate network tracks redemptions of the offers with merchants.

10) The medium of embodiment 9, wherein the geographic location is obtained by steps comprising: sensing, with the mobile device, a geographic coordinate of the mobile device based on wireless signals received by the mobile device indicative of location of the mobile device; presenting a geofence configuration interface by which a merchant specifies a geofence containing the geographic coordinate.

11) The medium of any of embodiments 9-10, wherein the geographic location is obtained by steps comprising: sensing one or more wireless beacons transmitted by other computing devices within range of the mobile device; and presenting a beacon selection interface by which a merchant specifies that one or more of the wireless beacons indicate the geographic location.

12) The medium of any of embodiments 9-11, comprising: capturing an image associated with the offer with a camera of the mobile device, wherein the offer parameters include the image.

13) The medium of any of embodiments 9-12, wherein obtaining the geographic location comprises obtaining a plurality of overlapping geographic areas, and wherein obtaining offer parameters comprises obtaining different terms of the offer to be presented in the different geographic areas.

14) The medium of any of embodiments 9-13, wherein the geographic location is defined by a beacon transmitted by the mobile device, and wherein the operations further comprise transmitting the beacon with the mobile device after sending the request such that at least some consumer devices in range of the beacon cause the at least some consumer devices to alert respective consumers to the offer.

15) The medium of any of embodiments 9-14, comprising: after receiving a request to validate an instance of the offer presented by a consumer, capturing an image presented by the consumer and associated with the offer with a camera of the mobile device; sending a request to validate the offer to the affiliate network, wherein the request to validate includes an identifier of the instance of the offer presented by the consumer, and wherein the identifier is encoded in the image, and wherein the identifier distinguishes instance of the offer presented by the consumer from other instances of the offer; and receiving an indication from the affiliate network of whether the offer is valid.

16) A system, comprising: one or more processors; and memory storing instructions that when executed by the one or more processors effectuate operations comprising:

receiving, from an offer-creating merchant mobile device, an offer to be distributed to consumers, the offer being defined, at least in part, by offer parameters including:

an amount of instances of the offer to be reserved by consumers, and a geographic location that is acquired based on wireless signals received by the offer-creating merchant mobile device indicative of a current location of the offer-creating merchant mobile device;

creating an offer record in memory, the offer record including data based on the offer parameters; causing at least some of the data based on the offer parameters to be sent to a consumer's computing device; receiving an indication that the consumer requests to reserve an instance of the offer; determining, by one or more processors, that an amount of reserved instances of the offer is less than the amount of instances of the offer to be reserved by consumers included in the offer parameters; after the determination, sending a consumer mobile device an indication that an instance of the offer has been reserved; causing the consumer mobile device to be sent data indicative of the geographic location; and causing the consumer mobile device to be sent instructions to alert the consumer to the offer after the consumer mobile device determines that a current geographic location of the consumer mobile device corresponds to the geographic location included in the offer parameters.

17) The system of embodiment 16, wherein causing the consumer mobile device to be sent instructions to alert the consumer to the offer occurs before receiving an indication that the consumer requests to reserve an instance of the offer.

18) The system of any of embodiments 16-17, wherein causing the consumer mobile device to be sent instructions to alert the consumer to the offer occurs after receiving an indication that the consumer requests to reserve an instance of the offer.

19) The system of any of embodiments 16-18, wherein the geographic location is defined by data corresponding to information conveyed in a wireless beacon transmitting at the geographic location.

20) The system of any of embodiments 16-19, wherein the geographic location is defined by a geofence corresponding to a perimeter of a geographic area.

21) The system of any of embodiments 16-20, wherein the offer parameters include an outer geographic location and an inner geographic location contained, at least partially by the outer geographic location, and wherein the operations further comprise: causing the consumer mobile device to be sent instructions to alert the consumer to the offer both after the consumer mobile device determines that a current geographic location of the consumer mobile device corresponds to the outer geographic location and after the consumer mobile device determines that a current geographic location of the consumer mobile device corresponds to the inner geographic location.

22) The system of any of embodiments 16-21, wherein the operations further comprise: receiving a request from an offer-monitoring merchant mobile device to obtain data indicate of offer performance, wherein the offer-monitoring merchant mobile device is either the offer-creating merchant mobile device or another merchant mobile device; sending to the offer-monitoring merchant mobile device data indicative of the amount of reserved instances of the offer; receiving from the offer-monitoring merchant mobile device a request to change an offer parameter; and after receiving the request to change an offer parameter, updating the offer record in memory based on the request.

23) The system of any of embodiments 16-22, wherein the operations further comprise: receiving a request from an offer-validating merchant mobile device to validate the reserved instance of the offer, wherein the request includes an offer-instance identifier sent to the consumer mobile device, and wherein offer-validating merchant mobile device is either the offer-creating merchant mobile device or another merchant mobile device; after receiving the request to validate the reserved instance of the offer, determining that the offer-instance identifier is valid; and after determining that the offer-instance identifier is valid, sending the offer-validating merchant mobile device data indicating that the reserved instance of the offer is valid.

24) The system of embodiment 23, wherein sending the offer-validating merchant mobile device data indicating that the reserved instance of the offer is valid comprises: obtaining a validation code to which a point of sale system of the merchant is responsive and sending the validation code to be entered into the point of sale system by the merchant.

25) The system of embodiment 23, wherein the geographic location is acquired based on wireless signals received by the offer-creating merchant mobile device indicative of a current location of the offer-creating merchant mobile device.

26) A system, comprising: one or more processors; and memory storing instructions that when executed by the one or more processors cause the one or more processors to effectuate operations comprising:
sending an offer instance and instructions to display the offer instance to a consumer device; receiving a signal indicating that the offer instance is no longer valid; and in response to receiving the signal, sending instructions to the consumer mobile device to display an indication that the offer instance is no longer valid.

27) The system of embodiment 26, wherein the instructions to display the offer comprise instructions to repeatedly query whether the offer instance is valid.

28) The system of embodiments 26 or 27, wherein sending instructions to the consumer mobile device to display the indication that the offer instance is no longer valid comprises: sending instructions to the consumer mobile device to display the indication that the offer instance is no longer valid regardless of whether the consumer mobile device has queried whether the offer instance is valid.

29) A system, comprising: one or more processors; and memory storing instructions that when executed by the one or more processors effectuate operations comprising the operations of any of embodiments 1-15.

30) A method comprising performing the operations of any of embodiments 9-28.

31) A tangible, non-transitory, machine readable medium storing instructions that when executed by a data processing apparatus cause the data processing apparatus to effectuate the operations of any of embodiments 1-8 or 16-28.

What is claimed is:

1. A method of issuing single-use digital coupons tied to a geographic location and redeeming the coupons, the method comprising:
instructing an offer-creating merchant computing device to present one or more coupon-creation interfaces configured to obtain coupon parameters specifying a coupon, the coupon parameters including an identifier of a merchant issuing the coupon, a title of the coupon, a description of a discount available to those who redeem the coupon with the merchant, an expiration time of the coupon, and an amount of instances of the coupon to be issued;
receiving the coupon parameters from a merchant user via the one or more coupon-creating interfaces presented with the offer-creating merchant computing device;
obtaining a geographic location of the merchant from the offer-creating merchant computing device;
distributing, with an offers engine, with one or more transmissions, the coupon parameters and the geographic location, wherein the offers engine is configured to distribute coupons from a plurality of merchants to a plurality of consumers over the Internet;
associating the coupon parameters and the geographic location with a coupon identifier in a coupon record stored in memory accessible to the offers engine;
receiving, at the offers engine, from a consumer's computing device, via the Internet, a request for a reserving interface to reserve an instance of the coupon;
determining, with the offers engine, that the specified amount of instances of the coupon to be issued is greater than an amount of instances of the coupon that have been reserved;
sending, from the offers engine, to the consumer's computing device, one or more reserving interfaces, wherein the one or more reserving interfaces display at least some of the coupon parameters and present a reserving input by which a consumer reserves an instance of the coupon;
receiving, from the consumer's computing device, a request to reserve an instance of the coupon after the consumer engages with the reserving input;
after receiving the request to reserve the instance of the coupon and determining that the specified amount of instances of the coupon to be issued is greater than an amount of instances of the coupon that have been reserved, and adjusting, with the offers engine, a reserved-amount value indicative of an amount of instances of the coupon that have been reserved;
sending the consumer's mobile device a geofence containing the geographic location and instructions to alert the consumer after the mobile device is within the geofence;
sending the consumer's mobile device redemption information that, when conveyed to the merchant and by the merchant to the offers engine, causes the offers engine to validate that the consumer reserved an instance of the coupon, wherein sending the consumer's mobile device redemption information comprises:
sending instructions that when input to an offer-redeeming merchant mobile device by direct wireless communication with the consumer's mobile device, cause the offer-redeeming merchant mobile device to send an identifier of the reserved coupon instance to the offers engine, wherein the identifier is unique to the reserved coupon instance among other reserved instances of the coupon;
receiving, at the offers engine, from the offer-redeeming merchant mobile device, the identifier unique to the reserved coupon instance;
after receiving the identifier, determining that the identifier unique to the reserved coupon instance corresponds to a valid instance of the coupon that has not been previously redeemed; and
after determining validity, sending confirmation that the reserved coupon instance is valid to the offer-redeeming merchant mobile device, wherein the confirmation includes a confirmation code to which a point-of-sale system of the merchant is responsive, wherein multiple instances of the coupon share the same confirmation code.

2. The method of claim 1, wherein the coupon parameters comprise an image related to the coupon and captured with a camera of the offer-creating merchant computing device, the offer-creating merchant computing device being a mobile device, and wherein obtaining the geographic location of the merchant with the offer-creating merchant computing device comprises determining a location of the merchant computing device based on wireless signals received by the offer-creating merchant computing device.

3. The method of claim 1, wherein sending the consumer's mobile device redemption information comprises sending instructions, that when input to an offer-redeeming merchant mobile device by optically scanning an image on a display screen of the consumer's mobile device with a camera of the offer-redeeming merchant mobile device, cause the offer-redeeming merchant mobile device to send an identifier of the reserved coupon instance to the offers engine.

4. The method of claim 1, comprising:
after receiving the identifier unique to the reserved coupon instance and before sending confirmation that the reserved coupon instance is valid, accessing means for facilitating retrieval of offer instance records to determine that the identifier unique to the reserved coupon corresponds to a valid coupon instance.

5. The method of claim 1, wherein sending the consumer's mobile device a geofence containing the geographic location and instructions to alert the consumer after the mobile device is within the geofence comprises:
sending a plurality of geofences based on a current geolocation of the consumer's mobile device; and
sending instructions that cause the consumer's mobile device to execute a background process that determines whether the consumer's mobile device has entered a given geofence among the plurality of geofences, the background process being configured determine whether the consumer's mobile device has traversed one of the plurality of geofences responsive to an event indicating a geolocation change by greater than a threshold amount, changes with respect to detected wireless networks, or changes with respect to cellular network towers, to reduce power consumption and extend battery life of the consumer's mobile device relative.

6. The method of claim 1, wherein:
the offer-creating merchant computing device is a mobile computing device;
the one or more coupon-creation interfaces include an interface to select a wireless beacon transmitting in range of the offer-creating merchant commuting device such that a selected wireless beacon indicates the geographic location; and
the instructions to alert the consumer after the mobile device is within the geofence comprise instructions to alert the consumer in response to the mobile device of the consumer wirelessly receiving a transmission from the selected wireless beacon.

7. The method of claim 1, wherein the offer-redeeming merchant mobile device indicates the geographic location by broadcasting a wireless beacon.

8. The method of claim 7, wherein:
the coupon parameters comprise an identifier of the offer-redeeming merchant mobile device;
the offer-redeeming merchant mobile device is configured to repeatedly wirelessly transmit the identifier as a beacon transmission after sending the coupon parameters to the remote offers engine; and
wherein the instructions to alert the consumer after the consumer mobile device is within the geofence comprise instructions to alert the consumer in response to the consumer mobile device wirelessly receiving the identifier of the offer-redeeming merchant mobile device transmitted by the offer-redeeming merchant mobile device as a beacon while the consumer mobile device is in wireless range of the beacon transmission.

9. The method of claim 1, comprising:
establishing a websocket connection configured to provide duplex communication with the consumer's mobile device; and
sending instructions to an event handler defined by a script executed by a browser on the consumer's mobile device to update a display of the consumer's mobile device based on the offer-redeeming merchant mobile device sending the identifier unique to the reserved coupon instance, the update to the display indicating a status of redemption of the reserved coupon instance.

10. A tangible, machine-readable, non-transitory medium storing instructions that when executed by a merchant-controlled mobile computing device cause the mobile computing device to perform operations, comprising:
instructing an offer-creating merchant computing device to present one or more coupon-creation interfaces configured to obtain coupon parameters specifying a coupon, the coupon parameters including an identifier of a merchant issuing the coupon, a title of the coupon, a description of a discount available to those who redeem the coupon with the merchant, an expiration time of the coupon, and an amount of instances of the coupon to be issued;
receiving the coupon parameters from a merchant user via the one or more coupon- creating interfaces presented with the offer-creating merchant computing device;
obtaining a geographic location of the merchant from the offer-creating merchant computing device;
distributing, with an offers engine, with one or more transmissions, the coupon parameters and the geographic location, wherein the offers engine is configured to distribute coupons from a plurality of merchants to a plurality of consumers over the Internet;
associating the coupon parameters and the geographic location with a coupon identifier in a coupon record stored in memory accessible to the offers engine;
receiving, at the offers engine, from a consumer's computing device, via the Internet, a request for a reserving interface to reserve an instance of the coupon;
determining, with the offers engine, that the specified amount of instances of the coupon to be issued is greater than an amount of instances of the coupon that have been reserved;
sending, from the offers engine, to the consumer's computing device, one or more reserving interfaces, wherein the one or more reserving interfaces display at least some of the coupon parameters and present a reserving input by which a consumer reserves an instance of the coupon;
receiving, from the consumer's computing device, a request to reserve an instance of the coupon after the consumer engages with the reserving input;
after receiving the request to reserve the instance of the coupon and determining that the specified amount of instances of the coupon to be issued is greater than an amount of instances of the coupon that have been reserved, and adjusting, with the offers engine, a reserved-amount value indicative of an amount of instances of the coupon that have been reserved;
sending the consumer's mobile device a geofence containing the geographic location and instructions to alert the consumer after the mobile device is within the geofence;
sending the consumer's mobile device redemption information that, when conveyed to the merchant and by the merchant to the offers engine, causes the offers engine to validate that the consumer reserved an instance of the coupon, wherein sending the consumer's mobile device redemption information comprises:
sending instructions that when input to an offer-redeeming merchant mobile device by direct wireless communication with the consumer's mobile device, cause the offer- redeeming merchant mobile device to send an identifier of the reserved coupon instance to the offers engine, wherein the identifier is unique to the reserved coupon instance among other reserved instances of the coupon;

receiving, at the offers engine, from the offer-redeeming merchant mobile device, the identifier unique to the reserved coupon instance;

after receiving the identifier, determining that the identifier unique to the reserved coupon instance corresponds to a valid instance of the coupon that has not been previously redeemed; and after determining validity, sending confirmation that the reserved coupon instance is valid to the offer-redeeming merchant mobile device, wherein the confirmation includes a confirmation code to which a point-of-sale system of the merchant is responsive, wherein multiple instances of the coupon share the same confirmation code.

11. The medium of claim 10, wherein the coupon parameters comprise an image related to the coupon and captured with a camera of the offer-creating merchant computing device, the offer-creating merchant computing device being a mobile device, and wherein obtaining the geographic location of the merchant with the offer-creating merchant computing device comprises determining a location of the merchant computing device based on wireless signals received by the offer-creating merchant computing device.

12. The medium of claim 10, wherein sending the consumer's mobile device redemption information comprises sending instructions, that when input to an offer-redeeming merchant mobile device by optically scanning an image on a display screen of the consumer's mobile device with a camera of the offer-redeeming merchant mobile device, cause the offer- redeeming merchant mobile device to send an identifier of the reserved coupon instance to the offers engine.

13. The medium of claim 10, the operations comprising:
after receiving the identifier unique to the reserved coupon instance and before sending confirmation that the reserved coupon instance is valid, accessing means for facilitating retrieval of offer instance records to determine that the identifier unique to the reserved coupon corresponds to a valid coupon instance.

14. The medium of claim 10, wherein sending the consumer's mobile device a geofence containing the geographic location and instructions to alert the consumer after the mobile device is within the geofence comprises:
sending a plurality of geofences based on a current geolocation of the consumer's mobile device; and
sending instructions that cause the consumer's mobile device to execute a background process that determines whether the consumer's mobile device has entered a given geofence among the plurality of geofences, the background process being configured determine whether the consumer's mobile device has traversed one of the plurality of geofences responsive to an event indicating a geolocation change by greater than a threshold amount, changes with respect to detected wireless networks, or changes with respect to cellular network towers, to reduce power consumption and extend battery life of the consumer's mobile device relative.

15. The medium of claim 10, wherein:
the offer-creating merchant computing device is a mobile computing device ;
the one or more coupon-creation interfaces include an interface to select a wireless beacon transmitting in range of the offer-creating merchant comuting device such that a selected wireless beacon indicates the geographic location; and
the instructions to alert the consumer after the mobile device is within the geofence comprise instructions to alert the consumer in response to the mobile device of the consumer wirelessly receiving a transmission from the selected wireless beacon.

16. The medium of claim 10, wherein the offer-redeeming merchant mobile device indicates the geographic location by broadcasting a wireless beacon.

17. The medium of claim 16, wherein:
the coupon parameters comprise an identifier of the offer-redeeming merchant mobile device;
the offer-redeeming merchant mobile device is configured to repeatedly wirelessly transmit the identifier as a beacon transmission after sending the coupon parameters to the remote offers engine; and
wherein the instructions to alert the consumer after the consumer mobile device is within the geofence comprise instructions to alert the consumer in response to the consumer mobile device wirelessly receiving the identifier of the offer-redeeming merchant mobile device transmitted by the offer-redeeming merchant mobile device as a beacon while the consumer mobile device is in wireless range of the beacon transmission.

18. The medium of claim 10, the operations comprising:
establishing a websocket connection configured to provide duplex communication with the consumer's mobile device; and
sending instructions to an event handler defined by a script executed by a browser on the consumer's mobile device to update a display of the consumer's mobile device based on the offer-redeeming merchant mobile device sending the identifier unique to the reserved coupon instance, the update to the display indicating a status of redemption of the reserved coupon instance.

* * * * *